United States Patent
Nagai et al.

(10) Patent No.: US 9,628,360 B2
(45) Date of Patent: Apr. 18, 2017

(54) COMPUTER MANAGEMENT SYSTEM BASED ON META-RULES

(71) Applicant: Hitachi, Ltd., Tokyo (JP)

(72) Inventors: Takayuki Nagai, Tokyo (JP); Masataka Nagura, Tokyo (JP); Kaori Nakano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 209 days.

(21) Appl. No.: 14/427,910

(22) PCT Filed: Mar. 15, 2013

(86) PCT No.: PCT/JP2013/057350
§ 371 (c)(1),
(2) Date: Mar. 12, 2015

(87) PCT Pub. No.: WO2014/141460
PCT Pub. Date: Sep. 18, 2014

(65) Prior Publication Data
US 2015/0244599 A1    Aug. 27, 2015

(51) Int. Cl.
*G06F 15/173*    (2006.01)
*H04L 12/26*    (2006.01)
*G06F 11/07*    (2006.01)
*H04L 29/08*    (2006.01)

(52) U.S. Cl.
CPC ........ *H04L 43/0823* (2013.01); *G06F 11/079* (2013.01); *G06F 11/0727* (2013.01); *H04L 67/10* (2013.01)

(58) Field of Classification Search
CPC .... G06F 11/079; G06F 11/30; H04L 43/0823; H04L 67/10
See application file for complete search history.

(56) References Cited

U.S. PATENT DOCUMENTS

| | | | |
|---|---|---|---|
| 2011/0041066 A1* | 2/2011 | Kimmet | G06F 8/61 715/736 |
| 2012/0023115 A1 | 1/2012 | Nagai et al. | |
| 2012/0254406 A1 | 10/2012 | Nagai et al. | |
| 2016/0254943 A1* | 9/2016 | Maes | G06F 17/3007 |
| 2016/0254957 A1* | 9/2016 | Maes | G06F 17/30557 |

FOREIGN PATENT DOCUMENTS

| | | |
|---|---|---|
| JP | 2012-003406 A | 1/2012 |
| WO | 2010/122604 A1 | 10/2010 |
| WO | 2011/007394 A1 | 1/2011 |
| WO | 2012/131868 A1 | 10/2012 |

\* cited by examiner

*Primary Examiner* — Hitesh Patel
(74) *Attorney, Agent, or Firm* — Volpe and Koenig, P.C.

(57) ABSTRACT

A computer management system that manages a plurality of types of managed objects according to one or more meta-rules. In the system, the one or more meta-rules are established by dividing a plurality of relationships among the managed objects into one or more groups based on a change frequency of the relations among the managed objects.

15 Claims, 29 Drawing Sheets

| 1700A | | Apparatus ID | Component ID |
|---|---|---|---|
| 1711 | Component | SvA | DRIVE1 |
| | | StA | STPORT1 |
| 1712 | | StA | VOL1 |
| 1713 | Topology ID | Topology3-1 | |
| | Related expanded rule ID | ExpandedRule2-1 | |

Topology data of topology repository 137

| 1700B | | Apparatus ID | Component ID |
|---|---|---|---|
| 1711 | Component | StA | STCTL1 |
| 1712 | | StA | STPORT1 |
| 1713 | Topology ID | Topology2-1 | |
| | Related expanded rule ID | ExpandedRule3-1 | |

Topology data of topology repository 137

Fig. 2A

| | Event ID | Apparatus ID | Component ID | Event type | Occurrence date and time point | Processed flag |
|---|---|---|---|---|---|---|
| 211 | EV0 | SvA | NULL | CpuUsagePersantagePerfError | 2012-07-07 15:00:00 | Yes |
| 212 | EV1 | StA | DISK1 | DiskUtilizationError | 2012-07-07 15:00:00 | No |
| 213 | EV2 | StA | VOL1 | IoResponseTimeError | 2012-07-07 15:05:00 | No |
| | EV3 | SvA | DRIVE1 | AverageSecPerXferError | 2012-07-07 15:07:00 | No |
| | ... | ... | ... | ... | ... | ... |

Failure event table

Fig. 2B

| | Event ID | Apparatus ID | Component ID | Entity name | Event type | Occurrence date and time point | Processed flag |
|---|---|---|---|---|---|---|---|
| 261 | EV0 | SvA | NULL | - | Add | 2012-07-07 14:00:00 | Yes |
| | EV1 | SvA | DRIVE1 | HBA_WWN | Change | 2012-07-07 16:00:00 | No |
| | EV2 | StA | VOL1 | Port no. | Change | 2012-07-07 16:00:00 | No |
| | EV3 | FCSwA | NULL | - | Remove | 2012-07-07 16:07:00 | No |
| | EV4 | SvA | DRIVE2 | - | Add | 2012-07-07 16:10:00 | No |
| | EV5 | StA | VOL2 | - | Remove | 2012-07-07 16:10:00 | No |
| | ... | ... | ... | ... | ... | ... | ... |

Change event table

Fig. 3A

| | Apparatus type | Component type | Event type |
|---|---|---|---|
| IF section | Server | Disk drive | AverageSecPerXferError |
| | Storage | Storage controller | NOT CpuLoadError |
| | Storage | Logical volume | IoResponseTimeError |
| | Storage | Storage disk | DiskUtilizationError |
| THEN section | Storage | Storage disk | DiskUtilizationError |
| Meta-rule ID | MetaRule1 | | |
| Topology acquisition method ID | Method1, Method2 | | |

Meta-rule of meta-rule repository 135

Fig. 3B

| | Apparatus type | Component type | Event type |
|---|---|---|---|
| IF section | Server | Disk drive | AverageSecPerXferError |
| | Storage | Storage port | MidError2 |
| | Storage | Logical volume | - |
| THEN section | Storage | Logical volume | MidError1 |
| Meta-rule ID | MetaRule2 | | |
| Topology acquisition method ID | Method3 | | |

Meta-rule of meta-rule repository 135

| | Apparatus type | Component type | Event type |
|---|---|---|---|
| 311 — IF section | Storage | Storage controller | NOT CpuLoadError |
| 312 | Storage | Storage port | - |
| 313 THEN section | Storage | Storage port | MidError2 |
| 314 Meta-rule ID | MetaRule3 | | |
| Topology acquisition method ID | Method2 | | |

Meta-rule of meta-rule repository 135

| | Apparatus type | Component type | Event type |
|---|---|---|---|
| 311 — IF section | Storage | Logical volume | MidError1 |
| | Storage | Logical volume | IoResponseTimeError |
| 312 | Storage | Storage disk | DiskUtilizationError |
| 313 THEN section | Storage | Storage disk | DiskUtilizationError |
| 314 Meta-rule ID | MetaRule4 | | |
| Topology acquisition method ID | Method4 | | |

Meta-rule of meta-rule repository 135

Fig. 4

| Apparatus ID (401) | Host name (402) |
|---|---|
| SvA | ServerA |
| SvB | ServerB |
| ... | ... |

Server table (400, 411)

Fig. 5

| Apparatus ID (501) | Switch name (502) | No. of ports (503) |
|---|---|---|
| FCSwA | FCSwitchA | 16 |
| FCSwB | FCSwitchB | 16 |
| ... | ... | ... |

FC switch table (500, 511)

Fig. 6

Storage table

| Apparatus ID (601) | Storage name (602) |
|---|---|
| StA | StorageA |
| StB | StorageB |
| ... | ... |

HBA table

| Component ID (701) | WWN (702) | Apparatus ID (703) | Connection-destination target WWN (704) |
|---|---|---|---|
| HBA1 | 10:00:00:00:00:00:00:01 | SvA | 20:00:00:00:00:00:00:01, 20:00:00:00:00:00:00:02 |
| HBA2 | 10:00:00:00:00:00:00:02 | SvB | 20:00:00:00:00:00:00:01 |
| ... | ... | ... | |

| Component ID | Drive name | Apparatus ID | HBA_WWN | LUN_ID |
|---|---|---|---|---|
| DRIVE1 | D: | SvA | 10:00:00:00:00:00:00:01 | 0 |
| DRIVE2 | E: | SvA | 10:00:00:00:00:00:00:01 | 0 |
| DRIVE3 | C: | SvA | - | - |
| DRIVE4 | D: | SvB | 10:00:00:00:00:00:00:02 | 1 |
| DRIVE5 | C: | SvB | - | - |
| ... | ... | ... | ... | ... |

Disk drive table

Fig. 9

| Component ID | Port no. | LUN_ID | Apparatus ID | Capacity | RAID group no. |
|---|---|---|---|---|---|
| VOL1 | 0 | 0 | StA | 200GB | 0 |
| VOL2 | 0 | 1 | StA | 600GB | 1 |
| VOL3 | 0 | 0 | StB | 300GB | 0 |
| ... | ... | ... | ... | ... | ... |

Logical volume table

Fig. 10

| Component ID | RAID group no. | Apparatus ID | Capacity | RAID level |
|---|---|---|---|---|
| RG1 | 0 | StA | 100000GB | RAID5 |
| RG2 | 1 | StA | 100000GB | RAID1 |
| RG3 | 0 | StB | 300000GB | RAID1 |
| ... | ... | ... | ... | ... |

RIAD group table

Fig. 11

| Component ID | Port no. | WWN | Apparatus ID | Access-permitted WWN | Controller no. |
|---|---|---|---|---|---|
| STPORT1 | 0 | 20:00:00:00:00:00:00:01 | StA | 10:00:00:00:00:00:00:01, 10:00:00:00:00:00:00:02 | 0 |
| STPORT2 | 1 | 20:00:00:00:00:00:00:02 | StA | 10:00:00:00:00:00:00:01, 10:00:00:00:00:00:00:02 | 0 |
| ... | ... | ... | ... | ... | ... |

Storage port table

Fig. 12

Storage disk table

| Component ID | Disk no. | Apparatus ID | RAID group no. |
|---|---|---|---|
| DISK1 | 1 | StA | 0 |
| DISK2 | 2 | StA | 0 |
| DISK3 | 3 | StA | 0 |
| DISK4 | 4 | StA | 1 |
| DISK5 | 5 | StA | 1 |
| DISK6 | 1 | StB | 0 |
| DISK7 | 2 | StB | 0 |
| ... | ... | ... | ... |

Fig. 13

Storage controller table

| Component ID | Controller no. | Apparatus ID |
|---|---|---|
| STCTL1 | 0 | StA |
| STCTL2 | 1 | StA |
| ... | ... | ... |

Fig. 15

| Relation ID | Table name X | Field name X | Table name Y | Field name Y | Simultaneous reference relation | No. of times of changes | Change frequency |
|---|---|---|---|---|---|---|---|
| AS1 | Disk drive | Apparatus ID | Server | Apparatus ID | - | 0 | 0 |
| AS2 | Disk drive | HBA_WWN | HBA | WWN | - | 0 | 0 |
| AS3 | Disk drive | LUN_ID | Logical volume | LUN_ID | AS2, AS17, AS10 | 1000 | 100 |
| AS4 | FC switch port | Connection-destination port WWN | HBA | WWN | - | 0 | 0 |
| AS5 | HBA | Apparatus ID | Server | Apparatus ID | - | 0 | 0 |
| AS6 | Storage port | Access-permitted WWN | HBA | WWN | - | 0 | 0 |
| AS7 | FC switch port | Connection-destination port WWN | Storage port | WWN | - | 0 | 0 |
| AS8 | FC switch port | Apparatus ID | FC switch | Apparatus ID | - | 0 | 0 |
| AS9 | FC switch port | Connection-destination port WWN | FC switch port | WWN | - | 0 | 0 |
| AS10 | Storage port | Port no. | Logical volume | Port no. | - | 1000 | 100 |
| AS11 | Storage port | Apparatus ID | Storage | Apparatus ID | - | 0 | 0 |
| AS12 | Logical volume | Apparatus ID AND RAID group no. | RAID group | Apparatus ID AND RAID group no. | - | 0 | 0 |
| AS13 | Logical volume | Apparatus ID | Storage | Apparatus ID | - | 0 | 0 |
| AS14 | RAID group | Apparatus ID | Storage | Apparatus ID | - | 0 | 0 |
| AS15 | RAID group | Apparatus ID AND RAID group no. | Storage disk | Apparatus ID AND RAID group no. | - | 0 | 0 |
| AS16 | Storage disk | Apparatus ID | Storage | Apparatus ID | - | 0 | 0 |
| AS17 | HBA | Connection-destination target WWN | Storage port | WWN | - | 1000 | 100 |
| AS18 | Storage port | Controller ID | Storage controller | Controller ID | - | 0 | 0 |
| AS19 | Storage controller | Apparatus ID | Storage | Apparatus ID | - | 0 | 0 |
| ... | ... | ... | ... | ... | ... | ... | ... |

Relation table

Fig. 16A

| Method ID | Relation | Upper relation | Influence event-side table name | Cause event-side table name |
|---|---|---|---|---|
| Method1 | AS2 | AS3 | Disk drive | HBA |
| | AS17 | AS3 | HBA | Storage port |
| | AS10 | AS3 | Storage port | Logical volume |
| | AS12 | - | Logical volume | RAID group |
| | AS15 | - | RAID group | Storage disk |

Topology acquisition method data of topology acquisition method repository 134

Fig. 16B

| Method ID | Relation | Upper relation | Influence event-side table name | Cause event-side table name |
|---|---|---|---|---|
| Method2 | AS18 | - | Storage controller | Storage port |

Topology acquisition method data of topology acquisition method repository 134

Fig. 16C

| Method ID | Relation | Upper relation | Influence event-side table name | Cause event-side table name |
|---|---|---|---|---|
| Method3 | AS2 | AS3 | Disk drive | HBA |
| | AS17 | AS3 | HBA | Storage port |
| | AS10 | AS3 | Storage port | Logical volume |

Topology acquisition method data of topology acquisition method repository 134

Fig. 16D

| Method ID | Relation | Upper relation | Influence event-side table name | Cause event-side table name |
|---|---|---|---|---|
| Method4 | AS12 | - | Logical volume | RAID group |
| | AS15 | - | RAID group | Storage disk |

Topology acquisition method data of topology acquisition method repository 134

```
SELECT *
FROM disk drive logical volume storage disk
WHERE
    Disk drive. component ID = input
AND
  Disk drive.  HBA_WWN= HBA.WWN
AND
  HBA. HBA_WWN = logical volume. port WWN
AND
  Storage port. port no. = logical volume. port no.
AND
  Disk drive. LUN_ID = logical volume. LUN_ID
AND
  Logical volume. RAID group no. = RAID group. RAID group no.
AND
  Logical volume. apparatus ID = RAID group. apparatus ID
AND
  RAID group. RAID group no. = storage disk.RAID group no.
AND
  RAID group. apparatus ID = storage disk. apparatus ID
```

*input: Component ID of starting-point disk drive table

Fig. 17A

| | Apparatus ID | Component ID |
|---|---|---|
| Component | SvA | DRIVE1 |
| | StA | STPORT1 |
| | StA | VOL1 |
| Topology ID | Topology3-1 | |
| Related expanded rule ID | ExpandedRule2-1 | |

Topology data of topology repository 137

Fig. 17B

| | Apparatus ID | Component ID |
|---|---|---|
| Component | StA | STCTL1 |
| | StA | STPORT1 |
| Topology ID | Topology2-1 | |
| Related expanded rule ID | ExpandedRule3-1 | |

Topology data of topology repository 137

Fig. 17C

| | Apparatus ID | Component ID |
|---|---|---|
| Component | StA | VOL1 |
| | StA | DISK1 |
| Topology ID | Topology4-1 | |
| Related expanded rule ID | ExpandedRule4-1 | |

Topology data of topology repository 137

Fig. 18A

|  | Apparatus ID | Component ID | Event type | Reception flag |
|---|---|---|---|---|
| IF section | SvA | DRIVE1 | AverageSecPerXferError | 1 |
|  | StA | STPORT1 | MidError2 | 1/1 |
|  | StA | VOL1 | - | - |
| THEN section | StA | VOL1 | MidError1 | 2/2 |
| Expanded rule ID | ExpandedRule2-1 | | | |

Expanded rule of expanded rule repository 136

Fig. 18B

|  | Apparatus ID | Component ID | Event type | Reception flag |
|---|---|---|---|---|
| IF section | StA | STCTL1 | NOT CpuLoadError | 1 |
|  | StA | STPORT1 | - | - |
| THEN section | StA | STPORT1 | MidError2 | 1/1 |
| Expanded rule ID | ExpandedRule3-1 | | | |

Expanded rule of expanded rule repository 136

Fig. 18C

|  | Apparatus ID | Component ID | Event type | Reception flag |
|---|---|---|---|---|
| IF section | StA | VOL1 | MidError1 | 2/2 |
|  | StA | VOL1 | IoResponseTimeError | 0 |
|  | StA | VOL1 | DiskUtilizationError | 0 |
| THEN section | StA | DISK1 | DiskUtilizationError | 2/4 |
| Expanded rule ID | ExpandedRule4-1 | | | |

Expanded rule of expanded rule repository 136

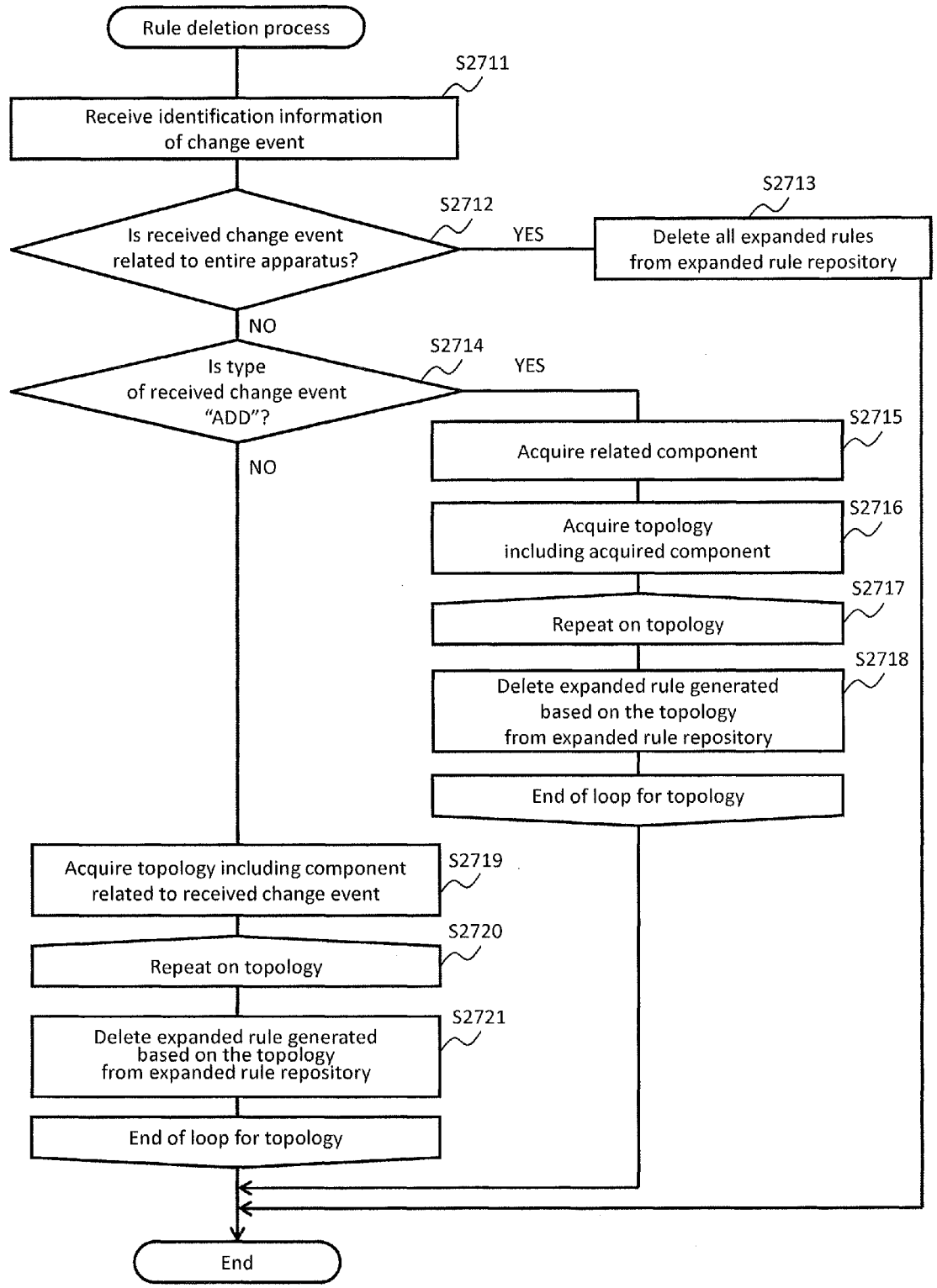

COMPUTER MANAGEMENT SYSTEM BASED ON META-RULES

TECHNICAL FIELD

The present invention relates to a technology of managing a computer system including a managed object such as a server, a storage, and a network apparatus.

BACKGROUND ART

As a technology of managing a computer system, there is known a technology of analyzing, on the basis of a sign of a failure or a plurality of failures detected in a system, a cause of the failure, etc. For example, a failure analysis system disclosed in PTL 1 uses management software to accumulate data relating to an event such as a failure occurring in a management target apparatus or in a component included in the management target apparatus, into an event DB (database). Moreover, such a failure analysis system has an analysis engine for analyzing a cause and effect relationship of a plurality of events occurring in a management target apparatus, etc. The analysis engine accesses a configuration management DB in which configuration information of a management target apparatus, etc., is stored, and recognizes, as a single group called "topology", a relationship among a plurality of management target apparatuses existing on a certain I/O (input/output) path. Then, when an event occurs, the analysis engine applies a previously determined meta-rule including an IF section and a THEN section to the topology that includes the management target apparatus, etc., which is related to the occurring event, and builds an expanded rule for analyzing the cause of a failure. The expanded rule is information indicating a relationship between a cause event that may be a root cause and one or more influence events brought about when the cause event occurs. Specifically, the cause event is described in the THEN section of a rule, and the influence event is described in the IF section of a rule.

CITATION LIST

Patent Literature

[PTL 1] WO2010/122604

SUMMARY OF INVENTION

Technical Problem

In a failure analysis system disclosed in PTL 1, a plurality of IF-THEN type meta-rules are prepared which indicate a correspondence relationship between a combination of influence events that may occur in a certain pattern of a topology and a cause event that is a cause candidate of a failure in the topology pattern.

Then, a group of management target apparatuses configuring a topology applied to the meta-rule is specified with reference to the configuration management DB, and the topology is applied to the meta-rule, whereby an IF-THEN type expanded rule is generated which shows, in a format that depends on an actual configuration of a computer system, a correspondence relationship between one or more influence events and a cause event that is a cause candidate of a failure when the one or more influence events occur.

The failure analysis system computes an occurrence rate of the influence events described in the IF section of the expanded rule to thereby calculate an index value indicating a certainty (hereinafter, referred to as "degree of confidence") that the cause event described in the THEN section is the cause. The calculated degree of confidence and the cause candidate are displayed via a GUI (Graphical User Interface) in response to a request of a user including an operation administrator and a rule creator. Furthermore, together with the information about the cause candidate, the information about the influence event described in the IF section is also displayed as a range of influence with respect to the cause candidate. Thus, the user is capable of understanding from which failure the event occurring in the computer system results.

However, in such a conventional failure analysis system, unless the failure analysis system already holds appropriate meta-rules, it is not possible to display an appropriate analysis result for a user. Therefore, when not all of the meta-rules are present, then it is necessary for a user to add a meta-rule. However, when a meta-rule is added, along with the generation of a meta-rule, it is also necessary to generate a means for specifying the topology applied to the meta-rule.

On the other hand, in a failure analysis system for a large-scale system, it is desirable to implement the generation of an expanded rule on an on-demand basis after an event occurs. This is because as long as a large-scale system is concerned, it requires an enormous amount of time for building an expanded rules when all expanded rules necessary for analysis are prepared beforehand. Moreover, in a failure analysis system in which the generation of an expanded rule is implemented on an on-demand basis, when an expanded rule once created is continuously held in a storage area to be reused when the same event occurs again, it is possible to shorten a time required for building an expanded rule.

However, when there is a configuration change in a management target apparatus within the computer system and an expanded rule created earlier is continued to be used as is, there occurs a problem in that a wrong analysis result based on the old configuration information is output. In order to resolve this problem, when a configuration change is detected in a management target apparatus, the failure analysis system needs to specify an expanded rule inconsistent with the changed configuration and delete the specified expanded rule. An expanded rule based on the changed configuration that corresponds to the deleted expanded rule is generated when an event related to the expanded rule occurs again.

Among meta-rules, there is a meta-rule that needs to inquire the configuration management DB about the configuration information many times when a topology necessary for building an expanded rule is acquired, for example, there is a meta-rule to which a relatively large-scale topology is applied. In such a case, even if only a part of the topology applied to the meta-rule is changed, it is necessary to inquire about an entire topology again. Therefore, for example, when a configuration change occurs frequently in a certain management target apparatus and an event related to the management target apparatus also occurs frequently, the expanded rule related to the event is rebuilt many times; however, when the topology necessary for rebuilding the expanded rule is acquired, the configuration management DB is inquired many times even about an unchanged part in the topology, that is, a part related to an apparatus other than the above-described management target apparatus, and as a result, a time required for building the expanded rules is lengthened. Then, the longer the time required for building the expanded rules during cause analysis, the longer the time required for cause analysis.

Solution to Problem

A management system according to a first viewpoint manages a computer system including a plurality of types of managed objects. A storage device of the management system stores one or more meta-rules indicating the correspondence relationship between a cause event concerning any one of the types of the managed objects, and one or more influence events concerning any one of the types of the managed objects, where the influence events are a condition that the cause event results in a cause, and also stores, for each relation indicating the connection relationship between two types, out of the types of the managed objects, change frequency information indicating a change frequency concerning the relation. A control device of the management system divides a first relation group concerning a first meta-rule stored in the storage device, which is a relation group of a combination of one or more relations indicating a connection configuration between the type of the managed object related to the cause event of the meta-rule, and each type of managed objects related to one or more influence events of the meta-rule, into one or more second relation groups configured by the relation in which a change frequency is equal to or larger than a predetermined value on the basis of the change frequency concerning each of a plurality of relations configuring the first relation group; and one or more third relation groups configured by the relation that the change frequency is smaller than a predetermined value, and also divides a first meta-rule into one or more second meta-rules corresponding to each of the one or more second relation groups; and one or more third meta-rules corresponding to each of the one or more third relation groups.

A management system according to a second viewpoint manages a computer system including a plurality of types of managed objects. A storage device of the management system stores, for each relation indicating the connection relationship between two types, out of the types of the managed objects, change frequency information indicating a change frequency concerning the relation. A control device of the management system divides a first relation group indicating a connection configuration between a type of the managed object related to a cause event indicated by cause information, and each type of managed objects related to one or more influence events indicated by influence information, which is a relation group that receives the input of cause information indicating a cause event concerning any one of the types of the managed objects, and influence information indicating one or more influence events concerning any one of the types of the managed objects, where the influence events are a condition that the cause event by the cause information results in a cause, and which is also a combination of one or more relations indicating a connection configuration between the type of the managed object related to the cause event of a meta-rule indicating a correspondence relationship between a cause event and one or more influence events, and each type of managed objects related to the one or more influence events of the meta-rule, into one or more second relation groups configured by the relation in which a change frequency is equal to or larger than a predetermined value on the basis of the change frequency concerning each of a plurality of relations configuring the first relation group; and one or more third relation groups configured by the relation that the change frequency is smaller than a predetermined value, and also generates one or more second meta-rules corresponding to each of the one or more second relation groups; and one or more third meta-rules corresponding to each of the one or more third relation groups.

Advantageous Effects of Invention

It is possible to reduce a time required for cause analysis.

BRIEF DESCRIPTION OF DRAWINGS

FIG. 2A is an example configuration of a failure event table according to the Embodiment 1.

FIG. 2B is an example configuration of a change event table according to the Embodiment 1.

FIG. 3A is a diagram showing a first example of a meta-rule according to the Embodiment 1.

FIG. 3B is a diagram showing a second example of a meta-rule according to the Embodiment 1.

FIG. 3C is a diagram showing a third example of a meta-rule according to the Embodiment 1.

FIG. 3D is a diagram showing a fourth example of a meta-rule according to the Embodiment 1.

FIG. 4 is an example configuration of a server table according to the Embodiment 1.

FIG. 5 is an example configuration of an FC switch table according to the Embodiment 1.

FIG. 6 is an example configuration of a storage table according to the Embodiment 1.

FIG. 7 is an example configuration of an HBA table according to the Embodiment 1.

FIG. 8 is an example configuration of a disk drive table according to the Embodiment 1.

FIG. 9 is an example configuration of a logical volume table according to the Embodiment 1.

FIG. 10 is an example configuration of a RAID group table according to the Embodiment 1.

FIG. 11 is an example configuration of a storage port table according to the Embodiment 1.

FIG. 12 is an example configuration of a storage disk table according to the Embodiment 1.

FIG. 13 is an example configuration of a storage controller table according to the Embodiment 1.

FIG. 15 is an example configuration of a relation table according to the Embodiment 1.

FIG. 16A is a diagram showing a first example of topology acquisition method data according to the Embodiment 1.

FIG. 16B is a diagram showing a second example of topology acquisition method data according to the Embodiment 1.

FIG. 16C is a diagram showing a third example of topology acquisition method data according to the Embodiment 1.

FIG. 16D is a diagram showing a fourth example of topology acquisition method data according to the Embodiment 1.

FIG. 16E is an example configuration of SQL data according to the Embodiment 1.

FIG. 17A is a diagram showing a first example of topology data according to the Embodiment 1.

FIG. 17B is a diagram showing a second example of topology data according to the Embodiment 1.

FIG. 17C is a diagram showing a third example of topology data according to the Embodiment 1.

FIG. 18A is a diagram showing a first example of an expanded rule according to the Embodiment 1.

FIG. 18B is a diagram showing a second example of an expanded rule according to the Embodiment 1.

FIG. 18C is a diagram showing a third example of an expanded rule according to the Embodiment 1.

FIG. 27 is an example flowchart of a rule deletion process according to the Embodiment 1.

DESCRIPTION OF EMBODIMENTS

Figure 1A:
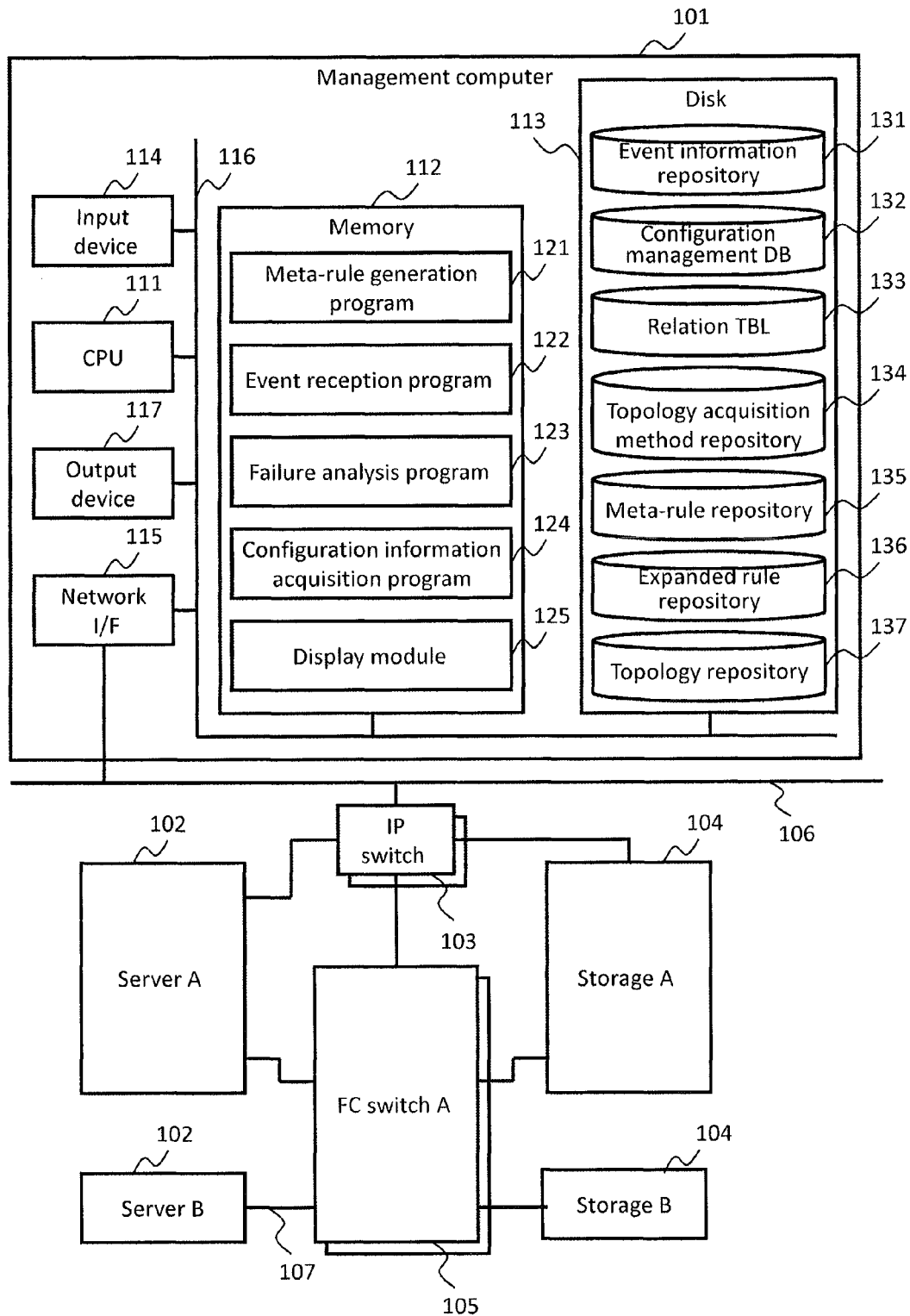
FIG. 1A is a diagram showing an example of a configuration of a computer system and an internal configuration of a management computer according to the Embodiment 1.

Some embodiments of the present invention are now described hereinafter with reference to drawings. Further, it should be noted that the embodiments described hereafter does not limit the invention relating to the claim and all of the elements described in the embodiments and their combinations may not be essential for solution means of the invention. In these figures, the same reference symbols show the same components through the plurality of drawings.

Moreover, several specific items are disclosed in the description of the embodiments, but as is clear to those skilled in the art, not all specific items are necessary for implementing the present invention. To avoid an unnecessarily difficult description of the embodiments, known structures, materials, circuits, processes, and interfaces will not be described in detail, and/or some may be shown in the form of a block diagram.

In addition, in the following description, a main operation inside a computer is described by using an algorithmic description or a symbolic representation. These algorithmic description and symbolic representation are a means used by those skilled in the art of a data processing technology to most effectively convey an operation of a computer to others skilled in the art. An algorithm is a series of steps defined to attain a desired final state or result. In each step in embodiments, it is requested to physically operate tangible amounts used for realizing a tangible result.

However, although generally not essential, these amounts take a format of electrical or magnetic signals that may allow for saving, transferring, combining, comparing, and other operations. It is known that due to a reason that principally it is possible to use these signals in common, it is often convenient to call these as a bit, a value, an element, a symbol, a character, an item, a number, and an instruction, for example. However, it should be noted that all of these items and similar items should be correlated to an appropriate physical amount, and are just convenient labels attached to the physical amounts.

Unless otherwise mentioned expressly and separately, as is clear from the description below, as used herein, description using terms such as "process", "compute", "calculate", "determine", and "display", may include an operation and a process of another information processing apparatus which operates data expressed as a physical (digital) amount within a computer system or a register and a memory of the computer system, and then converts the data to another data expressed similarly as a physical amount within the memory or the register or another information storage, transferring, or display apparatus of the computer system.

Moreover, the management system may include one or more general-purpose computers that are selectively started or reconfigured by one or more computer programs. A computer program that causes the management system to operate may be stored in a computer-readable storage medium such as an optical disk, a magnetic disk, a read-only memory, a random access memory, a solid-state device, and a drive, or other optional media suitable for saving electronic information, but these are not limiting.

It is noted that in the description hereinafter, the information of the present invention is described with an expression such as "aaa table" but such information may be expressed by other than a data structure such as a table. Therefore, in order to indicate non dependence on a data structure, it may be called "aaa information" as for "aaa table", etc.

Further, on explaining each kind of information content, expressions including "identification information", "identifier", "name", and "ID" are used. However, these may be exchangeable with each other.

In the explanation hereafter, there are some places where the explanation is given with "program" as a grammatical subject. However, since a program performs predetermined processes by using a memory and a communication port (a network I/F, an HBA, an I/O port, and a port) by being executed by a processor, it is possible to employ an explanation in which the processor is referred to as a grammatical subject. Additionally, the process disclosed with the program as a grammatical subject may also be processes performed by a computer such as a management server or an information processing apparatus. Further, a part of or a whole of the program may be realized by dedicated hardware. A processor or a device including the processor or such dedicated hardware may be called "control device". Further, the various programs may be installed to each computer by a program distribution server or computer-readable memory media.

Note that a management computer has an input/output device. Examples of the input/output device may include a display device, a keyboard, and a pointer device, but any other device may also be used. Further, as an alternative to the input/output device, a serial interface or an Ethernet interface may be used as the input/output device, a display computer having a display device, a key board, or a pointer device may be coupled to the interface, and the input and display by an input/output device may be substituted by displaying information on the display computer and accepting input through transmission of the display information to the display computer, and reception of the input information from the display computer.

Hereafter, a set of one or more computers that manage a computer system and display the display information of the present invention may be called "management system". In cases where a management computer displays the display information, the management computer is a management system. In addition, a combination of a management computer and a display computer is also a management system. Furthermore, in order to improve speed and reliability of the management process, a process identical or similar to that performed on a management computer may be implemented by a plurality of computers, and in such a case, the plurality of computers (including a display computer when the display is performed on a display computer) are a management system.

An algorithm and a display device shown herein are essentially not related to any specific computer or other apparatuses. While various general-purpose systems may be used together with the programs and modules based on the disclosure of the present specification, it may be more convenient to construct a more specialized apparatus for executing steps of a desired method. The structures of such various types of systems will become clear in the description disclosed below. Moreover, the present specification does not specify any particular programming language as a precondition. It is possible to use various types of programming languages as the programming language of various programs allowing a computer to operate. The instructions of the programming language are implemented by one or more processing apparatuses, for example, a processor or a controller.

Overview of Embodiments

Several embodiments described below relate to support for creation of a failure analysis rule that has an effect of reducing man-hour when the failure analysis rule is created, and relate also to an apparatus, a method, and a computer program for implementing failure analysis on the basis of the rule.

A management computer is a computer that manages a plurality of management target apparatuses. The types of management target apparatuses include, for example, a server, a network apparatus, an NAS (Network Attached Storage), and a storage apparatus. The network apparatus includes an IP (Internet Protocol) switch, a router, an FC (fiber channel) switch, and the like. Moreover, a logical or physical constituent component such as a device included in the management target apparatus is called "component". The types of the component include, for example, a communication port, a CPU (Central Processing Unit), a memory, a disk, a program, a virtual machine, a logical volume defined inside a storage apparatus, and a RAID (Redundant Arrays of Inexpensive Disks) group. It is noted that when the management target apparatus and the component are treated without any distinction, these are called "managed object". That is, the "managed object" is a management target apparatus or a component.

A management computer acquires, from the management target apparatus, configuration information showing a configuration of a managed object, and information indicating an event that occurs in the managed object (hereinafter, referred to as "event information"). Moreover, the management computer also treats a change in the configuration of a managed object (configuration change) as an event. Hereinafter, an event corresponding to a configuration change of a managed object is called "change event", and in order to distinguish from a change event, an event such as a failure or a change in performance, which is subject to cause analysis, is called "failure event". Moreover, event information indicating a failure event is called "failure event information" and event information indicating a change event is called "change event information". It is noted that a management computer may detect a configuration change in a management target apparatus on the basis of the configuration information received from the management target apparatus, and generate corresponding change event information.

The management computer has an analysis engine which, upon detection of occurrence of a failure event in the managed object, analyzes a failure from a combination of one or more failure events that occur to specify the cause; and a rule creation engine which supports creation and deletion of a rule necessary for analyzing the failure.

The analysis engine accesses a configuration management DB in which the configuration information of the managed object is stored, and recognizes, as a single group called "topology", relationships among a plurality of managed objects that exist on an I/O path. Moreover, a failure analysis rule prepared before the analysis of a failure is called meta-rule, and a correspondence relationship between a combination of failure events (influence events) that may occur in the managed object included in a certain pattern of topology, and a failure event (cause event) that is a cause candidate of a failure when the influence events occur is described in a format not dependent on an actual configuration of a computer system. That is, the meta-rule is data indicating a correspondence relationship between a cause event related to any one of the types of the managed objects, and one or more influence events related to any one of the types of the managed objects, where the influence events are a condition that the cause event results in a cause. Upon detection of a failure event in a certain managed object, the analysis engine acquires a meta-rule related to the detected failure event, that is, a meta-rule in which the detected failure event is included as an influence event, from a meta-rule repository, and acquires information about a topology including a managed object in which a failure event occurs, from the configuration management DB. Then, the analysis engine builds, on the basis of one or more influence events and the cause event described in a meta-rule and the acquired topology information, an expanded rule in which a meta-rule is expanded in a format dependent on an actual configuration of a computer system. In addition, the analysis engine uses the expanded rule to specify the cause candidate of the failure event that occurs, and notifies the same to an operation administrator.

Moreover, upon detection of a configuration change in a managed object as a change event, the analysis engine specifies the expanded rule in which there occurs inconsistency with the current configuration due to the configuration change, and deletes the specified expanded rule from the memory of the management computer. Specifically, the analysis engine specifies a topology that includes a managed object in which a configuration change occurs, and deletes an expanded rule used during the construction of the topology.

The rule creation engine has a function of supporting creation of a meta-rule. When a rule creator having a knowledge in a system failure enters information about the cause event and information about the influence event brought about in a chain-like pattern as a result of the cause event, the rule creation engine derives, on the basis of a data model of the configuration management DB of the management computer, a pattern of a topology between a component related to the cause event and a component related to the influence event. Then, the rule creation engine decides a means of specifying the topology having the derived pattern on the basis of the information in the configuration management DB, and generates a meta-rule about the entered cause event and influence event.

Therefore, upon generation of a meta-rule on the basis of the information about the entered cause event and influence event, the rule creation engine generates data indicating a means of specifying the topology applicable to the meta-rule on the basis of the information in the configuration management DB. Thus, the rule creator is capable of creating a meta-rule without studying an internal structure that includes the data model of the configuration management DB in the management computer, and the analysis engine is capable of automatically specifying the cause of the failure on the basis of the generated meta-rule. Hereinafter, a means of specifying a topology applicable to a meta-rule on the basis of information in a configuration management DB is called "topology acquisition method", and the data indicating a topology acquisition method is called "topology acquisition method data".

Moreover, a configuration information acquisition program manages, as statistical information, a frequency of a configuration change in a managed object, for each type of a managed object or for each relation between types of a managed object, for example. The rule creation engine divides, on the basis of the frequency of configuration change, a meta-rule corresponding to the information entered by the rule creator or a meta-rule stored in the management computer into a plurality of semantically equal meta-rules. Here, "semantically equal" means that the meaning indicated by a whole of a plurality of divided meta-rules is identical or similar to the meaning indicated by a meta-rule yet to be divided. For example, when a first meta-rule is divided into semantically equal two meta-rules (a second meta-rule and a third meta-rule), the second meta-rule and the third meta-rule, that is, a whole of the two meta-rules, indicates a correspondence relationship between a cause event of the first meta-rule and one or more influence events of the first meta-rule. The rule creation engine divides, for example, on the basis of the frequency of configuration change, the meta-rule into a meta-rule including a relation having a high change frequency and a meta-rule including a relation of which the change frequency is not so high. As a result, it is possible to reduce a time required for re-generating an expanded rule due to a configuration change.

Embodiment 1

<Hardware and Logical Constitution of Management Computer>

Figure 1B:
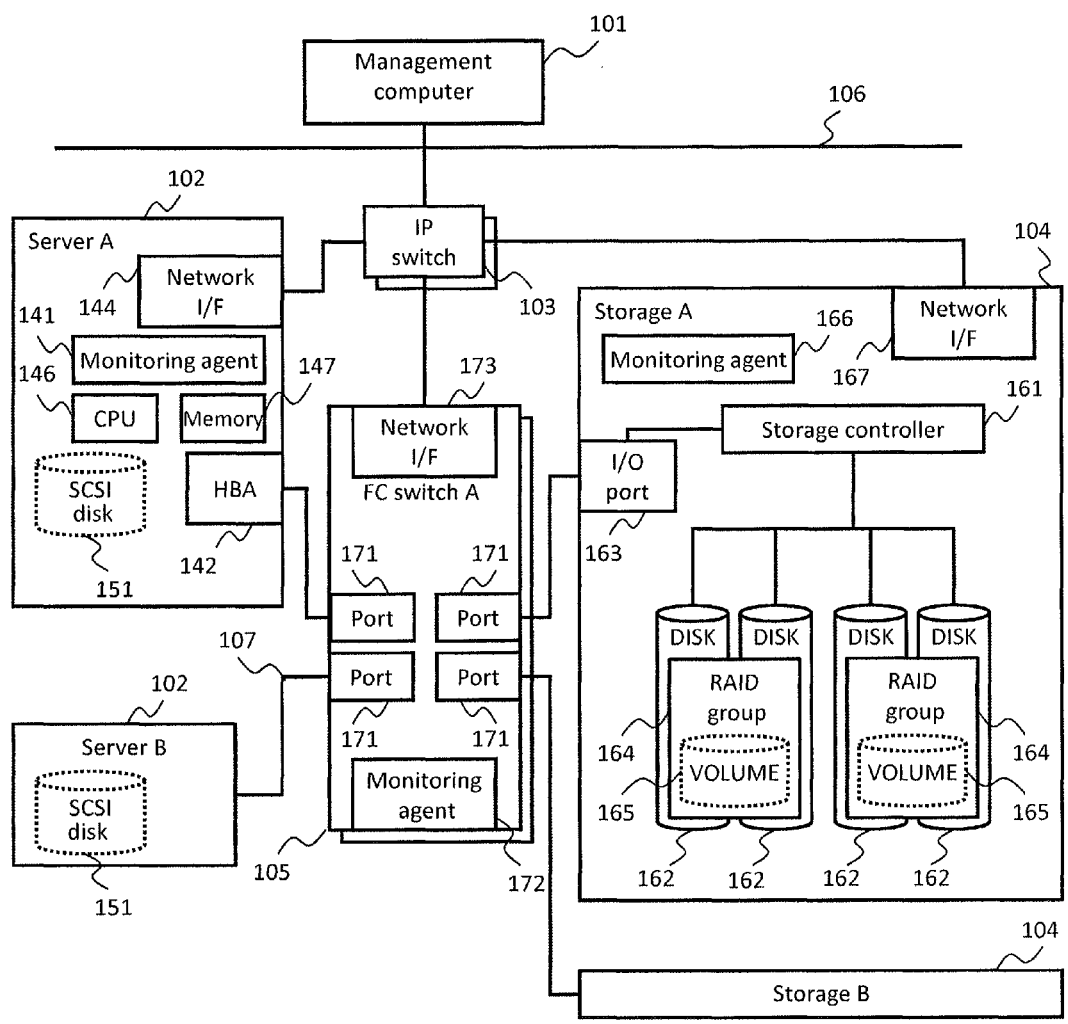
FIG. 1B is a diagram showing an example of a configuration of a computer system and internal configurations of a server, an FC switch, and a storage according to the Embodiment 1.

FIG. 1A is a diagram showing an example of a configuration of a computer system and an internal configuration of a management computer according to the Embodiment 1. FIG. 1B is a diagram showing an example of a configuration of a computer system and internal configurations of a server, an FC switch, and a storage according to the Embodiment 1.

As shown in FIG. 1A, the computer system according to the present embodiment has a management computer 101, one or more servers 102 (a server A and a server B in the example shown in FIG. 1), one or more FC switches 105, one or more storages 104 (a storage A and a storage B in the example shown in FIG. 1), and one or more IP switches 103.

The management computer 101, the server 102, and the FC switch 105 are coupled via a communication network such as a LAN (local area network) 106 to enable communication with one another. The storage 104 is coupled to the server 102 via a communication network such as a SAN (storage area network) 107 to enable communication with the server 102.

The management computer 101 includes a CPU 111, a memory 112, a storage medium such as a hard disk drive (disk) 113, an input device 114, an output device 117, and a network I/F (interface) 115, and may be a general-purpose computer to which these devices are coupled via a system bus 116. The memory 112 of the management computer 101 stores a meta-rule generation program 121, an event reception program 122, a failure analysis program 123, a configuration information acquisition program 124, and a display module 125. Furthermore, the disk 113 of the management computer 101 stores an event information repository 131, a configuration management DB 132, a relation table (TBL) 133, a topology acquisition method repository 134, a meta-rule repository 135, an expanded rule repository 136, and a topology repository 137. In the event information repository 131, a failure event table (see FIG. 2A) and a change event table (see FIG. 2B) are stored. In the configuration management DB 132, a table indicating a configuration of a managed object included in the computer system (hereinafter, referred to as "configuration management table") is stored. In the topology acquisition method repository 134, one or more topology acquisition method data are stored. In the meta-rule repository 135, one or more meta-rules are stored. In the expanded rule repository 136, one or more expanded rules are stored. In the topology repository 137, one or more topology data are stored.

The meta-rule generation program 121, the event reception program 122, the failure analysis program 123, the configuration information acquisition program 124, and the display module 125 are executed by the CPU 111. The programs 121 to 125 may be stored in a storage medium of another computer. The data in the event information repository 131, the configuration management data base 132, the relation table 133, the topology acquisition method repository 134, the meta-rule repository 135, the expanded rule repository 136, and the like may be stored in a storage medium other than the disk 113.

The network I/F 115 acquires event information from a management target apparatus such as the server 102, the IP switch 103, the storage 104, and the FC switch 105, which are coupled via the LAN 106. The output device 117 is used to output the information generated by the display module 125 to present the information to an operation administrator. The input device 114 is used to accept input from an operation administrator. For example, it is possible to use a keyboard, a pointer device, etc., as the input device 114, and it is possible to use a display device, a printer, etc., as the output device 117; however, it may be possible to use other devices. Moreover, a serial interface and an Ethernet interface may also be used as a substitute for the input device 114 and the output device 117. In such a case, it is possible that a display computer having a display device, a keyboard, a pointer device, etc. is coupled to the interface, display information is transmitted to a display computer, and the input information is received from the display computer to thereby display the information on the display computer, and moreover, input is accepted from the display computer to thereby substitute a function of the input device 114 and the output device 117.

As is well-known in the art, the server 102 may be an apparatus for running an application, etc. As shown in FIG. 1B, the server 102 may be a general-purpose computer including a CPU 146, a memory 147, and a network I/F 144. The server 2 may include a storage device, such as a disk, other than a memory. The server 102 may include a monitoring agent 141 that monitors the state of the server 102 itself, and upon detection of a specific state change, etc. sends event information to the management computer 101 via the LAN 106. Furthermore, the server 102 includes an HBA (host bus adapter) 142 for coupling to the SAN 107. Furthermore, the server 102 includes an SCSI disk (hereinafter, referred to as "disk drive") 151, which is a virtual volume formed by mounting a logical volume 165 of the storage 104. The server 102 is capable of virtually using the disk drive 151 as a local hard disk. It is noted that another communication protocol or storage protocol may also be used in place of or in addition to SCSI.

As is well-known in the art, the storage 104 may be an apparatus for providing a storage area for use by an application operating on the server 102, or may be an apparatus for other purposes. The storage 104 has a storage controller 161, an I/O port (hereinafter, referred to as "storage port") 163 for coupling to the SAN 107, a network I/F 167 for coupling to the LAN 106, and a RAID group 164, and is coupled via an internal bus with these devices. It is noted that in the present embodiment, the RAID group 164 being coupled to other devices means that a storage disk 162 configuring the RAID group 164 is coupled to other devices.

The storage disk (DISK) 162 configuring the RAID group 164 is a hard disk drive in the present embodiment; however, in place or in addition to the hard disk drive, other types of storage media such as a solid-state storage device (SSD), an optical storage medium, etc., may be adopted. The RAID group 164 is configured by one or more storage disks 162. It is noted that when the RAID group 164 is configured by a plurality of storage disks 162, the RAID group 164 may adopt a RAID configuration. Moreover, in the storage 104, one or more logical volumes (VOLUMEs) 165 are formed on the basis of a storage area in the RAID group 164.

Moreover, the storage 104 may include a monitoring agent 166 that monitors the state of the storage 104 itself, and upon detection of a specific state change, etc., sends event information to the management computer 101 via the LAN 106. It is noted that instead of the storage 104 including the monitoring agent 166, the monitoring agent 141 of the server 102 may monitor the state of the storage 104.

As is well-known in the art, the FC switch 105 may be an apparatus for configuring the SAN 107 that couples the server 102 and the storage 104, or may be an apparatus for other purposes. The logical volume 165 of the storage 104 is provided to the server 102 via the SAN 107 configured by one or more FC switches 105.

The FC switch 105 has a port 171 for receiving data transmitted from the server 102 or the storage 104, and for transmitting the received data. Moreover, the FC switch 105 may include a network interface 173 for coupling to the LAN 106. In addition, the FC switch 105 may include a monitoring agent 172 that monitors the state of the FC switch 105 itself, and upon detection of a specific state change, etc., sends event information to the management computer 101 via the LAN 106. It is noted that instead of the FC switch 105 including the monitoring agent 172, the monitoring agent 141 of the server 102 may monitor the state of the FC switch 105.

It is noted that in the present embodiment, the expressions with reference symbols such as the server 102, the FC switch 105, the storage 104, the HBA 142, and the storage port 163 imply the managed objects themselves, and the expressions without the reference symbols such as the server, the FC switch, the storage, the HBA, and the storage port imply the types of managed objects.

<Failure Event Table>

FIG. 2A is an example configuration of a failure event table according to the Embodiment 1.

In a failure event table 131A, the failure event information received by the event reception program 122 from the monitoring agents 141, 166, and 172 of the management target apparatus is stored.

The failure event table 131A includes the fields for an event ID 201, an apparatus ID 202, a component ID 203, an event type 204, an occurrence date and time 205, and a processed flag 206. In the event ID 201, identification information for uniquely identifying a failure event is stored. In the apparatus ID 202, identification information (an apparatus ID) for uniquely identifying a management target apparatus related to the failure event is stored. In the component ID 203, identification information (a component ID) for uniquely identifying a component related to the failure event is stored. In the event type 204, data indicating a type of the failure event is stored. In the occurrence date and time 205, data indicating a date and time of occurrence of the failure event (an occurrence date and time) is stored. The occurrence date and time of the failure event may be a date and time when the management computer 101 receives the failure event information. In the processed flag 206, a flag indicating whether or not the failure event is processed by a failure analysis process (see FIG. 25A and FIG. 25B), for example, either "Yes" indicating that the failure event is processed or "No" indicating that the failure event is not yet processed is stored. It is noted that when the failure event is not an event related to a component but an event related to a management target apparatus, "NULL", for example, is stored in the component ID 203.

For example, an entry 211 of FIG. 2A indicates that a failure event "Diskutilizationerror" (disk usage rate exceeding error) occurs at 15:00:00 on Jul. 7, 2012 in the storage 104 having the apparatus ID of "StA", that is, in a storage disk "DISK 1" of a storage A (by that it means the storage disk 162 having the component ID of "DISK1", and hereinafter, the similar expression will be used when a managed object is specified by using the identification information).

<Change Event Table>

FIG. 2B is an example configuration of a change event table according to the Embodiment 1.

In a change event table 131B, change event information received by the event reception program 122 from the monitoring agents 141, 166, and 172 of the management target apparatuses is stored.

The change event table 131B includes the fields for an event ID 251, an apparatus ID 252, a component ID 253, an entity name 256, an event type 254, an occurrence date and time 255, and a processed flag 256. In the event ID 251, identification information for uniquely identifying the change event is stored. In the apparatus ID 252, the apparatus ID of the management target apparatus related to the change event is stored. In the component ID 253, the component ID of the component related to the change event is stored. In the entity name 256, data is stored which indicates a field in which a value is changed, for example, a field name, in the configuration management table related to a component related to the change event, due to a configuration change corresponding to the change event. In the event type 254, data indicating the type of the change event is stored. For example, in the event type 254, "ADD" which indicates that a managed object is added, "DELETE" which indicates that a managed object is deleted, or "CHANGE" which indicates that the configuration of a managed object is changed, is stored. In the occurrence date and time 255, data indicating an occurrence date and time of the change event is stored. The occurrence date and time of the change event may be a date and time when the management computer 101 receives the change event information. In the processed flag 256, a flag indicating whether or not the change event is processed by the failure analysis process (see FIG. 25A and FIG. 25B), for example, either "Yes" indicating that the change event is processed or "No" indicating that the change event is not yet processed is stored. It is noted that when the change event is not an event related to a component but an event related to a management target apparatus, "NULL", for example, is stored in the component ID 253.

For example, an entry 261 in FIG. 2B indicates a change event concerning the server "SvA", that is, the disk drive "DRIVE1" in the server A. Further, the entry 261 indicates that the value of the entry HBA_WWN 804 concerning the disk drive "DRIVE1" of the server A is changed in the configuration management table concerning the disk drive 151, that is, in the disk drive table (see FIG. 8), at 16:00:00 on Jul. 7, 2012. In other words, the entry 261 indicates that the connection destination HBA 142 of the disk drive "DRIVE1" of the server A is changed.

It is noted that the failure event table 131A and the change event table 131B may be configured by the same table.

<Meta-Rule Repository and Meta-Rule>

A meta-rule is information indicating the correspondence relationship between one or more failure events (influence events) that may occur in a managed object, and the failure event (the cause event) that is the cause candidate of the failure when the influence events occur at the same timing or at a close timing, and is also information by which the managed objects related to the influence events and the cause event are expressed by the type of the managed objects. In the present embodiment, the meta-rule is described in the IF-THEN format, but it is possible to use other formats as long as the cause event of the system failure and the observed event that is brought about by the cause event are described.

FIG. 3A is a diagram showing a first example of a meta-rule according to the Embodiment 1. FIG. 3B is a diagram showing a second example of a meta-rule according to the Embodiment 1. FIG. 3C is a diagram showing a third example of a meta-rule according to the Embodiment 1. FIG. 3D is a diagram showing a fourth example of a meta-rule according to the Embodiment 1.

As shown in FIG. 3A, a meta-rule 300 includes an IF section 311 including one or more condition elements 315 indicating the influence events, and a THEN section 312 indicating a cause event.

The meta-rule 300 indicates that when one or more influence events indicated by each of the one or more condition elements 315 of the IF section 311 are detected, the cause event indicated by the THEN section 312 is the cause of the failure. Therefore, if the status of the THEN section 312 becomes normal, then it is expected that the problem of the IF section 311 also is resolved.

Each condition element 315 of the IF section 311 of the meta-rule 300 includes the fields for an apparatus type, a component type, and an event type. In the apparatus type of the condition element 315, data indicating the type of the management target apparatus that is related to the influence event, for example, "Server", "Storage", or the like, is stored. In the component type of the condition element 315, data indicating the type of the component that is related to the influence event, for example, "Disk drive", "Storage controller", "Logical volume", "Storage disk", or the like, is stored. If the influence event is not an event related to a component but an event related to a management target apparatus, "NULL", for example, is stored in the component type of the condition element 315. In the event type of the condition element 315, data indicating the type of the influence event, for example, "AverageSecPerXferError" which indicates a transfer time performance error, "IoResponseTimeError" which indicates an I/O response time exceeding error, and "DiskUtilizationError" which indicates a disk usage rate exceeding error, are stored.

The THEN section 312 of the meta-rule 300 also includes the fields for an apparatus type, a component type, and an event type, similarly to each condition element 315 of the IF section 311. In the apparatus type of the THEN section 312, data indicating the type of the management target apparatus that is related to the cause event is stored. In the component type of the THEN section 312, data indicating the type of the component that is related to the cause event is stored. If the cause event is not an event related to a component but an event related to a management target apparatus "NULL", for example, is stored in the component type of the THEN section 312. In the event type of the THEN section 312, data indicating the type of the cause event is stored.

Moreover, the meta-rule 300 includes a meta-rule ID 313, which is a field in which the identification information (meta-rule ID) for uniquely identifying the meta-rule 300 is stored. Moreover, the meta-rule 300 includes a topology acquisition method ID 314, which is a field in which the identification information (the method ID) of one or more topology acquisition methods that are correlated to the meta-rule 300 is stored. Since the topology data generated according to the one or more topology acquisition methods that are correlated to the meta-rule 300 is applied to the meta-rule 300, an expanded rule in which the meta-rule 300 is expanded in a format that is dependent on the actual configuration of the computer system is generated. It is noted that the same topology acquisition method may also be correlated to each of the plurality of meta-rules 300.

For example, the meta-rule 300A (the meta-rule 300 with the meta-rule ID as "MetaRule1") shown in FIG. 3A indicates that when a transfer time performance error that occurs in the disk drive of the server, an I/O response time exceeding error that occurs in the logical volume of the storage, and a disk usage rate exceeding error that occurs in the storage disk of the storage are detected as the observed events, and a CPU usage rate exceeding error that occurs in the storage controller of the storage is not detected, it is possible to conclude that the disk usage rate exceeding error that occurs in the storage disk of the storage is the cause. It is noted that the condition element 315 for which "Not CpuLoadError" is stored in the event type indicates that the non-occurrence of the failure event of the CPU usage rate exceeding error ("CpuLoadError") that occurs in the storage controller of the storage is the condition.

Moreover, when an expanded rule is generated for the meta-rule 300A, the topology acquisition method data corresponding to the method ID stored in the topology acquisition method ID 314 is acquired from the topology acquisition method repository 134. Moreover, the topology data required for generating the expanded rule from the meta-rule 300A is generated on the basis of the acquired topology acquisition method data and the information in the configuration management DB 132. The fact that the managed object is normal, that is, the fact that the failure event does not occur may be defined as the condition element 315 included in the IF section 311. Moreover, the cause event of the THEN section 312 may be a newly defined failure event, and may not be a failure event indicated by the event information received by the event reception program 122.

It is noted that some influence events are not failure events that occur in actuality in the managed objects, but are pseudo failure events (hereinafter, referred to as "intermediate events") that plays the role of joining together the plurality of meta-rules 300 after division so that the meta-rule 300 before division and the plurality of meta-rules after division become semantically equal. For example, the failure event "MidError1" that occurs in a meta-rule 300B of FIG. 3B and a meta-rule 300D of FIG. 3D is an intermediate event, and plays the role of joining together the meta-rule 300B and the meta-rule 300D. Moreover, since the meta-rule 300B includes the intermediate event of "MidError1" as the cause event, and the meta-rule 300D includes the intermediate event of "MidError1" as an influence event, when calculating the event reception rate of the expanded rule corresponding to the meta-rule 300D, it is regarded that each influence event of the expanded rule corresponding to the meta-rule 300B is included in the influence event of the expanded rule corresponding to the meta-rule 300D.

<Configuration Management DB>

The configuration management DB 132 stores the configuration management table that is generated on the basis of the configuration information which the configuration information acquisition program 124 acquires from the monitoring agents 141, 166, and 172, for example. The configuration management table includes information indicating the data input/output relationship, the connection relationship, and the dependence relationship, for example, between managed objects. It is possible to express the topology on the basis of the combination of these relations.

In the present embodiment, the configuration management table is created for each type of managed objects. The configuration management tables for the server, the FC switch, the storage, and each type of component included in these management target apparatuses are described using FIG. 4 through FIG. 13.

In the present embodiment, the name of the configuration management table indicates the type of the managed object whose configuration is shown by the configuration management table, and a single entry of each table indicates a single managed object. However, a configuration management table need not be created for each type of the managed object, and the information indicating the type of the managed object may be stored in each entry. Moreover, the information about a single managed object may be registered in a plurality of entries.

Moreover, in the present embodiment, the relation between the managed objects is expressed by making the values of the fields of each table as equal, however, a table in which the information about the relations is recorded may be prepared separately from the information of the managed objects.

It is noted that the configuration management tables shown in FIG. 4 through FIG. 13 are only examples, and do not imply that all fields are mandatory. In fact, a configuration having only some fields may be adopted, or a configuration having new fields that are not shown in FIG. 4 through FIG. 13 may also be adopted. Moreover, the data representation format and data structure of the configuration management tables may be different from the data representation format and data structure of the management target apparatuses. Also, the data that the management computer 101 receives from the management target apparatuses may be data having the data structure and data representation format of the management target apparatuses.

Furthermore, when the configuration of a managed object changes, the contents of the configuration management table are updated in response to the configuration change. When the contents of a configuration management table are updated, the information prior to the update may also be recorded, and referencing of the past configuration information by the history information may be enabled.

FIG. 4 is an example configuration of a server table according to the Embodiment 1.

A server table 400 is a configuration management table for the server. The server table 400 includes the fields for an apparatus ID 401 and a host name 402. In the apparatus ID 401, the apparatus ID assigned to the server 102 is stored. In the host name 402, the name (the host name) that the operation administrator uses for uniquely identifying the server 102 is stored.

FIG. 5 is an example configuration of an FC switch table according to the Embodiment 1.

The FC switch table 500 is a configuration management table for the FC switch. The FC switch table 500 includes the fields for an apparatus ID 501, a switch name 502, and a port number 503. In the apparatus ID 501, the apparatus ID assigned to the FC switch 105 is stored. In the switch name 502, the name (the switch name) that the operation administrator uses for uniquely identifying the FC switch 105 is stored. In the port number 503, data indicating the number of ports provided in the FC switch 105 is stored.

FIG. 6 is an example configuration of a storage table according to the Embodiment 1.

The storage table 600 is a configuration management table for the storage. The storage table 600 includes the fields for an apparatus ID 601 and a storage name 602. In the apparatus ID 601, the apparatus ID assigned to the storage 104 is stored. In the storage name 602, the name (the storage name) that the operation administrator uses for uniquely identifying the storage 104 is stored.

FIG. 7 is an example configuration of an HBA table according to the Embodiment 1.

The HBA table 700 is a configuration management table for the HBA. The HBA table 700 includes the fields for a component ID 701, a WWN 702, an apparatus ID 703, and a connection-destination target WWN 704.

In the component ID 701, the component ID assigned to the HBA 142 is stored. In the WWN 702, the WWN (Work Wide Name) allocated to the HBA 142 is stored. In the apparatus ID 703, the apparatus ID of the server 102 including the HBA 142 is stored. The apparatus ID stored in the apparatus ID 703 corresponds to the apparatus ID stored in the apparatus ID 401 of the server table 400. In the connection-destination target WWN 704, the WWN of the storage port 163 that the HBA 142 uses for mounting the logical volume 165 of the storage 104 is stored.

FIG. 8 is an example configuration of a disk drive table according to the Embodiment 1.

The disk drive table is a configuration management table for the disk drive 151. The disk drive table 800 includes the fields for a component ID 801, a drive name 802, an apparatus ID 803, an HBA_WWN 804, and an LUN_ID 806.

In the component ID 801, the component ID assigned to the disk drive 151 is stored. In the drive name 802, the name of the disk drive 151 is stored. In the apparatus ID 803, the apparatus ID of the server 102 on which the disk drive 151 is mounted is stored. In the HBA_WWN 804, the WWN of the HBA 142 used to access the disk drive 151 is stored. In the LUN_ID 806, the LUN of the logical volume 165 corresponding to the disk drive 151 is stored. Here, the LUN is the identification information used by the server 102 to identify the logical volume 165.

FIG. 9 is an example configuration of a logical volume table according to the Embodiment 1.

The logical volume table 900 is a configuration management table for a logical volume. The logical volume table 900 includes the fields for a component ID 901, a port number 902, an LUN_ID 903, an apparatus ID 904, a capacity 905, and a RAID group number 906.

In the component ID 901, the component ID assigned to the logical volume 165 is stored. In the port number 902, the port number of the storage port 163 that is used for providing the logical volume 165 is stored. Here, the port number is identification information for uniquely identifying the storage port 163 in the storage 104. In the LUN_ID 903, the LUN of the logical volume 165 is stored. In the apparatus ID 904, the apparatus ID of the storage 104 in which the logical volume 165 is formed is stored. In the capacity 905, data indicating the capacity of the storage area of the logical volume 165 is stored. In the RAID group number 906, the RAID group number of the RAID group 164 that provides the storage area for forming the logical volume 165 is stored. Here, the RAID group number is identification information for uniquely identifying the RAID group 164 in the storage 104.

FIG. 10 is an example configuration of a RAID group table according to the Embodiment 1.

The RAID group table 1000 is a configuration management table for a RAID group. The RAID group table 1000 includes the fields for a component ID 1001, a RAID group number 1002, an apparatus ID 1003, a capacity 1004, and a RAID level 1005.

In the component ID 1001, the component ID assigned to the RAID group 164 is stored. In the RAID group number 1002, the RAID group number assigned to the RAID group 164 is stored. In the apparatus ID 1003, the apparatus ID of the storage 104 that includes the RAID group 164 is stored. In the capacity 1004, data indicating the capacity of the storage area of the RAID group 164 is stored. In the RAID level 1005, the data indicating the RAID level of the RAID group 164 is stored.

FIG. 11 is an example configuration of a storage port table according to the Embodiment 1.

The storage port table 1100 is a configuration management table for a storage port. The storage port table 1100 includes the fields for a component ID 1101, a port number 1102, a WWN 1103, an apparatus ID 1104, an access-permitted WWN 1105, and a controller number 1106.

In the component ID 1101, the component ID assigned to the storage port 163 is stored. In the port number 1102, the port number assigned to the storage port 163 is stored. In the WWN 1103, the WWN allocated to the storage port 163 is stored. In the apparatus ID 1104, the apparatus ID of the storage 104 that includes the storage port 163 is stored. In the access-permitted WWN 1105, the WWN of the HBA 142 that is permitted to access the storage port 163 is stored. In the controller number 1106, the controller number of the storage controller 161 having a connection relationship with the storage port 163 is stored. Here, the controller number is identification information for uniquely identifying the storage controller 161 in the storage 104.

FIG. 12 is an example configuration of a storage disk table according to the Embodiment 1.

The storage disk table 1200 is a configuration management table for a storage disk. The storage disk table 1200 includes the fields for a component ID 1201, a disk number 1202, an apparatus ID 1203, and a RAID group number 1204.

In the component ID 1201, the component ID assigned to the storage disk 162 is stored. In the disk number 1202, identification information (a disk number) for uniquely identifying the storage disk 162 in the storage 104 is stored. In the apparatus ID 1203, the apparatus ID of the storage 104 that includes the storage disk 162 is stored. In the RAID group number 1204, the RAID group number of the RAID group 164 that includes the storage disk 162 is stored.

FIG. 13 is an example configuration of a storage controller table according to the Embodiment 1.

The storage controller table 1300 is a configuration management table for a storage controller. The storage controller table 1300 includes the fields for a component ID 1301, a controller number 1302, and an apparatus ID 1303.

In the component ID 1301, the component ID assigned to the storage controller 161 is stored. In the controller number 1302, the controller number assigned to the storage controller 161 is stored. In the apparatus ID 1303, the apparatus ID of the storage 104 that includes the storage controller 161 is stored.

In addition, the configuration management tables for other components, such as the configuration management table for the port 171 of the FC switch 105, are also included in the configuration management DB 132, but the description thereof is omitted here.

Figure 14:
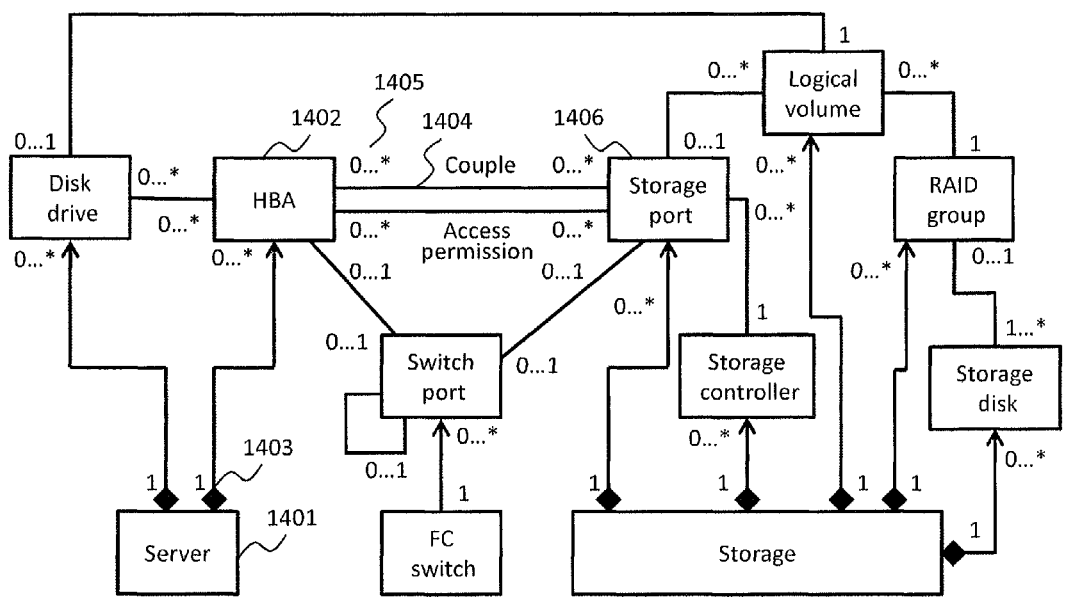
FIG. 14 is an example class showing a relation between types of managed objects according to the Embodiment 1.

FIG. 14 is an example class showing a relation between types of managed objects according to the Embodiment 1.

The class diagram expresses the relation between the types of managed objects, specifically, the class diagram expresses the data input/output relationship, connection relationship, dependence relationship, etc. The relation between the types of managed objects indicates that two managed objects belonging to each of the two types having the concerned relation may have the concerned relation. For example, when there exist a server "a" and a server "b" as managed objects (servers 102) with the type as server, and there exist an HBA "a" and an HBA "b" as managed objects (HBAs 142) with the type as HBA, the relation indicating that the server includes the HBA as a component indicates that the HBA "a" or the HBA "b" may become the components of the server "a" or the server "b". Furthermore, for example, when there exist an HBA "a" and an HBA "b" as managed objects (HBAs 142) with the type as HBA, and there exist a storage port "a" and a storage port "b" as managed objects (storage ports 163) with the type as storage port, the relation indicating that the HBA and the storage port have a connection relationship indicates that the HBA "a" or HBA "b", and storage port "a" or storage port "b" may have a connection relationship. It is noted that in the present embodiment, when two types of managed objects have a connection relationship, the two types of managed objects have a data input/output relationship.

In the present embodiment, the rectangles in the class diagram (the server 1401, the HBA 1402, the storage port 1406, etc.) represent the types of managed objects. Moreover, an arrow 1403 indicates that the type of the managed object coupled to the starting point of the arrow 1403 includes the type of the managed object coupled to the end point of the arrow 1403 as a component. Further, a connector 1404 indicates that the two types of managed objects connected at both ends of the connector 1404 have a mutual connection relationship. A multiplicity 1405 indicates the multiplicity of the relation shown by the arrow 1403 or the connector 1404. For example, in the relation indicating that the HBA and the storage port have a connection relationship, the multiplicity 1405 ("0 . . . *") indicating equal to or larger than 0 is added on both ends of the connector 1404 indicating the relation. This indicates that a plurality of storage ports 163 may have a connection relationship with a single HBA 142, and a plurality of HBAs 142 may have a connection relationship with a single storage port 163. It is possible to derive the respective relation between the types of managed objects from the configuration management tables of the configuration management DB 132.

<Relation Table>

FIG. 15 is an example configuration of a relation table according to the Embodiment 1.

In the relation table 133, information about the relation between the types of managed objects, that is, information about the arrow 1403 and the connector 1404 in the class diagram shown in FIG. 14 is stored. The relation table 133 shows the correspondence relationship of the fields between two configuration management tables, and when the value of the fields in which there is a correspondence relationship between two entries of each of the two configuration management tables is equal, it indicates that the two managed objects that each of the two entries indicates have a mutual relation.

By referencing the relation table 133, the management computer 101 is capable of acquiring the information of the managed object having a relation with the designated managed object from the configuration management DB 132. Each entry of the relation table 133 shows the information about the relation between two types of managed objects. Hereinafter, the relation between two types of managed objects that are managed by each entry of the relation table 133 is referred to as "unit relation". It is noted that a unit relation is not only a direct relation that does not pass through the other types of managed objects (hereinafter, referred to as "direct relation"), but may also be an indirect relation that passes through the other types of managed objects, that is, a relation that can be expressed by a combination of a plurality of direct relations (hereinafter, referred to as "indirect relation").

The relation table 133 includes the fields for a relation ID 1501, a table name X 1502, a field name X 1503, a table name Y 1504, a field name Y 1505, a simultaneous reference relation 1506, a change frequency 1507, and a number of times of changes 1508.

In the relation ID 1501, identification information (a relation ID) for uniquely identifying a unit relation indicated by an entry is stored. In the table name X 1502, data indicating one of the two types of managed objects (hereinafter, called "type X" in the explanation of FIG. 15) having the unit relation indicated by an entry is stored. In the field name X 1503, the field name of the field that is referenced for specifying the existence of a relation (hereinafter, called "field X" in the explanation of FIG. 15) in the configuration management table for the type X is stored. In the table name Y 1504, data indicating the type other than the type X of the two types of managed objects (hereinafter, called "type Y" in the explanation of FIG. 15) having the unit relation indicated by an entry is stored. In the field name Y 1505, the field name of the field that is referenced for specifying the existence of a relation (hereinafter, called "field Y" in the explanation of FIG. 15) in the configuration management table concerning the type Y is stored. For example, when the value of the field X of a certain entry X registered in the configuration management table for the type X, and the value of the field Y of a certain entry Y registered in the configuration management table for the type Y are equal, the managed object indicated by the entry X and the managed object indicated by the entry Y have a unit relation between the type X and the type Y. In the simultaneous reference relation 1506, a plurality of unit relations configuring a unit relation indicated by an entry when the unit relation indicated by the entry is an indirect relation, that is, the relation IDs of other relations referenced simultaneously when the existence of the correspondence relationship of the managed objects is investigated are stored.

In the change frequency 1507, data indicating the change frequency for the unit relation indicated by an entry is stored. Here, the change frequency for the unit relation between the type X and the type Y implies the frequency of change in the relation between the managed objects belonging to the type X and the managed objects belonging to the type Y. It is noted that changes in the relation between the managed objects include a change in the relation partner of the relation, and generation or deletion of the relation. The value of the change frequency 1507 is, for example, updated by the failure analysis program 123, each time a change event is detected. For example, it is possible to compute the change frequency by the formula shown below. However, the formula shown below is only an example, and the computation of the change frequency is not limited thereto.

Change frequency=(Aggregate number of times of changes in unit relation)/(Larger value of the number of managed objects belonging to type $X$ and the number of managed objects belonging to type $Y$)/(Period during which measurement of aggregate number of times of changes is executed in unit relation)

Here, the aggregate number of times of changes in the unit relation is the number of times that the relation between the managed objects belonging to the type X and the managed objects belonging to the type Y changes. In the number of times of changes 1508, the aggregate number of times of changes in the unit relation indicated by an entry is stored.

For example, the first entry 1511 from the top in FIG. 15 indicates that when the value of the apparatus ID 803 of a certain entry in the disk drive table 800, and the value of the apparatus ID 401 of a certain entry in the server table 400 are equal, the disk drive 151 and the server 102 indicated by each entry are related (in such a case, the disk drive 151 is a component of the server 102).

Moreover, in the simultaneous reference relation 1506 of the third entry 1513 from the top in FIG. 15, the relation IDs of three unit relations ("AS2", "AS17", and "AS10") are stored. In other words, the entry 1513 indicates that the unit relation indicated by the entry 1513 is an indirect relation expressed by a combination of the three unit relations. Moreover, the entry 1513 indicates that when the value of the LUN_ID 806 of a certain entry in the disk drive table 800, and the value of the LUN_ID 903 of a certain entry in the logical volume table 900 are equal, the disk drive 151 and the logical volume 165 indicated by each entry are related (in such a case, the disk drive 151 and the logical volume 165 have a connection relationship).

It is noted that in the present embodiment, an entry is prepared for each relation between two types of managed objects, however, the information about two or more relations may also be stored in a single entry. For example, as shown in the class diagram in FIG. 14, the logical volume and the storage disk do not have a direct relation. However, since the logical volume and the storage disk are related via a RAID group, the entry corresponding to the relation between the logical volume and the storage disk may be included in the relation table 133.

<Topology Acquisition Method Repository and Topology Acquisition Method>

Topology acquisition method data is data indicating a means of specifying a topology applicable to the meta-rule 300 on the basis of information in the configuration management DB 132, when generating an expanded rule on the basis of the meta-rule 300. Specifically, the topology acquisition method data is data indicating a path (or a part of the path) that links the types of managed objects that are related to the cause event of the meta-rule 300 and the types of managed objects that are related to any one of one or more influence events of the meta-rule 300 through a combination of one or more unit relations (relations of a connection relationship) (hereinafter, referred to as "path configuration group"). The connection configuration (hereinafter, referred to as "connection configuration within a rule") between the types of managed objects that are related to the cause event of the meta-rule 300 and each of the types of managed objects that are related to one or more influence events of the meta-rule 300 is indicated by a combination of one or more topology acquisition method data, or a combination of all components (unit relations) of one or more path configuration groups indicated by each of the one or more topology acquisition method data. Hereinafter, the combination of a plurality of unit relations indicating the connection configuration within a rule is referred to as "relation group". In other words, a relation group is a set of one or more path configuration groups. The connection configuration within a rule is expressed by a plurality of nodes corresponding to a plurality of types of managed objects that are related to the unit relations included in a relation group, and a plurality of links that join the nodes corresponding to the plurality of unit relations included in a relation group. The management computer 101, for example, extracts the managed object having the concerned unit relation for each of the unit relations included in a relation group, and specifically expresses each node of the connection configuration within a rule in the extracted managed object, which enables the management computer 101 to identify the topology corresponding to the connection configuration within a rule, that is, the topology applied to the meta-rule 300 having the connection configuration within the rule.

FIG. 16A is a diagram showing a first example of topology acquisition method data according to the Embodiment 1. FIG. 16B is a diagram showing a second example of topology acquisition method data according to the Embodiment 1. FIG. 16C is a diagram showing a third example of topology acquisition method data according to the Embodiment 1. FIG. 16D is a diagram showing a fourth example of topology acquisition method data according to the Embodiment 1.

As shown in FIG. 16A through FIG. 16D, topology acquisition method data 1600 includes the fields for a method ID 1601, a relation 1602, an upper relation 1603, an influence event-side table name 1604, and a cause event-side table name 1605.

In the method ID 1601, identification information (a method ID) for uniquely identifying the topology acquisition method is stored. In the relation 1602, the relation ID of one or more unit relations configuring the path configuration group is stored. The management computer 101, for example, specifies a plurality of managed objects having the unit relation indicated by the relation ID stored in the relation 1602 by referencing the information in the configuration management DB 132, and thus generates the topology data. In the upper relation 1603, the relation ID of the indirect relation configured by a plurality of unit relations indicated by any plurality of relation IDs to be stored in the relation 1602 (hereinafter, referred to as "upper relation") is stored. In the influence event-side table name 1604, data indicating the type of the managed object at the side of the influence event from among the two types of the managed objects having the unit relation indicated by the relation ID stored in the relation 1602 is stored. In the cause event-side table name 1605, data indicating the type of the managed object at the side of the cause event from among the two types of the managed objects having the unit relation indicated by the relation ID stored in the relation 1602 is stored.

It is noted that the topology acquisition method data 1600 may be referenced from a plurality of meta-rules 300.

For example, topology acquisition method data 1600A shown in FIG. 16A indicates that the topology acquisition method with the method ID of "Method1" is indicated, and by specifying the plurality of managed objects having the unit relation with each of the relation IDs of "AS3", "AS2", "AS17", "AS10", "AS12", and "AS15", respectively, it is possible to generate the topology data.

Moreover, for example, topology acquisition method data 1600D shown in FIG. 16D indicates that the topology acquisition method with the method ID as "Method4" is indicated, and by specifying the plurality of managed objects having the unit relation with each of the relation IDs of "AS12" and "AS15", it is possible to generate the topology data. For example, in a case when the topology acquisition method data 1600D indicates the connection configuration within a rule, when a logical volume "a" exists as the managed object with the type as logical volume (logical volume 165), a RAID group "a" exists as the managed object with the type as RAID group (RAID group 164), and a storage disk "a" exists as the managed object with the type as storage disk (storage disk 162) in the computer system, and the logical volume "a" and the RAID group "a" have the relation "AS12", and the RAID group "a" and the storage disk "a" have the relation "AS15", then the management computer 101 specifies a combination of the logical volume "a", the RAID group "a", and the storage device "a" as the topology corresponding to the connection configuration within a rule indicated by the topology acquisition method data 1600D.

In the topology acquisition method data 1600, identification information, such as data indicating the processes or operating procedures for specifying a topology on the basis of the one or more entries of the relation table 133 and the configuration management DB 132, for example, data that is defined by the programs and database query languages such as SQL, or information for specifying the location of storing the above-described data, may be stored.

For example, when the configuration management DB 132 is a relational database that is well-known in the art and it is possible to acquire the desired data according to the operating procedures defined by the SQL, the identification information of the SQL data indicating the operating procedures may be stored in the topology acquisition method data 1600. For example, as for the topology acquisition method 1600 shown in FIG. 16A, SQL data 1650A as shown in FIG. 16E may be generated on the basis of the correspondence relationship of the fields for the configuration management tables registered in the entries indicating each of the unit relations with the relation IDs 1501 of "AS3", "AS2", "AS17", "AS10", "AS12", and "AS15", respectively. The SQL data 1650A is SQL data for specifying the topology with the component ID 1201 of the storage disk table 1200 as the starting point.

It may be noted that the SQL data may be devised to improve the speed of a process. For example, the order of narrowing the entries acquired on the basis of the condition described in the WHERE clause of the SQL statement may be changed in accordance with the multiplicity between the configuration management tables. Moreover, in the data for specifying a topology in which the same type of managed objects (for example, the switch 103, 105, etc.) are connected in a multi-stage, for example, a definition such as "N*AS8" implying "Repeatedly pursuing the relation indicated by the entry corresponding to AS8 N times" may be included.

<Topology Repository and Topology>

Topology data is information indicating relationships among a plurality of managed objects that exist on a certain I/O path.

FIG. 17A is a diagram showing a first example of topology data according to the Embodiment 1. FIG. 17B is a diagram showing a second example of topology data according to the Embodiment 1. FIG. 17C is a diagram showing a third example of topology data according to the Embodiment 1.

As shown in FIG. 17A, the topology data 1700 includes the fields for a component 1711, a topology ID 1712, and a relation expanded rule ID 1713. The component 1711 includes a plurality of topology components 1714 corresponding to each of the plurality of managed objects that configure the topology. In each topology component 1714, information about the managed objects corresponding to the topology component 1714 is stored. Each topology component 1714 includes the fields for an apparatus ID 1701 and a component ID 1702. In the apparatus ID 1701, when the managed object configuring the topology is a management target apparatus, the apparatus ID of the management target apparatus is stored, and when the managed object configuring the topology is a component, the apparatus ID of the management target apparatus including the component is stored. In the component ID 1702, when the managed object configuring the topology is a management target apparatus, "NULL", for example, is stored and when the managed object configuring the topology is a component, the component ID of the component is stored. The topology data 1700 indicates that the plurality of managed objects indicated by the plurality of topology components 1714 are present on the same I/O path.

Moreover, in the topology ID 1712, identification information (a topology ID) for uniquely identifying the topology is stored. In the relation expanded rule ID 1713, identification information (an expanded rule ID) for uniquely identifying the expanded rule generated through the application of the topology is stored.

For example, topology data 1700A shown in FIG. 17A (the topology data 1700 having the topology ID as "Topology 3-1") indicates that the disk drive "DRIVE1" and the storage port "STPORT1" are related by a connection relationship, and the storage port "STPORT1" and the logical volume "VOL1" are related by a connection relationship, that is, the three managed objects are present on the same I/O path. Moreover, it is understood that by referencing the relation expanded rule ID 1713 of the topology data 1700A, and through the application of the topology indicated by the topology data 1700A to the meta-rule 300, an expanded rule with the expanded rule ID as "ExpandedRule2-1" is generated.

<Expanded Rule Repository and Expanded Rule>

An expanded rule is information that expands the meta-rules 300 in a format that is dependent on the actual configuration of the computer system, and is also information indicating a correspondence relationship between a cause event related to any one of the managed objects, and one or more influence events related to any one of the managed objects, where the influence events are a condition that the cause event results in a cause. The management computer 101 specifies the topology applicable to the meta-rule 300 on the basis of the information indicating the configuration of the computer system, and then generates an expanded rule by applying the specified topology to the meta-rule 300.

In the present embodiment, similarly to the meta-rule 300, an expanded rule is described in the IF-THEN format, but it is possible to use other formats as long as the cause event of the system failure and the observed event that is brought about by the cause event are described.

FIG. 18A is a diagram showing a first example of an expanded rule according to the Embodiment 1. FIG. 18B is a diagram showing a second example of an expanded rule according to the Embodiment 1. FIG. 18C is a diagram showing a third example of an expanded rule according to the Embodiment 1.

As shown in FIG. 18A, an expanded rule 1800 includes an IF section 1811 including one or more condition elements 1814 indicating influence events, and a THEN section 1812 indicating a cause event.

The expanded rule 1800 indicates that when one or more influence events indicated by each of the one or more condition elements 1814 of the IF section 1811 are detected, the cause event indicated by the THEN section 1812 is the cause of the failure. Therefore, if the status of the THEN section 1812 becomes normal, then it is expected that the problem of the IF section 1811 also is resolved. In the present embodiment, a failure analysis is performed by considering a failure event indicated by an entry registered in the failure event table 131A as an observed event.

Each condition element 1814 of the IF section 1811 of the expanded rule 1800 includes the fields for an apparatus ID 1801, a component ID 1802, an event type 1803, and a reception flag 1804. In the apparatus ID 1801 of the condition element 1814, the apparatus ID of the management target apparatus that is related to the influence event is stored. In the component ID 1802 of the condition element 1814, the component ID of the component related to the influence event is stored. If the influence event is not an event related to a component but an event related to a management target apparatus, "NULL", for example, is stored in the component ID 1802 of the condition element 1814. In the event type 1803 of the condition element 1814, data indicating the type of the influence event is stored. In the reception flag 1804 of the condition element 1814, data indicating the existence of detection of the influence event is stored. For example, in the reception flag 1804 of the condition element 1814, "1" is stored when an influence event is detected, and "0" is stored when an influence event is not detected. Moreover, when the influence event is an intermediate event, the highest value of the event reception rates of the other one or more expanded rules for which the intermediate event is the cause event is stored in the reception flag 1804 of the condition element 1814. It is noted that when a predetermined time elapses since storing "1" in the reception flag 1804 of the condition element 1814, a process for, for example, changing back the value of the reception flag 1804 to "0" may be performed.

Similarly to each condition element 1814 of the IF section 1811, the THEN section 1812 of the expanded rule 1800 also includes the fields for the apparatus ID 1801, the component ID 1802, the event type 1803, and the reception flag 1804. In the apparatus ID 1801 of the THEN section 1812, the apparatus ID of the management target apparatus that is related to the cause event is stored. In the component type 1802 of the THEN section 1812, the component ID of the component related to the cause event is stored. If the cause event is not an event related to a component but an event related to a management target apparatus, "NULL", for example, is stored in the component ID 1802 of the THEN section 1812. In the event type 1803 of the THEN section 1812, data indicating the type of the cause event is stored. In the reception flag 1804 of the THEN section 1812, the event reception rate of the expanded rule 1800, that is, data indicating the degree of confidence of the cause event of the expanded rule 1800 is stored. For example, the event reception rate of the expanded rule 1800 is computed by the formula below.

Event reception rate=Number of influence events for which "1" is stored in reception flag 1704/Total number of influence events It is noted that when the condition element 1814 indicating an intermediate event is included in the expanded rule 1800 to be computed, the event reception rate of the expanded rule 1800 to be computed is computed in consideration of the highest event reception rate of the event reception rates of the other one or more expanded rules 1800 for which the intermediate event is the cause event.

For example, with regard to an expanded rule 1800C shown in FIG. 18C, the total number of influence events, including the other expanded rules 1800 that are linked by an intermediate event, is four, and of these, the number of influence events for which "1" is stored in the reception flag 1704, including the other expanded rules 1800, is two, which results in an event reception rate of 2/4 (50%).

Moreover, the expanded rule 1800 includes a field 1813 for storing an expanded rule ID for uniquely identifying the expanded rule 1800.

For example, the expanded rule 1800A (the expanded rule 1800 having the expanded rule ID of "ExpandedRule2-1") shown in FIG. 18A indicates that when a transfer time performance error of the disk drive "DRIVE1" of the server A, and the intermediate event "MidError2" of the storage port "STPORT1" of the storage A are detected as observed events, it is possible to conclude that the intermediate event "MidError1" of the logical volume "VOL1" of the storage A is the cause. It is noted that the fact that the managed object is normal, that is, the fact that the failure event does not occur may be defined as the condition element 1814 included in the IF section 1811. It is noted that an intermediate event is not detected by itself, but here, the detection of an intermediate event implies that one or more influence events are detected for the expanded rule 1800 for which the intermediate event is the cause event.

<Meta-Rule Generation Process>

In the present embodiment, the management computer 101 receives an input, from a rule creator, of information indicating the cause of a failure that actually occurs in a management target system, and each failure event brought about by the cause, and then generates a meta-rule 300 on the basis of the entered information. As a result of information about the failure that actually occurs in the computer system being entered by the rule creator, the management computer 101 is capable of creating a more accurate meta-rule 300. In addition, by covering up the internal specifications of the failure analysis function as much as possible, it is possible to enter the information necessary for generating the meta-rule 300.

For example, when the management computer 101 does not output the correct analysis result for a failure that occurs in the computer system, it indicates that the meta-rule 300 is insufficient. When the cause becomes clear after the failure is resolved, the rule creator enters the information indicating the failure and its cause to generate a new meta-rule 300, which enables the management computer 101 to accurately specify the cause of the failure when the similar failure occurs in future.

Figure 19:
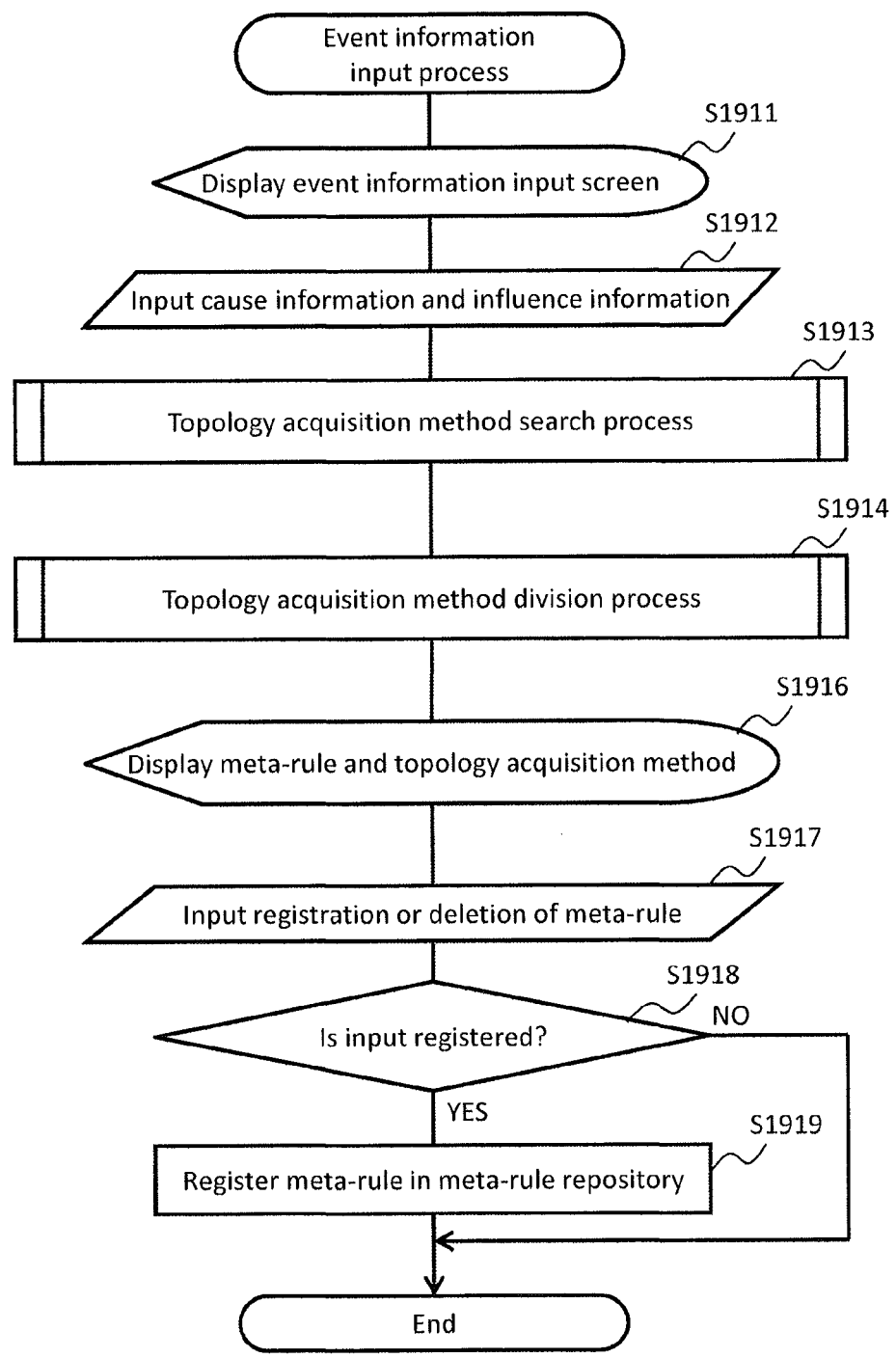
FIG. 19 is an example flowchart of an event information input process according to the Embodiment 1.

FIG. 19 is an example flowchart of an event information input process according to the Embodiment 1.

Upon receiving an indication for generating the meta-rule 300 from a rule creator via the input device 114, for example, the meta-rule generation program 121 executes an event information input process. In the event information input process, the meta-rule generation program 121 executes a topology acquisition method search process (see FIG. 21), a relation search process (see FIG. 22), a topology acquisition method division process (see FIG. 23), and a meta-rule generation process (see FIG. 24).

In step S1911, the meta-rule generation program 121 instructs the display module 125 to display an event information input screen to the output device 117. Here, the event information input screen will be described with reference to FIG. 20.

Figure 20:
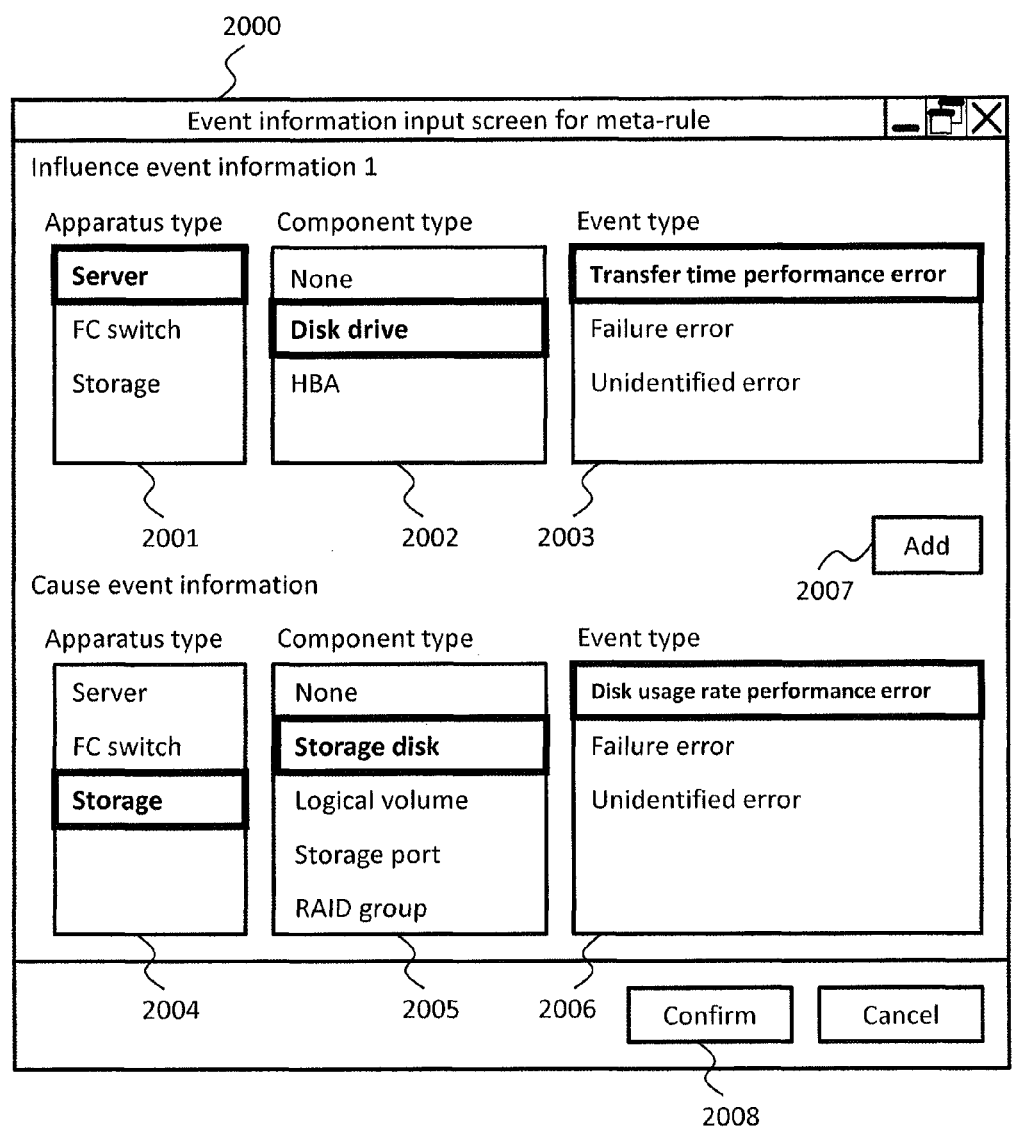
FIG. 20 is an example configuration of an event information input screen according to the Embodiment 1.

FIG. 20 is an example configuration of an event information input screen according to the Embodiment 1.

As illustrated in FIG. 20, for example, an event information input screen 2000 has an area for the input, by a rule creator, of information indicating a cause event (hereinafter, referred to as "cause information"), and information indicating one or more influence events (hereinafter, referred to as "influence information"), where the influence events are a condition that the cause event indicated by the cause information results in a cause. This area, for example, has list boxes 2001 to 2006 in which the types of management target apparatuses related to the influence events, the types of components related to the influence events, and the types of the influence events, as well as the types of the management target apparatuses related to the cause event, the types of the components related to the cause event, and the types of the cause events can be designated. Moreover, the area may be configured so that when a plurality of influence events are set, each time the rule creator clicks an Add button 2007, the information about the influence events designated in the list boxes 2001 to 2003 is added to the influence information.

Moreover, when a single type is designated in the list boxes 2001 and 2004 for designating the type of the management target apparatus, only the type of the components that may be included in the designated type of the management target apparatus may be displayed in the list boxes 2002 and 2005 for designating the type of components.

Furthermore, when the type of the management target apparatus and the type of the component is designated in the list boxes 2001, 2002, 2004, and 2005, only the type of events that may occur in the designated type of the management target apparatus and the designated type of the component may be displayed in the list boxes 2003 and 2006 for designating the type of events.

It is noted that by selecting the actually managed management target apparatus and the components thereof in the screen displaying the configuration information, the meta-rule generation program 121 may automatically derive the type of the management target apparatus and the type of components in the event information input screen 2000.

Returning to FIG. 19, in step S1912, the meta-rule generation program 121 receives the cause information and the influence information entered by the rule creator. Specifically, in the event information input screen 2000 of FIG. 20, when the rule creator designates an influence event and a cause event in the list boxes 2001 to 2006, and then clicks a Confirm button 2008, the meta-rule generation program 121 receives the influence information and cause information indicating the designated influence event and cause event. It is noted that a plurality of influence events may be selected. The influence information, for example, includes data indicating the type of the management target apparatus related to the influence event, data indicating the type of the component related to the influence event, and data indicating the type of the influence event. The cause information, for example, includes data indicating the type of the management target apparatus related to the cause event, data indicating the type of the component related to the cause event, and data indicating the type of the cause event. It is noted that when the influence event or the cause event is not an event related to a component, but an event related to a management target apparatus, the influence information or the cause information may not include data indicating the type of the component related to the influence event or the cause event.

In step S1913, the meta-rule generation program 121 uses the cause information and the influence information received in step S1912 as an input, executes the topology acquisition method search process, and acquires data indicating the correspondence relationship between one or more influence events indicated by the influence information, and the one or more generated topology acquisition method data 1600 (hereinafter, referred to as "correspondence relationship data").

In step S1914, the meta-rule generation program 121 uses the cause information and influence information acquired in step S1912, as well as the correspondence relationship data acquired in step S1913 as an input, and executes the topology acquisition method division process. The topology acquisition method division process is a process of dividing a generated topology acquisition method into a plurality of topology acquisition methods on the basis of a change frequency related to a unit relation, and then generating a plurality of meta-rules 300 in accordance with the result of division. It is noted that the plurality of meta-rules 300 thus generated, that is, a whole of the plurality of meta-rules, indicates the correspondence relationship between the cause event indicated by the cause information and one or more influence events indicated by the influence information.

In step S1916, the meta-rule generation program 121 displays the generated meta-rule 300 and the topology acquisition method on a screen and presents the same to a rule creator, and in step S1917, the meta-rule generation program 121 receives, from the rule creator, an indication for registering or an indication for discarding the generated meta-rule 300.

In step S1918, the meta-rule generation program 121 determines whether or not an indication for registration is received in step S1916. When the condition is satisfied, that is, when the indication for registration is received (step S1918: YES), the meta-rule generation program 121 advances the process to step S1919. On the other hand, when the condition is not satisfied, that is, when the indication for discarding is received (step S1918: NO), the meta-rule generation program 121 ends the event information input process.

In step S1919, the meta-rule generation program 121 registers the meta-rule 300 generated in step S1914 in the meta-rule repository 135. Following this, the meta-rule generation program 121 ends the event information input process.

Figure 21:
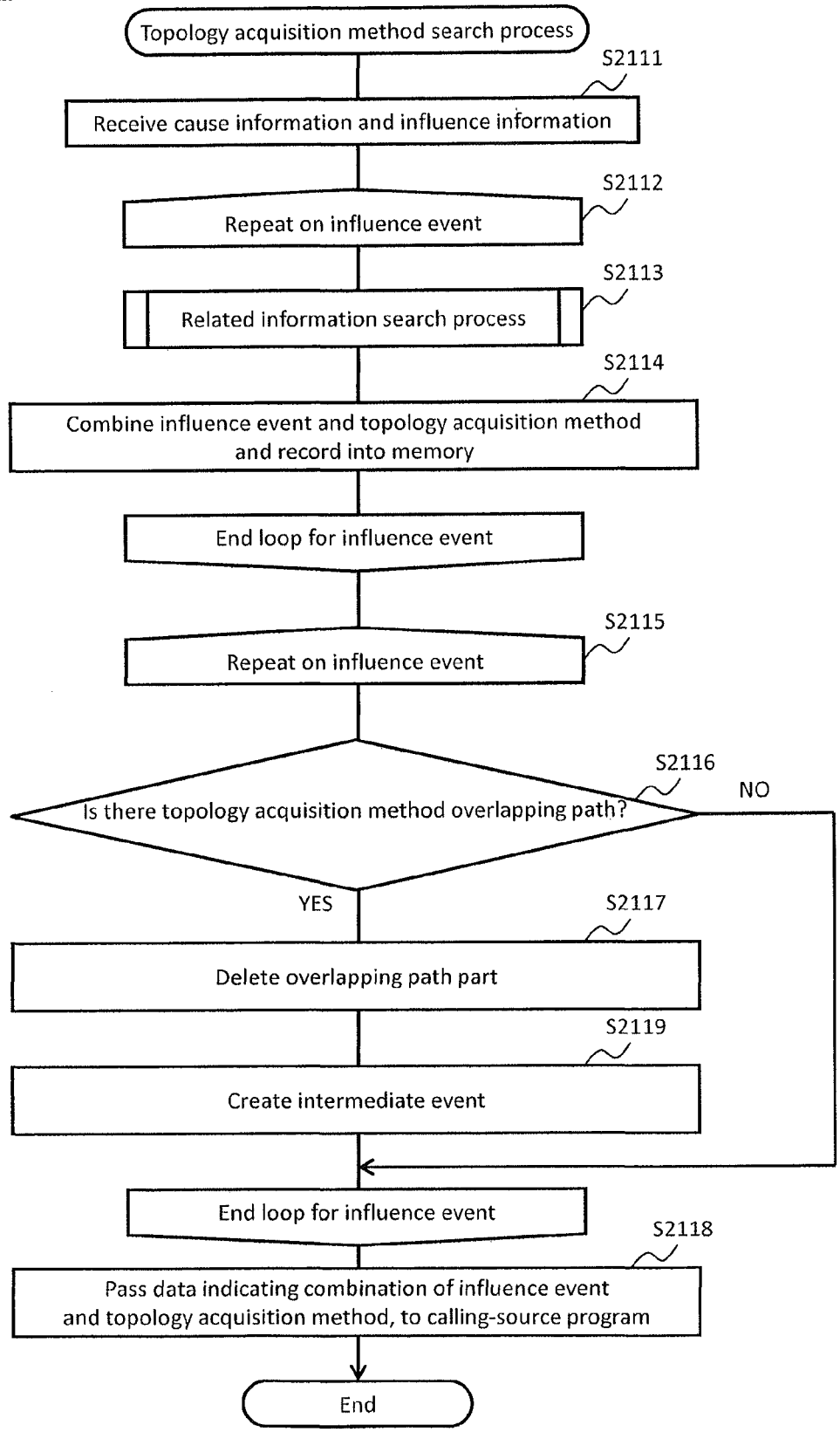
FIG. 21 is an example flowchart of a topology acquisition method search process according to the Embodiment 1.

FIG. 21 is an example flowchart of a topology acquisition method search process according to the Embodiment 1.

The topology acquisition method search program, which is a sub-program of the meta-rule generation program 121, generates one or more topology acquisition method data 1600 indicating a connection configuration between the type of the managed object related to the cause event indicated by the cause information entered as a parameter, and each of the types of the managed objects related to one or more influence events indicated by the influence information entered as a parameter, by referencing the relation table 133 in the topology acquisition method search process. Specifically, the topology acquisition method search program generates each of the topology acquisition method data 1600 by pursuing the unit relations registered in the relation table 133 up to the type of the managed object related to the cause event indicated by the cause information, with the type of the managed object related to each of the relevant influence events indicated by the influence information as a starting point.

In step S2111, the topology acquisition method search program receives the cause information and the influence information as parameters. The received parameters imply the cause information and the influence information received by the meta-rule generation program 121 in step S1912 of FIG. 19.

In step S2112, the topology acquisition method search program repeats the processes of step S2113 and step S2114 for each of the one or more influence events indicated by the influence information received in step S2111.

In step S2113, the topology acquisition method search program uses the cause information, the information indicating the type of the managed object related to the influence event to be processed (hereinafter, referred to as "influence object type information"), and the list for recording a relation ID as an input, and executes the relation search process. If the influence event to be processed is an event related to a component, the influence object type information, for example, includes data indicating the type of the component related to the influence event to be processed. Moreover, when the influence event to be processed is an event related to a management target apparatus, the influence object type information, for example, includes data indicating the type of the management target apparatus related to the influence event to be processed. In the relation search process, the relation search program, which is a sub-program of the meta-rule generation program 121, generates the topology acquisition method data 1600 by pursuing the relations up to the type of the managed object related to the cause event, with the type of the managed object related to the influence event to be processed as a starting point, on the basis of the relation table 133, and also records, in the memory 112, the generated topology acquisition method data 1600, that is, the topology acquisition method data 1600 for the influence event to be processed, as a search result memory.

In step S2114, the topology acquisition method search program correlates the topology acquisition method data 1600 generated by the relation search process, and the information indicating the influence event to be processed, and records the correlated data in the memory 112.

In step S2115, the topology acquisition method search program repeats the processes of step S2116, step S2117, and step S2119 for each of the one or more influence events indicated by the influence information received in step S2111.

In step S2116, the topology acquisition method search program determines whether or not an overlapping part of a path exists between a path indicated by the topology acquisition method data 1600 corresponding to the influence event to be processed, and a path indicated by the topology acquisition method data 1600 corresponding to an influence event other than the influence event to be processed. When the condition is not satisfied, that is, when an overlapping part of the path does not exist (step S2116: NO), the topology acquisition method search program returns the process to step S2115. On the other hand, when the condition is satisfied, that is, when an overlapping part of the path exists (step S2116: YES), the topology acquisition method search program advances the process to step S2117.

In step S2117, the topology acquisition method search program deletes the information about the unit relation corresponding to the overlapping part of the path from the topology acquisition method data 1600 corresponding to the influence event to be processed (hereinafter, referred to as "topology acquisition method data A"), or the topology acquisition method data 1600 for which an overlapping part of the path exists with respect to the topology acquisition method data A (hereinafter, referred to as "topology acquisition method data B"). It is noted that when the path indicated by the topology acquisition method data A contains the entire path indicated by the topology acquisition method data B, the topology acquisition method search program deletes the topology acquisition method data B from the memory 112. Moreover, when the path indicated by the topology acquisition method data B contains the entire path indicated by the topology acquisition method data A, the topology acquisition method search program deletes the topology acquisition method data A from the memory 112.

In step S2119, when a part of the path indicated by the topology acquisition method data A overlaps a part of the path indicated by the topology acquisition method data B, the topology acquisition method search program specifies the types of managed objects present at the border line between the overlapping part of the path and the non-overlapping part of the path from among the plurality of types of managed objects related to the path indicated by the topology acquisition method data A as the types of managed objects that are the contact points with the path indicated by another topology acquisition method data 1600 (hereinafter, "types of contact-point objects"). Then, the topology acquisition method search program generates contact-point object information including data indicating that the specified type of the managed object is the type of the contact-point object for a path configuration group indicated by each of the topology acquisition method data A and the topology acquisition method data B, respectively, and then stores the generated contact-point object information in the memory 112. Then, the topology acquisition method search program creates an intermediate event related to the specified type of the contact-point object. Although the management computer 101 is capable of arbitrarily setting the type for the intermediate event, for example, by managing information about the intermediate events created in the past, a type that is not duplicated with another type of the intermediate event that is already created is set.

In step S2118, the topology acquisition method search program passes data indicating the correspondence relationship between one or more influence events indicated by the influence information, and the one or more generated topology acquisition method data 1600 to a calling-source program of the topology acquisition method search process. Thereafter, the topology acquisition method search program ends the topology acquisition method search process.

Figure 22:
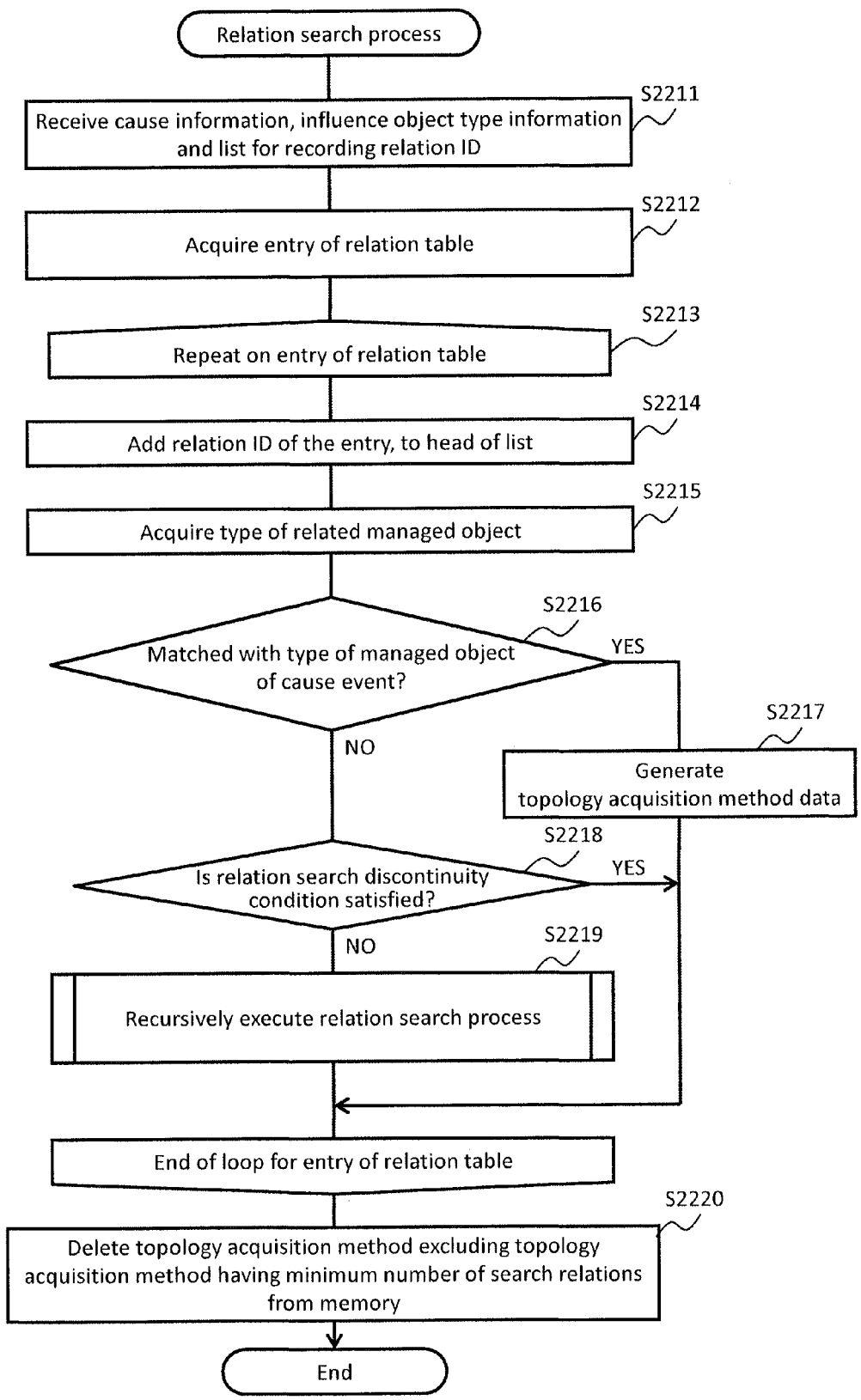
FIG. 22 is an example flowchart of a relation search process according to the Embodiment 1.

FIG. 22 is an example flowchart of a relation search process according to the Embodiment 1.

In the relation search process, on the basis of the relation table 133, the relation search program derives a combination of a plurality of unit relations (a path configuration group) indicating a path that joins the types of managed objects indicated by the received influence object type information, that is, the types of managed objects related to the influence event to be processed, and the types of managed objects related to the cause event indicated by the received cause information, and then generates the topology acquisition method data 1600 indicating the derived path configuration group.

In step S2211, the relation search program receives the cause information, the influence object type information, and the list for recording a relation ID, as parameters.

In step S2212, the relation search program acquires, from the relation table 133, all entries for which the data indicating the types of managed objects indicated by the influence object type information (hereinafter, referred to as "types of input objects") received in step S2211 is stored in the table name X 1502 or the table name Y 1504.

In step S2213, the relation search program repeats the processes of step S2214 to step S2219 for the entries of the relation table 133 acquired in step S2212.

In step S2214, the relation search program adds, to the list for recording a relation ID, the relation IDs stored in the relation ID 1501 of the entries of the relation table 133 to be processed (hereinafter, referred to as "target relation entries"), that is, the relation IDs of the unit relations indicated by the target relation entries.

In step S2215, the relation search program references the target relation entries, and specifies the type of the managed object that is different from the type of the input object from among the two types of managed objects stored in the table name X 1502 or the table name Y 1504 of the target relation entries, that is, the type of the managed object having a relation with the type of the input object (hereinafter, referred to as "type of the relation object").

In step S2216, the relation search program determines whether or not the type of the relation object specified in step S2215 matches the type of the component related to the cause event indicated by the received cause information (hereinafter, referred to as "type of the cause object"). When the condition is satisfied, that is, when the type of the relation object matches the type of the cause object (step S2216: YES), the relation search program advances the process to step S2217. On the other hand, when the condition is not satisfied, that is, when the type of the relation object does not match the type of the cause object (step S2216: NO), the relation search program advances the process to step S2218.

In step S2217, the relation search program generates the topology acquisition method data 1600 on the basis of the list for recording a relation ID, and records the generated topology acquisition method data 1600 in the memory 112 as the search result memory. It is noted that at this time point, the type of the managed object indicated by the influence object type information, that is, the relation ID of each of the one or more unit relations indicating the path that joins the type of the managed object related to the influence event to be processed, and the type of the cause object is recorded in the list for recording a relation ID. Moreover, the topology acquisition method data 1600 generated here is provisional data that is not yet registered in the topology acquisition method repository 134, and a provisional method ID (provisional method ID) is assigned to the topology acquisition method indicated by the generated topology acquisition method data 1600.

In step S2218, the relation search program investigates whether or not the discontinuity condition of the relation search is satisfied. If the relation search discontinuity condition is satisfied (step S2218: YES), the relation search program sets, as processing targets, the entries that have not yet been to be processed from among the entries of the relation table 133 acquired in step S2212, and performs the processes of step S2214 to step S2219. On the other hand, when the relation search discontinuity condition is not satisfied (step S2218: NO), the relation search program advances the process to step S2219. For example, the record of the same relation ID not less than the predetermined number of times in the list for recording a relation ID may be set as the relation search discontinuity condition. Moreover, in order to shorten the processing time of the topology acquisition method search process, some of the topology acquisition methods may not be searched, for example, when the number of the relation IDs recorded in the list for recording a relation ID exceeds a fixed number, the search may be discontinued thereafter.

In step S2219, the relation search program recursively executes the relation search process by using the received cause information, the information showing the type of the relation object specified in step S2215, and the list for recording a relation ID, as an input. It is noted that in the recursively executed relation search process, the types of the relation objects are handled as the types of the input objects.

In step S2220, of the one or more generated topology acquisition method data 1600, the relation search program deletes, from the memory 112, the topology acquisition method data 1600 excluding the topology acquisition method data 1600 having the minimum number of search relations, that is, the topology acquisition method data 1600 having the minimum number of unit relations included in the path configuration group indicated by the topology acquisition method data 1600. As a result of a process in step S2220, the topology acquisition method data 1600 for the influence event to be processed is narrowed to one. Following this, the relation search program ends the relation search process.

Hereinafter, the topology acquisition method search process and the relation search process will be described by citing specific examples.

For example, in step S2111, the topology acquisition method search program receives influence information indicating each of un-detections of an influence event of a transfer time performance error related to the disk drive of the server (an event A), an influence event of an I/O response time exceeding error related to the logical volume of the storage (an event B), an influence event of a disk usage rate exceeding error related to the storage disk of the storage (an event D), as well as an influence event of a CPU usage rate exceeding error related to the storage controller of the storage (an event C), respectively, and cause information indicating a cause event of the disk usage rate exceeding error related to the storage disk of the storage. It is noted that since the event D is the same as the cause event, it may not be included in the influence event indicated by the influence information. Moreover, since the event D is the same as the case event, and the path that joins the type of the managed object related to the event D and the type of the managed object related to the cause event does not exist, the topology acquisition method data 1600 corresponding to the event D is not generated.

If the event A of the transfer time performance error related to the disk drive of the server is selected in the repeat process of step S2112, the relation search program receives the cause information including data indicating the type of the managed object (the storage disk) related to the cause event, and the influence object type information indicating the type of the managed object (the disk drive) related to the event A to be processed, in step S2211.

In such a case, the relation search program acquires the entry 1511, the entry 1512, and the entry 1513 of the relation table 133 in step S2212. When the entry 1513 is selected in the repeat process of step S2213, the relation search program adds "AS3", which is the ID of the unit relation indicated by the entry 1513, in the list for recording a relation ID, in step S2214, and specifies the logical volume as the type of the relation object, in step S2215. In the determination in step S2216, since the type of the relation object (the logical volume) does not match the type of the cause object (the storage disk), the relation search program enters the cause information, the information indicating the type of the relation object (the logical table), and the list for recording a relation ID and recursively executes the relation search process, in step S2219.

In the repeat process of step S2213 of the relation search process executed recursively, when the relation search program selects an entry indicating the unit relation "AS12" (by that it means the unit relation having the relation ID of "AS12", and hereinafter, the similar expression will be used when a unit relation is specified by using the relation ID), and thereafter selects an entry indicating the unit relation "AS15" in the repeat process of step S2213 of the relation search process executed again recursively, the relation search program specifies the storage disk as the type of the relation object, in step S2215. In the determination in step S2216, since the type of the relation object (the storage disk) matches the type of the cause object (the storage disk), the relation search program advances the process to step S2217, and generates the topology acquisition method data 1600 on the basis of the list for recording a relation ID. At this time point, three relation IDs, that is, "AS3", "AS12", and "AS15" are recorded in the list for recording a relation ID. Therefore, the relation search program generates the topology acquisition method data 1600 that includes the information about the unit relations configuring the unit relation "AS 12", the unit relation "AS15", as well as the unit relation "AS3" which is an upper relation, that is, the information about the unit relation "AS2", the unit relation "AS17", and the unit relation "AS10", respectively, in other words, the topology acquisition method data 1600A shown in FIG. 16A. Then, the relation search program records the generated topology acquisition method data 1600A in the memory 112. In step S2114, the topology acquisition method search program correlates the event A to the generated topology acquisition method data 1600A.

Moreover, when the event B of the I/O response time exceeding error related to the logical volume of the storage is selected in the repeat process of step S2112, the relation search program generates the topology acquisition method data 1600 including information about each of the unit relation "AS12" and the unit relation "AS15", in step S2217. Here, since the path indicated by the topology acquisition method data 1600 that is generated for the event B, that is, the path that joins the logical volume and the storage disk is contained in the path indicated by the topology acquisition method data 1600A correlated to the event A, that is, the path that joins the disk drive and the storage disk, the path is deleted in step S2117. The topology acquisition method search program further correlates the event B to the topology acquisition method data 1600A correlated to the event A.

Moreover, when the un-detection of the event C of the CPU usage rate exceeding error that occurs in the storage controller of the storage is selected in the repeat process of step S2112, the relation search program generates the topology acquisition method data 1600 including information about each of the unit relation "AS18", the unit relation "AS10", the unit relation "AS12", and the unit relation "AS15", in step S2217. Here, the path indicated by the topology acquisition method data 1600 that is generated for the event C, that is, the path that joins the storage controller and the storage disk overlaps a part of the path that joins the storage port and the storage disk, in the distance up to the path indicated by the topology acquisition method data 1600A correlated to the event A, that is, the path that joins the disk drive and the storage disk. Therefore, in step S2117, the topology acquisition method search program deletes information about each of the three unit relations, that is, the unit relation "AS10", the unit relation "AS12", and the unit relation "AS15" indicating the path that joins the storage port and the storage disk, from the topology acquisition method data 1600 generated for the event C. As a result, the topology acquisition method data 1600 generated for the event C becomes topology acquisition method data 1600B shown in FIG. 16B. Moreover, in step S2119, the topology acquisition method search program specifies the storage port as the type of the contact-point object, and creates an intermediate event related to the storage port, for example, the "MidError2". The topology acquisition method search program correlates the event C with the topology acquisition method data 1600A and the topology acquisition method data 1600B.

It is noted that the meta-rule 300A shown in FIG. 3A corresponds to a meta-rule in which the four influence events shown in the specific example above, that is, the event A, the event B, the event C, and the event D are considered as the influence events, and the event D is considered as the cause event. In other words, the connection configuration within the rule of the meta-rule 300A is indicated by the one or more topology acquisition method data 1600 that is correlated to each of the event A, the event B, and the event C, that is, the topology acquisition method data 1600A and the topology acquisition method data 1600B. Therefore, the topology applied to the meta-rule 300A is specified on the basis of the topology acquisition method data 1600A and the topology acquisition method data 1600B.

It is noted that in the topology acquisition method search process of the present embodiment, the management computer 101 searches a path from the type of the managed object related to each influence event up to the type of the managed object related to the cause event, and then generates the topology acquisition method data 1600. For example, when the management computer 101 is searching the path corresponding to a certain influence event, and the path being searched is coupled to the path corresponding to another influence event (the path that is already connected up to the type of the managed object related to the cause event), the management computer 10 may perform the process that does not involve searching the paths thereafter, thereby improving the process speed.

Moreover, in step S2220, when narrowing the topology acquisition method data 1600 to one, the topology acquisition method data 1600 with the minimum number of search relations is selected as the single topology acquisition method data 1600 left in the end, but the topology acquisition method data 1600 left in the end may be selected on the basis on other judgment criteria as well. Further, the topology acquisition method data 1600 left in the end may be selected by the user through an interface, such as a GUI.

Figure 23:
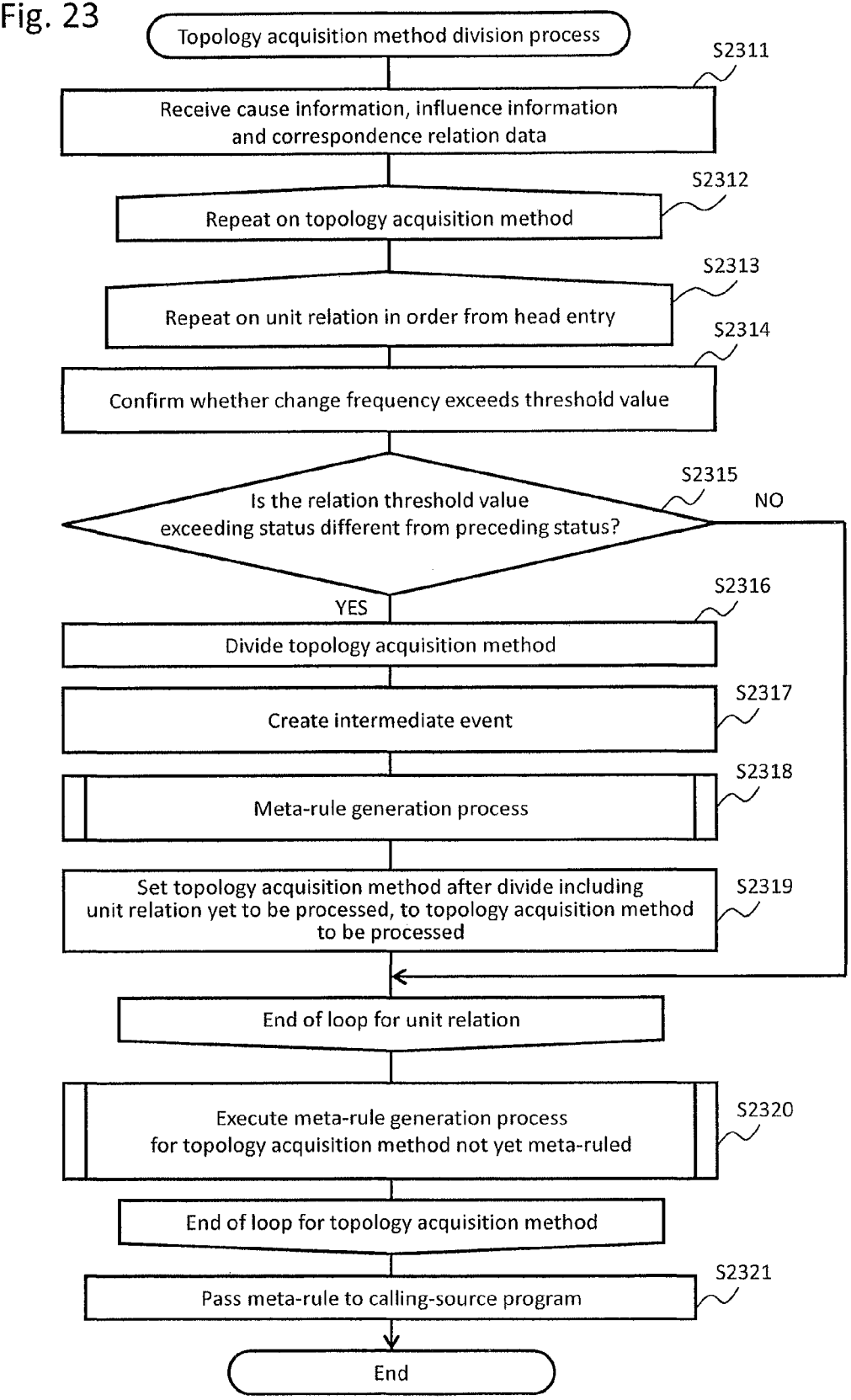
FIG. 23 is an example flowchart of a topology acquisition method division process according to the Embodiment 1.

FIG. 23 is an example flowchart of a topology acquisition method division process according to the Embodiment 1.

In the topology division process, the topology acquisition method is divided on the basis of the change frequency related to the unit relation, and the meta-rule 300 is generated according to the result of division.

In step S2311, the topology acquisition method division program, which is a sub-program of the meta-rule generation program 121, receives the cause information, the influence information, and the correspondence relationship data, as parameters.

In step S2312, the topology acquisition method division program repeats the processes of step S2313 to step S2320 for each of the one or more topology acquisition method data 1600 indicated by the correspondence relationship data received in step S2311.

In step S2313, for each of the plurality of unit relations included in the path configuration group indicated by the topology acquisition method data 1600 to be processed (hereinafter, referred to as "target topology acquisition method data") selected in step S2312, the topology acquisition method division program sequentially selects the unit relations starting from the unit relation related to one end point up to the unit relation related to the other end point of the path indicated by the target topology acquisition method data, according to the path, and repeats the processes of step S2314 to step S2319. It is noted that when the selected unit relation has an upper relation, the topology acquisition method division program selects the upper relation in place of the selected unit relation.

In step S2314, the topology acquisition method division program references the relation table 133, and checks whether or not the change frequency related to the unit relation selected in step S2313 (hereinafter, referred to as "target unit relation") exceeds a predetermined threshold value (hereinafter, referred to as "division threshold value").

In step S2315, when the change frequency related to the target unit relation exceeds the division threshold value, and the change frequency related to the unit relation selected immediately before the target unit relation (hereinafter, referred to as "preceding unit relation") does not exceed the division threshold value, or when the change frequency related to the target unit relation does not exceed the division threshold value, and the change frequency related to the preceding unit relation exceeds the division threshold value (step S2315: YES), the topology acquisition method division program executes the processes of step S2316 to step S2319. On the other hand, when the above-described condition is not applicable, or when the target unit relation is the unit relation that is selected first (step S2315: NO), the topology acquisition method division program does not execute the processes of step S2316 to step S2319, and advances the process to step S2213.

In step S2316, the topology acquisition method division program divides a combination of a plurality of unit relations configuring a path configuration group indicated by the target topology acquisition method data into a combination of one or more unit relations that are unit relations other than the target unit relation and are already selected in step S2313 (hereinafter, referred to as "first path configuration group"), and a combination of one or more other unit relations (hereinafter, referred to as "second path configuration group"). Then, the topology acquisition method division program divides the target topology acquisition method data into the topology acquisition method data 1600 that includes information about each of the one or more unit relations configuring the first path configuration group, and the topology acquisition method data 1600 including information about each of the one or more unit relations configuring the second path configuration group. It is noted that a new provisional method ID is assigned to the topology acquisition method indicated by the topology acquisition method data 1600 after division.

In step S2317, the topology acquisition method division program specifies the type of the managed object related to both the target unit relation and the preceding unit relation, that is, the type of the managed object that acts as the border line of division as the type of the contact-point object. Then, the topology acquisition method division program includes, in the contact-point object information, data indicating that the specified type of the managed object is the type of the contact-point object for the first path configuration group and the second path configuration group. Then, the topology acquisition method division program creates an intermediate event related to the specified type of the contact-point object. Although the management computer 101 is capable of arbitrarily setting the type for the intermediate event, for example, by managing information about the intermediate events created in the past, a type that is not duplicated with another type of the intermediate event that is already created is set.

In step S2318, the topology acquisition method division program executes the meta-rule generation process, and generates the meta-rule 300 for the topology acquisition method data 1600 corresponding to the first path configuration group. When executing the meta-rule generation process, the topology acquisition method division program enters the target meta-rule information including information indicating the one or more influence events and the cause event of the meta-rule 300 generated by the meta-rule generation process (hereinafter, referred to as "target meta-rule") and the provisional method ID of the topology acquisition method data 1600 correlated to the target meta-rule which is the topology acquisition method data 1600 corresponding to the first path configuration group herein.

For example, when the type of the managed object related to the cause event indicated by the cause information received in step S2311 (the type of the third managed object) is included in the combination (hereinafter, referred to as "group of types") of a plurality of types of managed objects related to the one or more unit relations configuring the first path configuration group, the topology acquisition method division program considers the cause event indicated by the cause information as the cause event of the target meta-rule. Moreover, when the type of the managed object related to the influence event indicated by the influence information received in step S2311 is included in the group of types, the topology acquisition method division program considers the influence event as one of the influence events of the target meta-rule.

Moreover, for example, when the type of the contact-point object (the type of the fourth managed object), and the type of the managed object related to the cause event indicated by the cause information are included in the group of types, the topology acquisition method division program considers the intermediate event related to the type of the contact-point object as one of the influence events of the target meta-rule. Further, when one type of the contact-point object is included in the group of types, and the type of the managed object related to the cause event indicated by the cause information is not included in the group of types, the topology acquisition method division program considers the intermediate event related to the type of the contact-point object as the cause event of the target meta-rule. Moreover, when a plurality of types of the contact-point object are included in the group of types, and the type of the managed object related to the cause event indicated by the cause information is not included in the group of types, the topology acquisition method division program sets the intermediate event related to the type of the contact-point object having the minimum number of unit relations (the type of the fifth managed object) that lies between the type of the managed object related to the cause event indicated by the cause information, from among the plurality of types of the contact-point object, as the cause event of the target meta-rule, and the intermediate event related to the other types of the contact-point object as one of the influence events of the target meta-rule.

It is noted that whether or not the type of the managed object included in the group of types is a type of the contact-point object is determined by referencing the contact-point object information stored in the memory 112, for example.

In step S2319, the topology acquisition method division program executes the processes of step S2313 to step S2319 by considering the topology acquisition method data 1600 corresponding to the second path configuration group as the target topology acquisition method data.

After ending the processes for all unit relations included in the path configuration group indicated by the target topology acquisition method data, in step S2320, the topology acquisition method division program executes the meta-rule generation process, and generates a meta-rule 300 for the topology acquisition method data 1600 corresponding to the second path configuration group that remains in the end. The method of deciding the cause event and the influence event of the meta-rule 300 generated here is similar to the method used when a meta-rule 300 is generated for the topology acquisition method data 1600 corresponding to the first path configuration group.

After ending the process for each of the one or more topology acquisition method data 1600 indicated by the correspondence relationship data, in step S2321, the topology acquisition method division program passes the information indicating the generated meta-rule 300 to the calling-source program.

For example, in step S2311, the topology acquisition method division program receives cause information indicating a cause event of a disk usage rate exceeding error related to the storage disk of the storage, and influence information indicating each of un-detections of an influence event of a transfer time performance error related to the disk drive of the server (the event A), an influence event of an I/O response time exceeding error related to the logical volume of the storage (the event B), and an influence event of a CPU usage rate exceeding error related to the storage controller of the storage (the event C), respectively. Moreover, the topology acquisition method division program receives the correspondence relationship data indicating the correspondence relationship of the event A, the event B, and the event C with the topology acquisition method 1600A shown in FIG. 16A, as well as the correspondence relationship of the event C with the topology acquisition method 1600B shown in FIG. 16B.

If the topology acquisition method 1600A shown in FIG. 16A is selected in the repeat process of step S2312, the topology acquisition method division program checks the change frequency related to each of the unit relation "AS3", the unit relation "AS12", and the unit relation "AS15", respectively, in order starting from the unit relation "AS3", for example, in step S2314. If the division threshold value is assumed to be 50, the change frequency related to each of the unit relation "AS12" and the unit relation "AS15" does not exceed the division threshold value, but the change frequency related to the unit relation "AS3" exceeds the division threshold value (see FIG. 15). Therefore, when the unit relation "AS12" is selected in step S2313, the topology acquisition method division program advances the process to step S2316.

In step S2316, the topology acquisition method division program divides a combination of the unit relation "AS3", the unit relation "AS12", and the unit relation "AS15" into a first path configuration group having the already-selected unit relation "AS3" other than the unit relation "AS12", which is the target unit relation, as the component, and a second path configuration group having the other unit relations, that is, the unit relation "AS12" and the unit relation "AS15" as the components. Then, in step S2317, the topology acquisition method division program specifies the logical volume related to both the unit relation "AS3" and the unit relation "AS12" as the type of the contact-point object, and creates an intermediate event related to the logical volume, for example, the "MidError1". Following this, in step S2318, the topology acquisition method division program generates a meta-rule 300 for the topology acquisition method data 1600 corresponding to the first path configuration group, that is, the topology acquisition method data 1600C shown in FIG. 16C. As a result, for example, the meta-rule 300B shown in FIG. 3B is generated.

Following this, the topology acquisition method division program executes the processes of step S2313 to step S2319 by considering the topology acquisition method data 1600 corresponding to the second path configuration group, that is, the topology acquisition method data 1600D shown in FIG. 16D as the target topology acquisition method data. In the repeat process hereinafter, since the result of determination in step S2315 is not affirmative, the topology acquisition method data 1600D is not divided. In step S2320, the topology acquisition method division program generates a meta-rule 300 for the topology acquisition method data 1600 corresponding to the second path configuration group that remains in the end, that is, the topology acquisition method data 1600D. As a result, for example, the meta-rule 300D shown in FIG. 3D is generated.

Further, when the topology acquisition method 1600B shown in FIG. 16B is selected in the repeat process of step S2312, only a single unit relation is included in the path configuration group indicating the topology acquisition method 1600B, because of which the topology acquisition method 1600B is not divided. In step S2320, the topology acquisition method division program generates a meta-rule 300 for topology acquisition method data 1600B. As a result, for example, a meta-rule 300C shown in FIG. 3C is generated.

Finally, the topology acquisition method division program passes information indicating the generated meta-rule 300B, meta-rule 300C, and meta-rule D to the calling-source program.

It is noted that in the present embodiment, in order to determine whether or not to divide the topology, it is checked whether or not the change frequency related to the unit relation exceeds the division threshold value, however, the user may set beforehand the high and low values of the change frequency for each unit relation in the form of flags. In such a case, for example, the change frequency 1507 of the relation table 133 becomes the flag indicating the high and low values of the change frequency.

Figure 24:
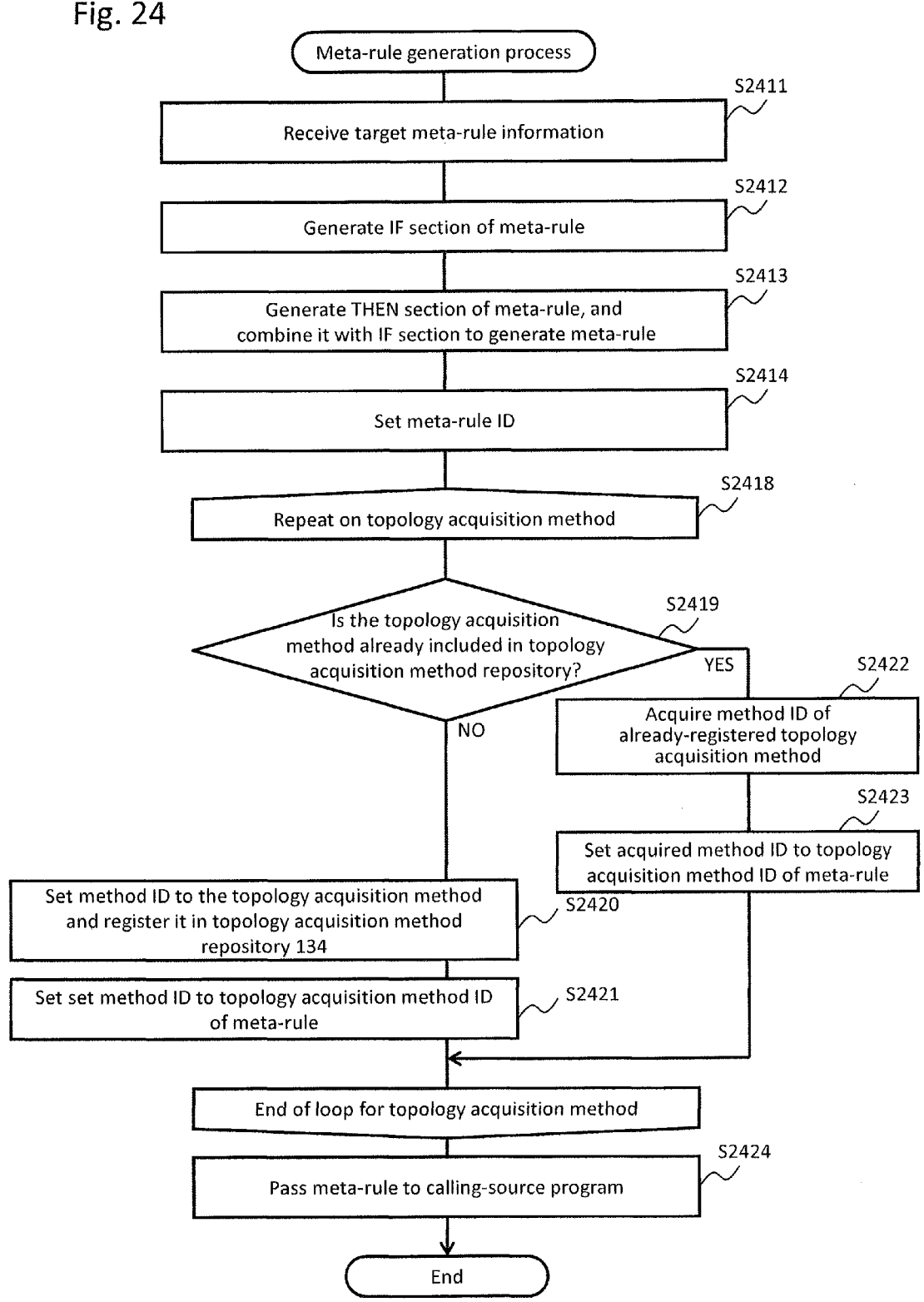
FIG. 24 is an example flowchart of a meta-rule generation process according to the Embodiment 1.

FIG. 24 is an example flowchart of a meta-rule generation process according to the Embodiment 1.

In step S2411, the meta-rule generation program 121 receives the target meta-rule information including information indicating the one or more influence events and the cause event of the target meta-rule, and the provisional method ID of the topology acquisition method data 1600 correlated to the target meta-rule, as a parameter.

In step S2414, the meta-rule generation program 121 generates the IF section 311 in which the one or more influence events and the cause event, respectively, indicated by the target meta-rule information are the influence events.

In step S2413, the meta-rule generation program 121 generates the THEN section 312 in which the cause event indicated by the target meta-rule information is the cause event, and then generates the target meta-rule by combining the THEN section 312 with the IF section 311 generated in step S2412.

In step S2414, the meta-rule generation program 121 assigns a meta-rule ID to the target meta-rule, and sets the assigned meta-rule ID to the meta-rule ID 313.

In step S2418, the meta-rule generation program 121 repeats the processes in step S2419 to step S2421 for each of the one or more topology acquisition method data 1600 indicated by one or more provision method IDs included in the target meta-rule information.

In step S2419, the meta-rule generation program 121 determines whether or not the topology acquisition method data 1600 to be processed is included in the topology acquisition method repository 134. When the condition is satisfied, that is, when the topology acquisition method data 1600 to be processed is included in the topology acquisition method repository 134 (step S2419: YES), the meta-rule generation program 121 advances the process to step S2422. On the other hand, when the condition is not satisfied, that is, when the topology acquisition method data 1600 to be processed is not included in the topology acquisition method repository 134 (step S2419: NO), the meta-rule generation program 121 advances the process to step S2420.

In step S2420, the meta-rule generation program 121 assigns a formal method ID to the topology acquisition method indicated by the topology acquisition method data 1600 to be processed, and registers the topology acquisition method data 1600 to be processed in the topology acquisition method repository 134.

In step S2421, the meta-rule generation program 121 stores, in the topology acquisition method ID 314 of the target meta-rule, the method ID assigned to the topology acquisition method indicated by the topology acquisition method data 1600 to be processed in step S2420.

Moreover, when the meta-rule generation program 121 advances the process to step S2422 in step S2419, then in step S2422, the meta-rule generation program 121 specifies the topology acquisition method data 1600 that is same as the topology acquisition method data 1600 to be processed from among the topology acquisition method data 1600 registered in the topology acquisition method repository 134, and acquires the method ID stored in the method ID 1601 of the specified topology acquisition method data 1600.

In step S2423, the meta-rule generation program 121 stores, in the topology acquisition method ID 314 of the target meta-rule, the method ID acquired in step S2422.

Following this, in step S2424, the meta-rule generation program 121 passes information indicating the target meta-rule to the calling-source program of the meta-rule generation process. It is noted that when an overlapping part exists between the paths indicated by a plurality of the topology acquisition method data 1600 corresponding to each of the plurality of method IDs stored in step S2421 or step S2423, the meta-rule generation program 121 may delete or change the topology acquisition method data 1600 so that the overlapping part is removed.

For example, in step S2411, upon receiving the target meta-rule information indicating the influence event of the transfer time performance error related to the disk drive of the server, the influence event of the intermediate event "MidError2" related to the storage port of the storage, and the cause event of the intermediate event "MidError1" related to the logical volume of the storage, the meta-rule generation program 121 generates the meta-rule 300B shown in FIG. 3B.

<Failure Analysis Process>

Figure 25A:
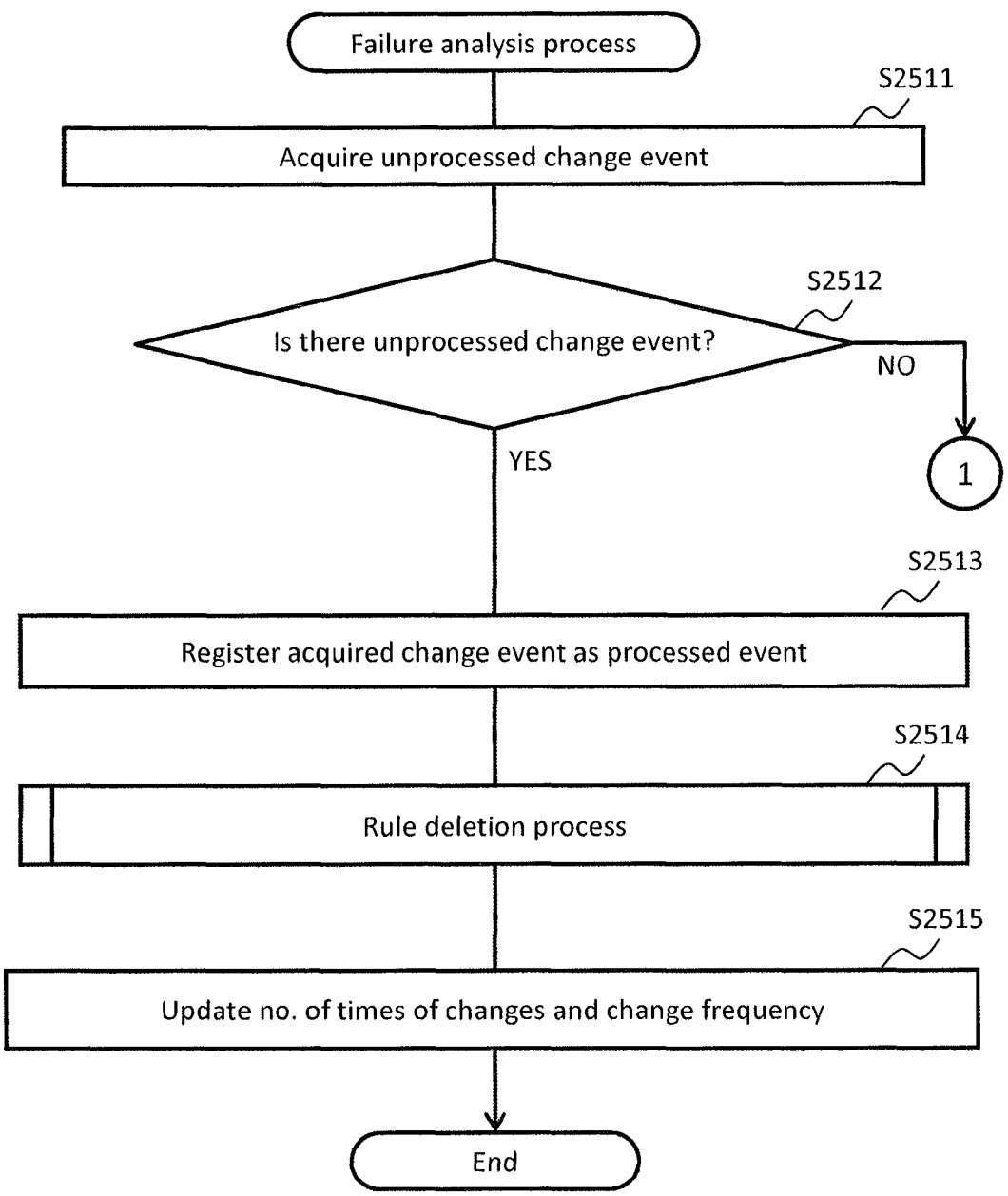
FIG. 25A is a first flowchart of an example of a failure analysis process according to the Embodiment 1.
Figure 25B:
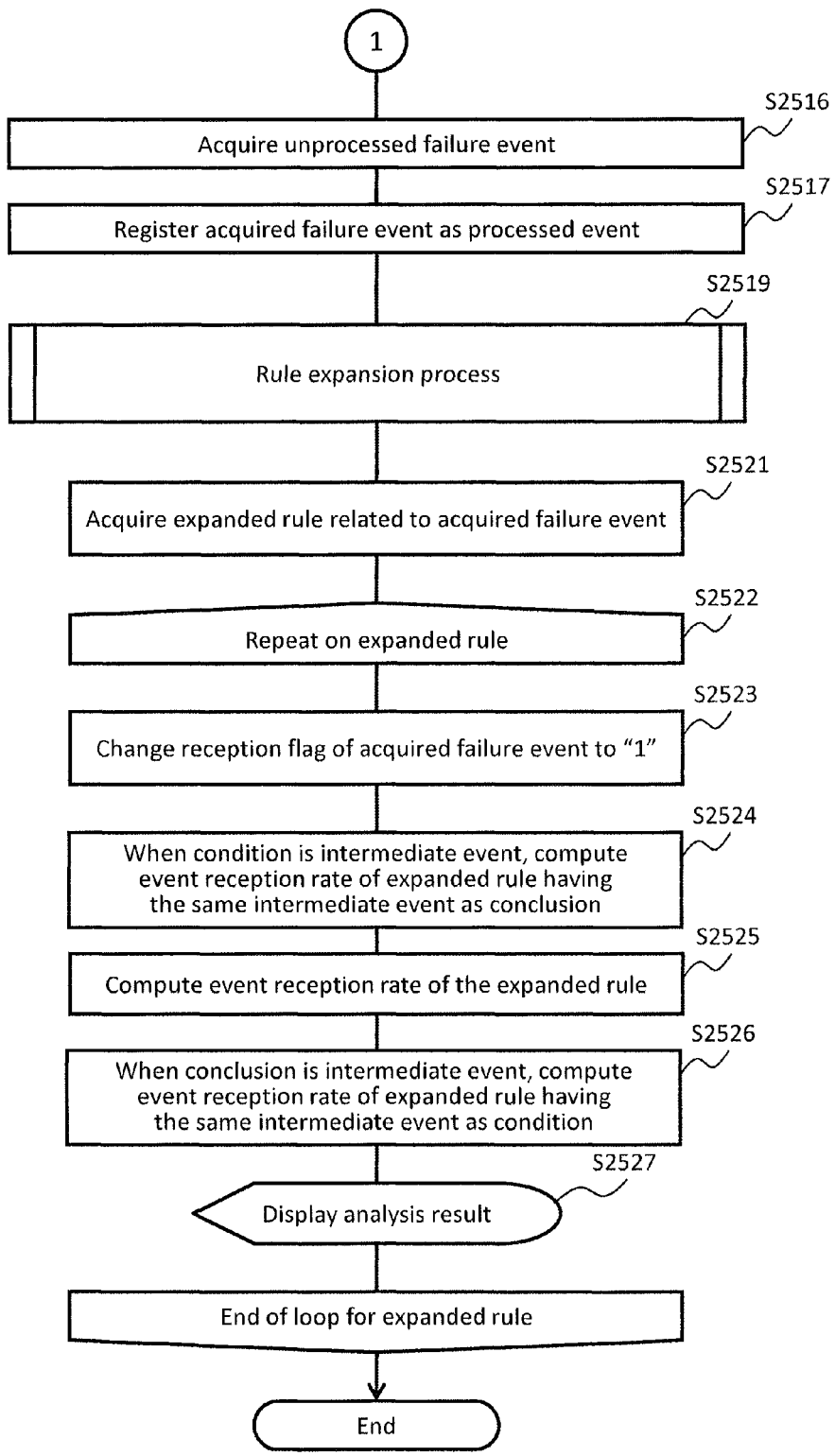
FIG. 25B is a second flowchart of an example of a failure analysis process according to the Embodiment 1.

FIG. 25A is a first flowchart of an example of a failure analysis process according to the Embodiment 1. FIG. 25B is a second flowchart of an example of a failure analysis process according to the Embodiment 1.

The failure analysis program 123, for example, starts the failure analysis process upon being called after the event reception program 122 receives the event information from a management target apparatus, and writes the event information into the event table 131.

On the basis of the received event and the meta-rule 300 in the meta-rule repository 135, the failure analysis program 123 generates the required expanded rule 1700, and executes the failure analysis process for presenting the cause candidate of the failure and the influence range thereof to the operation administrator. Moreover, the failure analysis program 123 deletes the expanded rules 1700 that are no longer needed from the expanded rule repository 136, on the basis of the received event.

In step S2511 of FIG. 25A, the failure analysis program 123 acquires, from the change event table 131B, the entry indicating the unprocessed change event. For example, the failure analysis program 123 acquires the entry of the change event having the oldest occurrence date and time from among the change events having the processed flag 256 as "NO" in the change event table 131B.

In step S2512, the failure analysis program 123 determines whether or not an unprocessed change event can be acquired (whether or not an entry showing an unprocessed change event can be acquired). If an unprocessed change event can be acquired (step S2512: YES), the failure analysis program 123 advances the process to step S2513. If an unprocessed change event can not be acquired (step S2512: NO), the failure analysis program 123 advances the process to step S2516 of FIG. 25B.

In step S2513, the failure analysis program 123 registers the change event acquired in step S2511 (the change event indicated by the entry acquired in step S2511) as a processed change event. Specifically, the failure analysis program 123 changes the processed flag 256 of the change event table 131B from "No" to "Yes".

In step S2514, the failure analysis program 123 uses the identification information of the change event acquired in step S2511 as an input to execute the rule deletion process. As a result of the rule deletion process, an expanded rule 1800 inconsistent with the information in the configuration management DB 132 after the configuration thereof is changed is specified from the one or more expanded rules 1800 stored in the expanded rule repository 136, and the specified expanded rule 1800 is deleted from the expanded rule repository 136.

In step S2515, the failure analysis program 123 acquires the component ID stored in the component ID 253 of the entry indicating the change event acquired in step S2511 in the change event table 131B. Then, in the relation table 133, the failure analysis program 123 acquires the entry for which the data indicating the type of the component corresponding to the acquired component ID is stored in the table name X 1502 or the table name Y 1504. Then, the failure analysis program 123 updates the aggregate number of times of changes in the unit relation and the change frequency related to the corresponding unit relation indicated by the acquired entry.

It is noted that in step S2515, when "NULL" is stored in the component ID 253 of the entry indicating the change event acquired in step S2511 in the change event table 131B, the failure analysis program 123 acquires the apparatus ID stored in the apparatus ID 252 of the entry. Then, in the relation table 133, the failure analysis program 123 acquires the entry for which the data indicating the type of the management target apparatus corresponding to the acquired apparatus ID is stored in the table name X 1502 or the table name Y 1504. Then, the failure analysis program 123 updates the aggregate number of times of changes in the unit relation and the change frequency related to the corresponding unit relation indicated by the acquired entry. Following this, the failure analysis program 123 ends the failure analysis process.

In step S2516 of FIG. 25B, the failure analysis program 123 acquires, from the failure event table 131A, the entry indicating the unprocessed failure event. For example, the failure analysis program 123 acquires the entry of the failure event having the oldest occurrence date and time from among the failure events having the processed flag 206 as "NO" in the failure event table 131A.

In step S2517, the failure analysis program 123 registers the failure event acquired in step S2516 (the failure event indicated by the entry acquired in step S2516) as a processed failure event. Specifically, the failure analysis program 123 changes the processed flag 206 of the failure event table 131A from "No" to "Yes".

In step S2519, the failure analysis program 123 enters the apparatus ID of the management target apparatus related to the failure event acquired in step S2516, the component ID of the component related to the failure event, and information indicating the type of the failure event, and executes the rule expansion process. As a result of the rule expansion process, the expanded rule 1800 that is used in the cause analysis of the failure event acquired in step S2516, and that is not stored in the expanded rule repository 136 is generated, and the generated expanded rule 1800 is stored in the expanded rule repository 136.

In step S2521, the failure analysis program 123 acquires, from the expanded rule repository 136, one or more expanded rules 1800 that include the failure event acquired in step S2516 as an influence event.

In step S2522, the failure analysis program 123 repeats the processes of step S2523 to step S2527 for each of the one or more expanded rules acquired in step S2521.

In step S2523, the failure analysis program 123 changes to "1", the reception flag 1804 of the condition element 1814 indicating the failure event acquired in step S2516 in the expanded rule 1800 to be processed.

In step S2524, when an influence event, which is an intermediate event, is included in the expanded rule 1800 to be processed, the failure analysis program 123 acquires, from the expanded rule repository 136, an expanded rule 1800 for which the intermediate event is the cause event, and computes the event reception rate of the acquired expanded rule 1800.

In step S2525, the failure analysis program 123 computes the event reception rate of the expanded rule 1800 to be processed. If an influence event, which is an intermediate event, is included in the expanded rule 1800 to be processed, the failure analysis program 123 computes the event reception rate of the expanded rule 1800 to be processed in consideration of the event reception rate computed in step S2524.

In step S2526, when the cause event of the expanded rule 1800 to be processed is an intermediate event, the failure analysis program 123 acquires, from the expanded rule repository 136, an expanded rule 1800 in which the intermediate event is included as an influence event, and computes the event reception rate of the acquired expanded rule 1800.

In step S2527, when the cause event of the expanded rule 1800 to be processed is an intermediate event, the failure analysis program 123 starts the display module 125, sets the cause event of the expanded rule 1800 acquired in step S2526 as the cause candidate, sets the influence event of the expanded rule 1800 to be processed, and the influence event of the expanded rule 1800 acquired in step S2526 as the influence range for the cause candidate, and in addition, sets the event reception rate calculated in step S2526 as the degree of confidence of the cause candidate, and displays the above on the output device 117 as analysis results.

On the other hand, when the cause event of the expanded rule 1800 to be processed is not an intermediate event, the failure analysis program 123 starts the display module 125, sets the cause event of the expanded rule 1800 to be processed as the cause candidate of the failure, sets the influence event of the expanded rule 1800 to be processed as the influence range for the cause candidate, and in addition, sets the event reception rate calculated in step S2525 as the degree of confidence of the cause candidate, and displays the above on the output device 117 as analysis results. It is noted that when an influence event, which is an intermediate event, is included in the expanded rule 1800 to be processed, the influence event of the expanded rule 1800 that uses the intermediate event as the cause event is also included in the influence range for the cause candidate. Moreover, when the cause event is already displayed on the output device 117 as the cause candidate, the higher event reception rate may be displayed. Following this, the failure analysis program 123 ends the failure analysis.

As described above, as a result of the failure analysis process executed by the failure analysis program 123, when a failure occurs in a computer system, the management computer 101 is capable of automatically deriving the cause candidate of the failure and the influence range thereof, and presenting the same to the operation administrator.

It is noted that in order to improve the speed of the failure analysis process, the management computer 101 may create an expansion history for understanding whether or not the expanded rule 1800 to be generated is already included in the expanded rule repository 136, before generating the expanded rule 1800 in step S2519.

Moreover, a well-known art for improving the speed of the failure analysis process (for example, the technology disclosed in Japanese Unexamined Patent Application Publication No. 2011-518359) may be applied. Moreover, rather than generating the expanded rule 1800 each time a failure event is received, the management computer 101 may generate all expanded rules 1800 before the occurrence of a failure.

Moreover, in the failure analysis process shown in FIG. 25A and FIG. 25B, the management computer 101 creates only the expanded rule 1800 that includes the failure event that occurs; however, the management computer 101 may use the information of the cause event of the expanded rule 1800 acquired in step S2521, and the meta-rule 300 related to the cause event as an input to start the rule expansion process, and then generate all expanded rules 1800 that include the cause event, execute the processes beyond step S2521 with including the expanded rules 1800, and present the analysis result. This enables the display of all failure events that may occur as a result of the influence of a certain cause candidate.

Figure 26A:
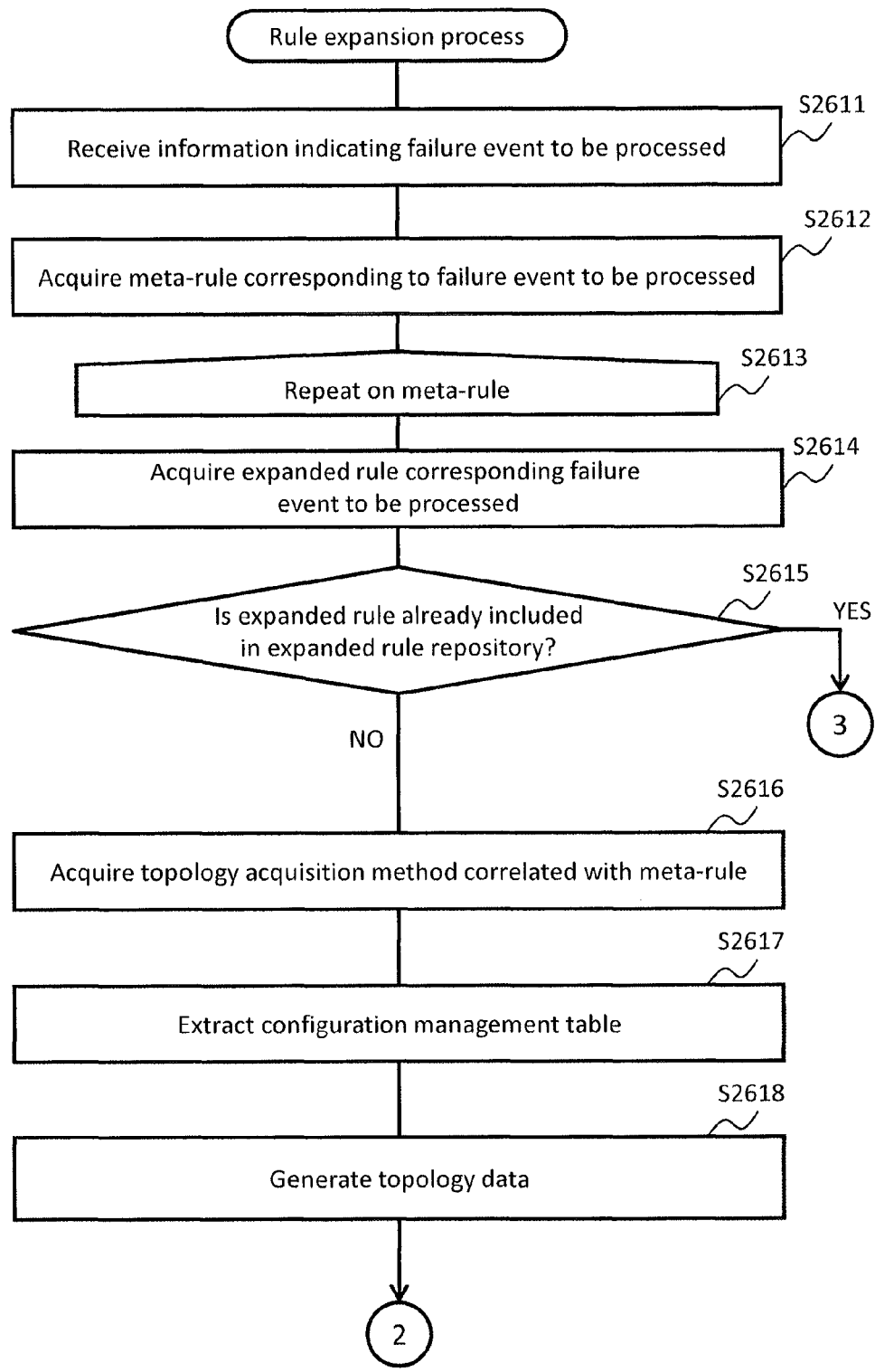
FIG. 26A is a first flowchart of an example of a rule expansion process according to the Embodiment 1.
Figure 26B:
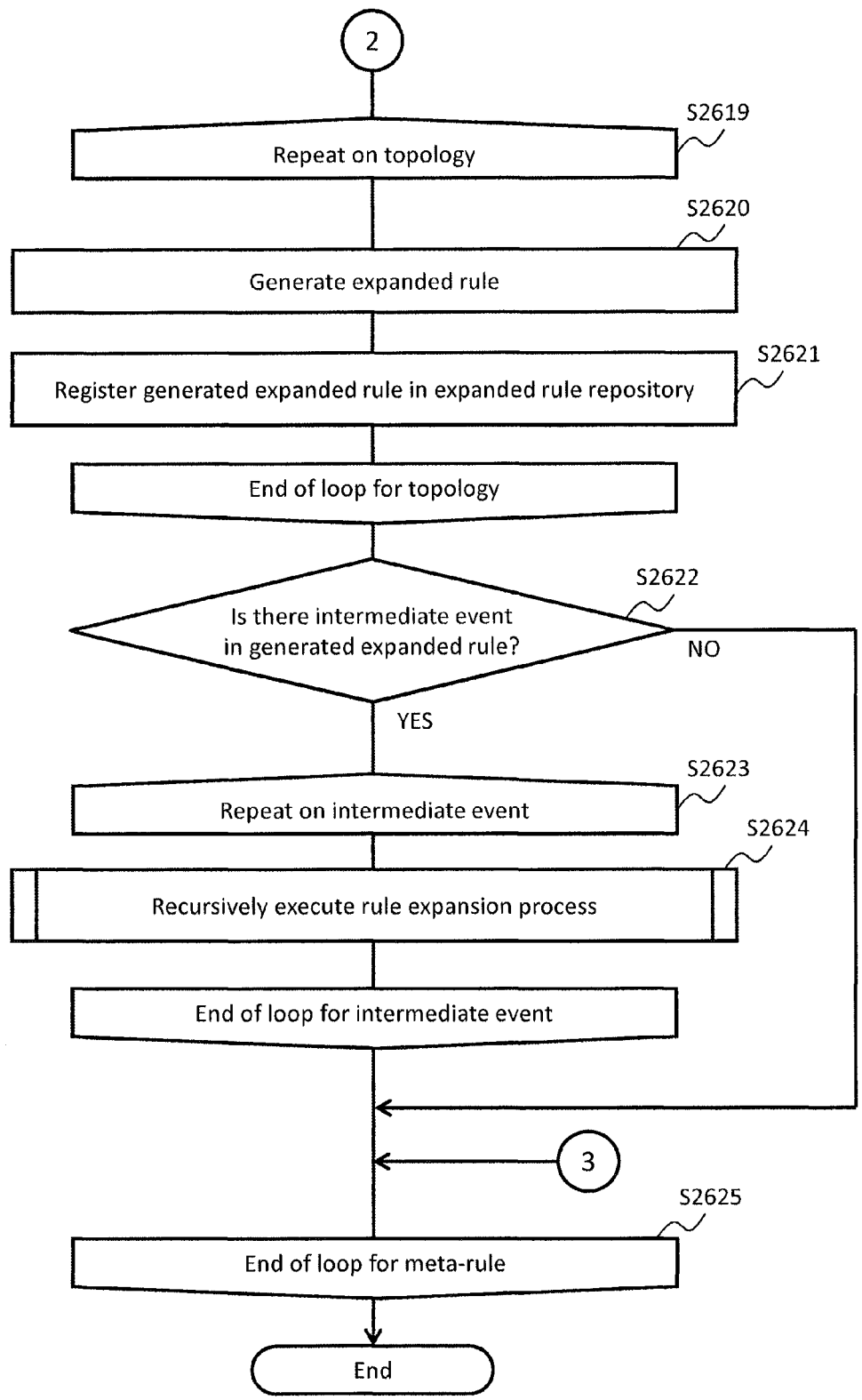
FIG. 26B is a second flowchart of an example of a rule expansion process according to the Embodiment 1.

FIG. 26A is a first flowchart of an example of a rule expansion process according to the Embodiment 1. FIG. 26B is a second flowchart of an example of a rule expansion process according to the Embodiment 1.

In the rule expansion process, a rule expansion program, which is a sub-program of the failure analysis program 123 applies, to meta-rule 300 that includes an event corresponding to the entered failure event as an influence event, the topology having the managed object related to the entered failure event as the starting point, and generates the expanded rule 1800.

In step S2611, the rule expansion program receives the information indicating the failure event, that is, the apparatus ID of the management target apparatus related to the failure event, the component ID of the component related to the failure event, and the information indicating the type of the failure event as a parameter.

In step S2612, the rule expansion program acquires, from the meta-rule repository 135, one or more meta-rules 300 that include the event corresponding to the failure event received in step S2611 (the failure event indicated by the information received in step S2611) as an influence event.

For example, when the failure event indicated by the entry 213 of the failure event table 131A is acquired in step S2611, the apparatus ID of the management target apparatus related to the failure event is "SvA", and the component ID of the component related to the failure event is "DRIVE1". That is, the type of the management target apparatus related to the failure event is server, and the type of the component related to the failure event is disk drive. The type of the failure event is "AverageSecPerXferError". Therefore, the rule expansion program acquires the meta-rule 300 that includes the failure event "AverageSecPerXferError" related to the disk drive of the server as an influence event, where an example of the meta-rule 300 is the meta-rule 300B shown in FIG. 3B.

In step S2613, the rule expansion program repeats the processes in step S2614 to step S2625 for each of the one or more meta-rules 300 acquired in step S2612.

In step S2614, the rule expansion program acquires, from the expanded rule repository 136, an expanded rule 1800 that is expanded on the basis of the meta-rule 300 to be processed, and that includes the failure event received in step S2611 as an influence event.

In step S2615, the rule expansion program determines whether or not the corresponding expanded rule 1800 can be acquired in step S2614. When the condition is satisfied, that is, when the corresponding expanded rule 1800 can be acquired (step S2615: YES), the rule expansion program performs the processes in step S2614 to step S2625 for the meta-rule 300 that is not yet set to be processed. On the other hand, when the condition is not satisfied, that is, when the corresponding expanded rule 1800 cannot be acquired (step S2615: NO), the rule expansion program advances the process to step S2616.

In step S2616, the rule expansion program acquires, from the topology acquisition method repository 134, the topology acquisition method data 1600 corresponding to the method ID stored in the topology acquisition method ID 314 of the meta-rule 300 to be processed.

In step S2617, the rule expansion program extracts, from the configuration management DB 132, the configuration management table for the date and time of reception of the failure event received in step S2611.

In step S2618, the rule expansion program uses the apparatus ID of the management target apparatus related to the failure event received in step S2611, or the component ID of the component related to the failure event as the starting point, and then on the basis of the topology acquisition method data 1600 acquired in step S2616, and the configuration management table extracted in step S2617, generates the topology data 1700 applicable to the meta-rule 300 to be processed.

For example, when the rule expansion program receives the failure event related to the disk drive "DRIVE1" in step S2611, the rule expansion program acquires the topology acquisition method data 1600C shown in FIG. 16C in step S2616. Then, when the configuration management table extracted in step S2618 is the table shown in FIG. 4 to FIG. 13, the rule expansion program generates topology data 1700 indicating the topology including the logical volume "VOL1" and the disk drive "DRIVE1", for example.

In step S2619 of FIG. 26B, the rule expansion program repeats the processes in step S2620 and step S2621 for each of the one or more topology data 1700 generated in step S2618.

In step S2620, by applying the topology indicated by the topology data 1700 to be processed to the meta-rule 300 to be processed, the rule expansion program generates the expanded rule 1800 corresponding to the meta-rule 300 to be processed. Specifically, from among the managed objects configuring the topology indicated by the topology data 1700 to be processed, the rule expansion program extracts the managed object belonging to the type of the managed object related to an influence event of the meta-rule 300 to be processed, and sets the influence event related to the extracted managed object as the influence event of the expanded rule 1800 to be generated. Moreover, from among the managed objects configuring the topology indicated by the topology data 1700 to be processed, the rule expansion program extracts the managed object belonging to the type of the managed object related to the cause event of the meta-rule 300 to be processed, and sets the cause event related to the extracted managed object as the cause event of the expanded rule 1800 to be generated.

For example, when the rule expansion program selects the meta-rule 300B shown in FIG. 3B in the repeat process of step S2613, and selects the topology data 1700 indicating the topology including the logical volume "VOL1" and the disk drive "DRIVE1" in the repeat process of step S2619, then since the type of the component related to the cause event of the meta-rule 300B is logical volume, the rule expansion program extracts the logical volume "VOL1" from among the managed objects included in the topology indicated by the topology data 1700 as the managed object belonging to the type of the managed object related to the cause event of the meta-rule 300B. Then, the rule expansion program sets the failure event "MidError1" related to the logical volume "VOL1" as the cause event of the expanded rule 1800 corresponding to the meta-rule 300A. Similarly, the managed object related to the influence event is also extracted, and the expanded rule 1700 corresponding to the meta-rule 300A is generated.

In step S2621, the rule expansion program registers the expanded rule 1800 generated in step S2620 in the expanded rule repository 136.

In step S2622, the rule expansion program determines whether or not an intermediate event is included in the expanded rule 1800 generated in step S2620. When the condition is not satisfied, that is, when an intermediate event is not included in the generated expanded rule 1800 (step S2622: NO), the rule expansion program performs the processes of step S2614 to step S2625 for the meta-rule 300 that is not yet set to be processed. On the other hand, when the condition is satisfied, that is, when an intermediate event is included in the generated expanded rule 1800 (step S2622: YES), the rule expansion program advances the process to step S2623.

In step S2623, the rule expansion program repeats the process of step S2624 for each of the one or more intermediate events included in the expanded rule 1800 generated in step S2620.

In step S2624, the rule expansion program uses the apparatus ID of the management target apparatus related to the intermediate event to be processed, the component ID of the component related to the intermediate event to be processed, and information indicating the type of the intermediate event to be processed, as an input, and recursively executes the rule expansion process.

After ending the process for each of the meta-rules 300 acquired in step S2612, the rule expansion program ends the rule expansion process.

FIG. 27 is an example flowchart of a rule deletion process according to the Embodiment 1.

In step S2711, a rule deletion program, which is a sub-program of the failure analysis program 123 receives identification information of a change event as a parameter. Then, in the change event table 131B, the rule deletion program specifies the entry indicating the change event indicated by the received identification information, and acquires the apparatus ID stored in the apparatus ID 252 of the specified entry, the component ID stored in the component ID 253 of the specified entry, and the data stored in the event type 254 of the specified entry, that is, the data indicating the type of the change event.

In step S2712, the rule deletion program determines whether the component ID acquired in step S2711 is "NULL", that is, whether the configuration change corresponding to the change event is addition or deletion of the entire apparatus. When the condition is satisfied, that is, when the configuration change is addition or deletion of the entire apparatus (step S2712: YES), the rule deletion program advances the process to step S2713. On the other hand, when the condition is not satisfied, that is, when the configuration change is not addition or deletion of the entire apparatus (step S2712: NO), the rule deletion program advances the process to step S2714.

In step S2713, the rule deletion program deletes all expanded rules 1800 stored in the expanded rule repository 136 from the expanded rule repository 136. This is because when the configuration change corresponding to the change event is addition or deletion of the entire apparatus, identification of the extent of the influence range on the expanded rules 1800 involves an exorbitant cost. Following this, the rule deletion program ends the rule deletion process.

In step S2714, the rule deletion program determines whether the data indicating the type of the change event acquired in step S2711 is "ADD". When the condition is satisfied, that is, when the data indicating the type of the change event is "ADD" (step S2714: YES), the rule deletion program advances the process to step S2715. On the other hand, when the condition is not satisfied, that is, when the data indicating the type of the change event is not "ADD" (step S2714: NO), the rule deletion program advances the process to step S2719.

In step S2715, the rule deletion program specifies one or more components that are related to the component having the component ID acquired in step S2711. Specifically, the rule deletion program first references the configuration management DB 132, and specifies the type of the component having the acquired component ID. Next, from the relation table 133, the rule deletion program acquires all entries for which the data indicating the type of the specified component is stored in the table name X 1502 or the table name Y 1504. Next, on the basis of the unit relations indicated by the acquired entries, the rule deletion program specifies all components that are related to the component having the acquired component ID.

In step S2716, the rule deletion program acquires, from the topology repository 137, one or more topology data 1700 indicating the topology including the component specified in step S2715.

In step S2717, the rule deletion program executes the repeat process of step S2718 for each of the one or more topology data 1700 acquired in step S2716.

In step S2718, the rule deletion program acquires the expanded rule ID stored in the relation expanded rule ID 1713 of the topology data 1700 to be processed, and deletes the expanded rule 1800 having the acquired expanded rule ID from the expanded rule repository 136.

After ending the process for each of the topology data 1700 acquired in step S2716, the rule deletion program ends the rule deletion process.

In step S2719, the rule deletion program acquires, from the topology repository 137, one or more topology data 1700 indicating the topology including the component having the component ID acquired in step S2711.

In step S2720, the rule deletion program executes the repeat process of step S2721 for each of the one or more topology data 1700 acquired in step S2719.

In step S2721, the rule deletion program acquires the expanded rule ID stored in the relation expanded rule ID 1713 of the topology data 1700 to be processed, and deletes the expanded rule 1800 having the acquired expanded rule ID from the expanded rule repository 136.

After ending the process for each of the topology data 1700 acquired in step S2719, the rule deletion program ends the rule deletion process.

For example, when "CHANGE" is acquired as data indicating the type of the change event in step S2711, and "DRIVE1" is acquired as the component ID, respectively, then in step S2719, the rule deletion program acquires, from the topology repository 137, topology data 1700 indicating the topology including the logical volume "VOL1" and the disk drive "DRIVE1". "ExpandedRule2-1" is stored as the relation expanded rule ID of the acquired topology data 1700. Therefore, in step S2721, the rule deletion program deletes, from the expanded rule repository 136, the expanded rule 1800 having "ExpandedRule1-2" as the expanded rule ID.

As a result of the execution of the meta-rule generation process and the failure analysis process, a plurality of meta-rules 300 that are divided on the basis of the change frequency related to the unit relation are generated from the cause information and the influence information designated by the rule creator, and the cause analysis of the failure is performed on the basis of the meta-rules 300 that are thus generated after division.

For example, in step S1912 of the event information input process, when the rule creator enters a failure event of a disk usage rate exceeding error that occurs in the storage disk of the storage as the cause event, and enters non-detections of a failure event of a transfer time performance error related to the disk drive of the server, a failure event of an I/O response time exceeding error related to the logical volume of the storage, a failure event of a disk usage rate exceeding error that occurs in the storage disk of the storage, and a failure event of a CPU usage rate exceeding error related to the storage controller of the storage, as the influence events, the management computer 101 generates the meta-rule 300B, the meta-rule 300C, and the meta-rule D shown in FIG. 3B, FIG. 3C, and FIG. 3D, as well as the topology acquisition method data 1600B, the topology acquisition method data 1600C, and the topology acquisition method data 1600D shown in FIG. 16B, FIG. 16C, and FIG. 16D. Then, for example, when the failure event indicated by the entry 213 of the failure event table 131A occurs in the computer system, the management computer 101 generates the expanded rule 1800A, an expanded rule 1800B, and the expanded rule 1800C shown in FIG. 18A, FIG. 18B, and FIG. 18C on the basis of the meta-rule 300B, the meta-rule 300C, and the meta-rule 300D, as well as the topology acquisition method data 1600B, the topology acquisition method data 1600C, and the topology acquisition method data 1600D. Then, the management computer 101 presents, to the operation administrator, the analysis result indicating that the failure event of the disk usage rate exceeding error related to the storage disk "DISK1" of the storage A is the cause candidate, the failure event of the transfer time performance error related to the disk drive "DRIVE1" of the server A, the failure event of the I/O response time exceeding error related to the logical volume "VOL1" of the storage A, and the failure event of the disk usage rate exceeding error related to the storage disk "DISK1" of the storage A are included in the influence range, and the degree of confidence for the cause candidate is 50%.

Moreover, for example, when the management computer 101 receives a change event indicated by the entry 261 of the change event table 131B shown in FIG. 2B, out of the expanded rules 1800 generated above, only the expanded rule 1800A shown in FIG. 18A is deleted. Following this, when the failure event indicated by the entry 213 of the failure event table 131A is generated, the management computer 101 is capable of reusing the expanded rule 1800B and the expanded rule 1800C shown in FIG. 18B and FIG. 18C without re-creating all expanded rules 1800.

As described above, according to the Embodiment 1, when the rule creator designates one cause event and one or more influence events, the management computer 101 specifies the type of the managed object related to each influence event, and automatically generates the meta-rule 300 and the topology acquisition method data 1700 used when generating the expanded rules 1800 on the basis of the meta-rule 300. At that time, the management computer 101 divides the topology acquisition method data 1700 generated on the basis of the input information of the rule creator, and generates a plurality of meta-rules 300 (the meta-rules 300 after division) corresponding to the topology acquisition method indicated by each of the plurality of the topology acquisition method data 1700 after division. The division is performed on the basis of the change frequency related to the unit relation, and the meta-rule 300 including the unit relation having the high change frequency is separated or made independent. That is, one or more of the divided meta-rules 300 are meta-rules 300 corresponding to the topology acquisition method configured by a unit relation that changes easily due to frequently occurring configuration change, and the other meta-rules 300 are meta-rules 300 corresponding to a topology acquisition method configured by a unit relation that does not change frequently. As a result, according to the conventional art, when the configuration information of a computer system is changed, the expanded rules 1800 are re-generated for all meta-rules 300 prior to the division, but in contrast, in the present embodiment, the expanded rules 1800 may be re-generated only for the meta-rule 300 related to the configuration change, and the re-generation of expanded rules 1800 is avoided for the meta-rules 300 that are not related to the configuration change. As a result, it is possible to reduce a time required for re-generating an expanded rule 1800 due to a configuration change. Then, in the present embodiment, due to the division into the meta-rules 300 corresponding to the topology acquisition method configured by a unit relation that has a high change frequency, and the meta-rules 300 corresponding to a topology acquisition method configured by a unit relation that does not have a high change frequency, on the basis of the change frequency related to unit relations, the possibility of avoidance of re-generation of the expanded rules 1800 for the latter meta-rules 300 is high, which makes it possible to achieve a relatively high effect of reduction in the time required for re-generation. Then, as a result of reduction in the time required for building the expanded rules 1800 during cause analysis, it is also expected that the time required for cause analysis is reduced. Moreover, without having to understand the frequency of configuration change of the internal specifications of the failure analysis function and each managed object, the rule creator is capable of generating meta-rules 300 for which the probability of re-generating the expanded rules 1800 due to a configuration change is low. This enables a reduction in the workload of the rule creator during the creation of the meta-rule 300.

In the Embodiment 1, the meta-rules 300 prior to division consist of the logical disk on the physical server—the volume on the storage—the physical components of the storage (such as the controller and RAID group). Of the meta-rules 300, in the relation between the logical disk and the volume, a configuration change may occur frequently due to the migration of the virtual server using the logical disk, for example, between physical servers. On the other hand, in the relation between the volume and the physical components, a configuration change hardly occurs for a volume that is once generated. This point is applied in the present embodiment, and the meta-rule 300B shown in FIG. 3B is generated automatically as the meta-rule 300 that includes an easily changeable unit relation, while the meta-rule 300C shown in FIG. 3C and the meta-rule 300D shown in FIG. 3D are generated automatically as meta-rules 300 that do not include an easily changeable unit relation.

It is noted that the management computer 101 may divide the existing meta-rules 300 stored in the meta-rule repository 135. By using the method shown in the present embodiment, the management computer 101 divides the topology acquisition method data 1700 corresponding to the meta-rule 300 to be divided into a plurality of topology acquisition method data 1700 on the basis of the change frequency related to the unit relation, and by generating meta-rules 300 corresponding to the topology acquisition method data 1700 after the division, it is possible to divide the existing meta-rules 300 into meta-rules 300 corresponding to the topology acquisition method configured by a unit relation that has a high change frequency, and meta-rules 300 corresponding to a topology acquisition method configured by a unit relation that does not have a high change frequency.

Moreover, in the present embodiment, the management computer 101 directly generates the meta-rules 300 after division on the basis of the input information of the rule creator, however, first, the meta-rule 300 prior to the division, which corresponds to the input information, may be generated, and thereafter, the meta-rule 300 prior to the division may be divided into a plurality of meta-rules 300.

Embodiment 2

In the Embodiment 1, at the time of entering the meta-rule 300, the rule creator divides the topology acquisition method based on the input information, on the basis of the change frequency managed in each unit relation, and then generates a plurality of meta-rules 300 corresponding to each of the topology acquisition methods after division, that is, the meta-rules 300 after division. In the Embodiment 2, when the change frequency managed in each unit relation is changed, the existing meta-rule 300 is divided into semantically equal plurality of meta-rules 300. As a result, when an entry is made by the rule creator, even when sufficient frequency information of the configuration change is not accumulated as yet, the meta-rule 300 is divided appropriately according to the update of the frequency information of the configuration change thereafter.

Specifically, when the failure analysis program 123 receives a change event, and the change frequency related to a certain unit relation of the relation table 133 is updated, then when the change frequency after the update exceeds the division threshold value, the management computer 101 divides the meta-rule 300 corresponding to the topology acquisition method including the unit relation on the basis of the change frequency after update.

In the Embodiment 2, the explanation for the configuration of the computer system, the configuration of each apparatus, and the processes executed by each program, which is the same as the Embodiment 1, is omitted. The configuration of the computer system according to the Embodiment 2 is substantially the same as the configuration of the computer system according to the Embodiment 1 (FIG. 1A and FIG. 1B).

<Meta-Rule Rebuilding Process>

Figure 28:
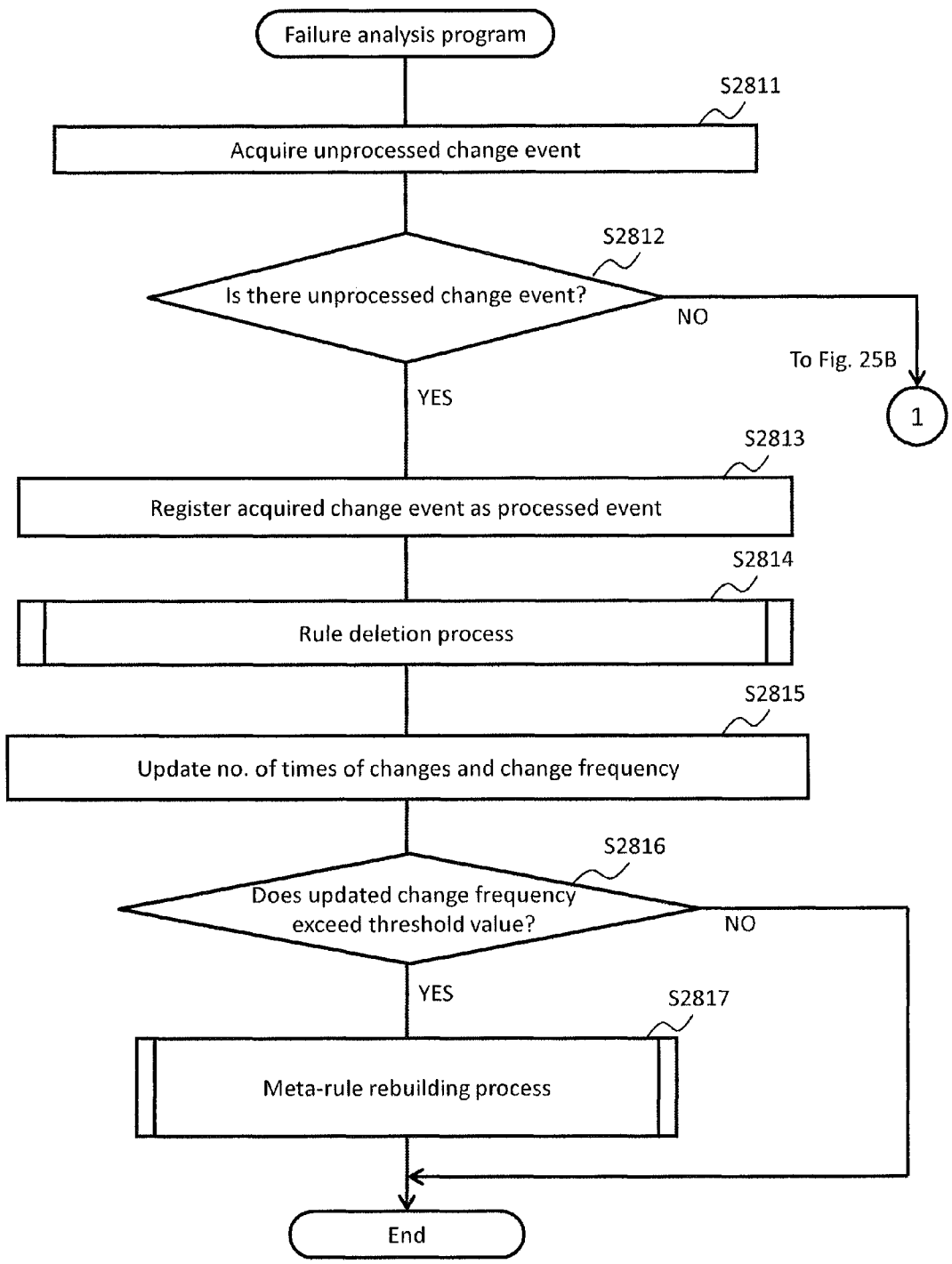
FIG. 28 is an example flowchart of a failure analysis process according to the Embodiment 2.

FIG. 28 is an example flowchart of a failure analysis process according to the Embodiment 2.

In step S2811, the failure analysis program 123 acquires, from the change event table 131B, the entry indicating an unprocessed change event. For example, the failure analysis program 123 acquires the entry indicating the change event having the oldest occurrence date and time from among the change events having the processed flag 256 as "NO" in the change event table 131B.

In step S2812, the failure analysis program 123 determines whether or not an unprocessed change event can be acquired (whether or not an entry showing an unprocessed change event can be acquired). If an unprocessed change event can be acquired (step S2812: YES), the failure analysis program 123 advances the process to step S2813. The process performed when an unprocessed change event cannot be acquired (step S2812: NO) is substantially the same as the process (FIG. 25B) after step S2516 of the failure analysis process of the Embodiment 1. It is noted that in step S2612 of the rule expansion process (FIG. 26A and FIG. 26B) executed in step S2519 of the failure analysis process, the meta-rule 300 that forms the base of the expanded rule 1800 used in the cause analysis is acquired, however, the meta-rule 300 divided in the meta-rule rebuilding process (see FIG. 29) described later (the meta-rule 300 prior to division) is not selected even when left behind in the meta-rule repository 135. That is, in the Embodiment 2, the management computer 101 performs the cause analysis using the meta-rule 300 after division, rather than the meta-rule 300 prior to division.

In step S2813, the failure analysis program 123 registers the change event acquired in step S2811 (the change event indicated by the entry acquired in step S2811) as a processed change event. Specifically, the failure analysis program 123 changes the processed flag 256 of the change event table 131B from "No" to "Yes".

In step S2814, the failure analysis program 123 uses the identification information of the change event acquired in step S2811 as an input to execute the rule deletion process. The rule deletion process is substantially the same as the rule deletion process (FIG. 27) according to the Embodiment 1.

In step S2815, the failure analysis program 123 acquires the component ID stored in the component ID 253 of the entry indicating the change event acquired in step S2811 in the change event table 131B. Then, in the relation table 133, the failure analysis program 123 acquires the entry for which the data indicating the type of the component corresponding to the acquired component ID is stored in the table name X 1502 or the table name Y 1504. Then, the failure analysis program 123 updates the aggregate number of times of changes in the unit relation and the change frequency related to the corresponding unit relation indicated by the acquired entry.

It is noted that in step S2815, when "NULL" is stored in the component ID 253 of the entry indicating the change event acquired in step S2811 in the change event table 131B, the failure analysis program 123 acquires the apparatus ID stored in the apparatus ID 252 of the entry. Then, in the relation table 133, the failure analysis program 123 acquires the entry for which the data indicating the type of the management target apparatus corresponding to the acquired apparatus ID is stored in the table name X 1502 or the table name Y 1504. Then, the failure analysis program 123 updates the aggregate number of times of changes in the unit relation and the change frequency related to the corresponding unit relation indicated by the acquired entry.

In step S2816, the failure analysis program 123 determines whether the change frequency prior to the update, which is related to the unit relation updated in step S2815 (hereinafter, referred to as "updated unit relation") (the first relation), does not exceed the division threshold value, and whether the change frequency after the update, which is related to the updated unit relation, exceeds the division threshold value. When the condition is satisfied, that is, when the change frequency prior to the update, which is related to the updated unit relation, does not exceed the division threshold value, and the change frequency after the update, which is related to the updated unit relation, exceeds the division threshold value (step S2816: YES), the failure analysis program 123 advances the process to step S2817. On the other hand, when the condition is not satisfied, that is, when the change frequency prior to the update, which is related to the updated unit relation, exceeds the division threshold value, or the change frequency after the update, which is related to the updated unit relation, does not exceed the division threshold value (step S2816: NO), the failure analysis program 123 ends the failure analysis process.

In step S2817, the failure analysis program 123 uses the relation ID of the unit relation updated in step S2815 as an input, and allows the meta-rule generation program 121 to execute the meta-rule rebuilding process. Following this, the failure analysis program 123 ends the failure analysis process.

Figure 29:
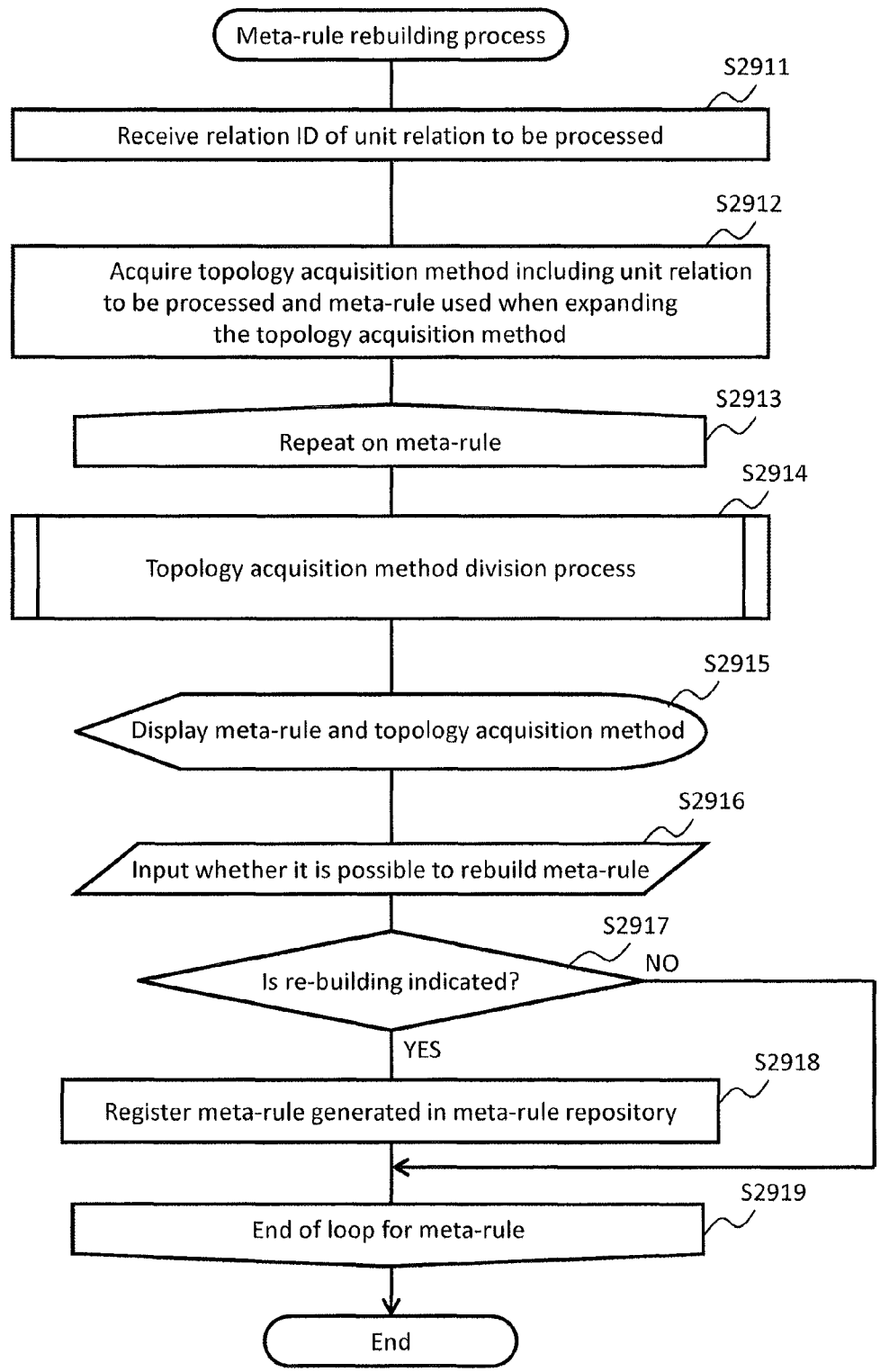
FIG. 29 is an example flowchart of a meta-rule rebuilding process according to the Embodiment 2.

FIG. 29 is an example flowchart of a meta-rule rebuilding process according to the Embodiment 2.

In step S2911, the meta-rule generation program 121 receives the relation ID of the unit relation that is the target of the meta-rule rebuilding process.

In step S2912, the meta-rule generation program 121 acquires, from the topology acquisition method repository 134, one or more topology acquisition method data 1600 that include information about the unit relation having the relation ID received in step S2911, and then acquires, from the meta-rule repository 135, one or more meta-rules 300, which use the acquired topology acquisition method data 1600 during expansion.

In step S2913, the meta-rule generation program 121 repeats the processes of step S2914 to step S2919 for each of the one or more meta-rules 300 acquired in step S2912.

In step S2914, the meta-rule generation program 121 sets the information indicating the cause event of the meta-rule 300 to be processed as the cause information, the information indicating the influence event of the meta-rule 300 to be processed as the influence information, the data indicating the correspondence relationship between the influence event of the meta-rule 300 to be processed and the topology acquisition method data 1600 indicating the topology acquisition method corresponding to the influence event as the correspondence relationship data, uses the cause information, the influence information, and the correspondence relationship data as an input to execute the topology acquisition method division process, and receives the information indicating the meta-rule 300 after division, for example, the meta-rule ID. The topology acquisition method division process is substantially the same as the topology acquisition method division process (FIG. 23) according to the Embodiment 1. As a result of the topology acquisition method division process, the meta-rule 300 to be processed (the existing meta-rule 300) is divided into a plurality of meta-rules 300 that are semantically equal to the meta-rule 300 to be processed, on the basis of the change frequency related to the unit relation.

In step S2915, the meta-rule generation program 121 displays, on a screen, the meta-rule 300 to be processed, that is, the meta-rule 300 prior to division, the meta-rule 300 after division that is generated in step S2914, and the topology acquisition method, and thus presents the above to the rule creator, and in step S2916, the meta-rule generation program 121 receives, from the rule creator, an indication to divide and then rebuild the meta-rule 300, or an indication to not rebuild the meta-rule 300.

In step S2917, the meta-rule generation program 121 determines whether or not the indication for dividing and rebuilding the meta-rule 300 is received. When the condition is satisfied, that is, when the indication for rebuilding is received (step S2917: YES), the meta-rule generation program 121 advances the process to step S2918. On the other hand, when the condition is not satisfied, that is, when an indication for not rebuilding is received (step S2917: NO), the meta-rule generation program 121 performs the processes of step S2914 to step S2919 for the meta-rule 300 that is not yet processed.

In step S2918, the meta-rule generation program 121 registers the meta-rule 300 after division, which is generated in step S2914 in the meta-rule repository 135.

After ending the processes of step S2914 to step S2919 for each of the meta-rules 300 acquired in step S2912, the meta-rule generation program 121 ends the meta-rule rebuilding process.

As described above, according to the Embodiment 2, when the failure analysis program 123 receives a change event, and the change frequency related to a certain unit relation of the relation table 133 is updated, then when the change frequency after the update exceeds the division threshold value, the management computer 101 divides the meta-rule 300 corresponding to the topology acquisition method including the unit relation on the basis of the change frequency after update. As a result, when an entry is made by the rule creator, even when sufficient frequency information of the configuration change is not accumulated as yet, the meta-rule 300 is divided appropriately according to the update of the frequency information of the configuration change thereafter.

It is noted that the present invention is not limited to the embodiments described above, and it goes without saying that it is possible to make various changes without departing from the scope of the present invention.

REFERENCE SIGNS LIST

101: Management computer, 102: Server, 103: IP switch, 104: Storage, 105: FC switch

The invention claimed is:

1. A management system comprising:
a network interface that is communicatively coupled to a storage device;
a memory; and
a processor communicatively coupled to the memory and the network interface;
wherein the storage device stores:
a plurality of meta-rules, including a first meta-rule, wherein each of the plurality of meta-rules indicates a correspondence relationship between a cause event related to any one of a plurality of types of managed objects, and one or more influence events related to any one of the types of the managed objects, where the influence events are a condition that resulted in the cause event; and
for each relation indicating a connection relationship between two types of the managed objects, changes frequency information indicating a change frequency related to the relation, and
wherein the processor:
forms a first relation group related to the first meta-rule, wherein the first relation group is a combination of one or more relations indicating a connection configuration between a particular type of the managed objects related to the cause event of the first meta-rule, and each type of managed objects related to one or more influence events of the first meta-rule,
divides the first relation group into one or more second relation groups, wherein the one or more second relation groups include relations where the change frequency is equal to or larger than a predetermined value, wherein the predetermined value is determined based on the change frequency concerning each of the one or more relations in the first relation group,
divides the first relation group into one or more third relation groups, wherein the one or more third relation groups include relations where the change frequency is less than the predetermined value; and
divides the first meta-rule into one or more second meta-rules corresponding to each of the one or more second relation groups and one or more third meta-rules corresponding to each of the one or more third relation groups.

2. The management system according to claim 1, wherein a whole of the plurality of meta-rules including the one or more second meta-rules and the one or more third meta-rules indicates a correspondence relationship between the cause event of the first meta-rule and one or more influence events of the first meta-rule.

3. The management system according to claim 2, wherein:
the storage device further stores:
configuration information indicating a second plurality of managed objects and a second connection relationship between the second plurality of managed objects, wherein the second plurality of managed objects is included in a particular computer system; and
the processor further:
generates, based on the one or more second meta-rules, the one or more third meta-rules, and the configuration information, one or more second expanded rules corresponding to the one or more second meta-rules, and one or more third expanded rules corresponding to the one or more third meta-rules, where the expanded rules express a particular type of the managed objects related to a particular cause event and an influence event of a particular meta-rule by data indicating a specific managed object; and
performs cause analysis of an event that occurs in any one of the plurality of managed objects, based on the one or more second expanded rules and the one or more third expanded rules.

4. The management system according to claim 3, wherein the processor further:
generates, when a first event corresponding to the influence event of the first meta-rule occurs, an expanded rule that is used in the cause analysis of the first event, and that is not stored in the storage device, from among the one or more second expanded rules and the one or more third expanded rules, and stores the expanded rule in the storage device; and
specifies, when the configuration information is changed, particular expanded rule that is inconsistent with the configuration information after change from among one or more expanded rules stored in the storage device, and deletes the particular expanded rule from the storage device.

5. The management system according to claim 4, wherein the processor further:
updates, when the connection relationship between a first managed object and a second managed object from among the second plurality of managed objects is changed, the change frequency related to the first relation indicating the connection relationship between the particular type of the first managed object and the particular type of the second managed object; and
divides, when the change frequency prior to update, which is related to the first relation, is less than the predetermined value, and a change frequency after update, which is related to the first relation, is equal to or larger than the predetermined value, a meta-rule corresponding to a relation group including the first relation, into the one or more second meta-rules, and the one or more third meta-rules, where the meta-rule corresponding to the relation group including the first relation is considered the first meta-rule.

6. The management system according to claim 5, wherein the processor:
receives an input of cause information indicating a particular cause event of a particular meta-rule, and influence information indicating one or more influence events of the meta-rule; and
generate a generated meta-rule indicating a correspondence relationship between the particular cause event indicated by the cause information, and one or more influence events indicated by the influence information, and divide the generated meta-rule into the one or more second meta-rules, and the one or more third meta-rules, where the generated meta-rule is considered the first meta-rule.

7. The management system according to claim 6, wherein in a case when the first meta-rule is divided, the processor:
divides, each of a path that is indicated by any of the relations included in the first relation group, and that joins two types of the managed object, into one or more first paths configured by the relation in which the change frequency is equal to or larger than the predetermined value, and one or more second paths configured by the relation in which the change frequency is less than the predetermined value, and set a combination of the one or more relations indicating the first path as one of the second relation groups, and a combination of the one or more relations indicating the second path as one of the third relation groups.

8. The management system according to claim 7, wherein in a case when the first meta-rule is divided, the processor:
sets, when a type of a third managed object related to a cause event of the first meta-rule is included in a target group of types, which is a combination of a plurality of types of managed objects related to the one or more relations configuring the relation group, and which is related to a target relation group from among the one or more second relation groups and the one or more third relation groups, the cause event of the first meta-rule as the cause event of a second meta-rule or a third meta-rule corresponding to the target relation group;
sets, when the type of the managed object related to an influence event of the first meta-rule is included in the target group of types, the influence event as one of the influence events of the second meta-rule or the third meta-rule corresponding to the target relation group;
sets, when a type of a fourth managed object that is also included in a group of types related to the second relation group or the third relation group other than the target relation group, and the type of the third managed object are included in the target group of types, a pseudo event created in relation to the type of the fourth managed object as one of the influence events of the second meta-rule or the third meta-rule corresponding to the target relation group;
sets, when one type of the fourth managed object is included in the target group of types, and a type of the third managed object is not included in the target group of types, a pseudo event created in relation to the type of the fourth managed object as the cause event of the second meta-rule or the third meta-rule corresponding to the target relation group, and
sets, when a plurality of types of the fourth managed object are included in the target group of types, and a type of the third managed object is not included in the target group of types, a pseudo event created in relation to a type of a fifth managed object having a minimum number of the relations that lies between the type of the third managed object from among the plurality of types of the fourth managed object as a cause event of the second meta-rule or the third meta-rule corresponding to the target relation group; and set a pseudo event created in relation to the type of the fourth managed object other than the type of the fifth managed object as one of the influence events of the second meta-rule or the third meta-rule corresponding to the target relation group.

9. A non-transitory computer-readable recording medium storing a program that causes a computer to perform a process, the process, comprising:
receiving an input of cause information and influence information, wherein the cause information indicates a cause event related to any one of a plurality of types of managed objects, and the influence information indicates one or more influence events related to any one of the types of the managed objects, where the influence events are a condition that resulted in the cause event;
forming a first relation group from a combination of one or more relations indicating a connection configuration between a type of a managed object related to a first cause event of a first meta-rule from a plurality of meta-rules, wherein each of the plurality meta-rules indicates a correspondence relationship between a particular cause event and one or more particular influence events; and which indicates a connection configuration between the type of the managed object related to the cause event indicated by the cause information
dividing the first relation group into one or more second relation groups, wherein the one or more second relation groups include relations where a change frequency is equal to or larger than a predetermined value, wherein the predetermined value is determined based on the change frequency for each of a plurality of the relations configuring the first relation group;
dividing the first relation group into one or more third relation groups, wherein the one or more third relation groups include relations where the change frequency is less than the predetermined value; and
generating one or more second meta-rules corresponding to each of the one or more second relation groups; and one or more third meta-rules corresponding to each of the one or more third relation groups.

10. The non-transitory computer-readable recording medium according to claim 9, wherein a whole of the plurality of meta-rules including the one or more second meta-rules and the one or more third meta-rules indicates a correspondence relationship between a cause event indicated by the cause information, and one or more influence events indicated by the influence information.

11. The non-transitory computer-readable recording medium according to claim 9, comprising:
generating one or more second expanded rules corresponding to the one or more second meta-rules, and one or more third expanded rules corresponding to the one or more third meta-rules, wherein the expanded rules express a type of the managed object related to a cause event and an influence event of a meta-rule by data indicating a specific managed object, wherein the one or more second expanded rules, the one or more third expanded rules are generated based on the one or more second meta-rules, the one or more third meta-rules, and configuration information indicates a second plurality of managed objects that are included in a computer system, and a connection relationship between the plurality of managed objects; and
performing cause analysis of an event that occurs in any one of the plurality of managed objects, based on the one or more second expanded rules, and the one or more third expanded rules.

12. The non-transitory computer-readable recording medium according to claim 11, comprising:
generating, when a first event corresponding to an influence event indicated by the influence information occurs, a generated expanded rule that is used in the cause analysis of the first event, and that is not stored in a storage device, from among the one or more second expanded rules, and the one or more third expanded rules, and storing the generated expanded rule in the storage device; and
specifying, when the configuration information is changed, particular expanded rule inconsistent with the configuration information after change from among the expanded rules stored in the storage device, and deleting the particular expanded rule from the storage device.

13. The non-transitory computer-readable recording medium according to claim 12, comprising:
updating, when a connection relationship between a first managed object and a second managed object from among a second plurality of managed objects is changed, the change frequency related to the first relation indicating the connection relationship between a particular type of the first managed object and the particular type of the second managed object; and
dividing, when the change frequency prior to update, which is related to the first relation, is less than the predetermined value, and a change frequency after update, which is related to the first relation, is equal to or larger than the predetermined value, a relation group related to a first meta-rule corresponding to a relation group including the first relation from among meta-rules, into the one or more second relation groups and the one or more third relation groups, where the relation group related to the first meta-rule is the first relation group, and dividing the first meta-rule into the one or more second meta-rules and the one or more third meta-rules by generating the one or more second meta-rules and the one or more third meta-rules.

14. The non-transitory computer-readable recording medium according to claim 9, comprising:
in a case when the one or more second meta-rules and the one or more third meta-rules are generated,
dividing, each of a path that is indicated by any plurality of the relations included in the first relation group, and that joins two types of the managed objects, into one or more first paths configured by the relation in which the change frequency is equal to or larger than the predetermined value, and one or more second paths configured by the relation in which the change frequency is less than the predetermined value; and setting a combination of the one or more relations indicating the first path as one of the second relation groups, and a combination of the one or more relations indicating the second path as one of the third relation groups.

15. The non-transitory computer-readable recording medium according to claim 9, comprising:
in a case when the one or more second meta-rules and the one or more third meta-rules are generated,
setting, when a type of a third managed object related to a cause event indicated by the cause information is included in a target group of types, which is a combination of a plurality of types of managed objects related to the one or more relations configuring the relation group, and which is related to a target relation group from among the one or more second relation groups and the one or more third relation groups, the cause event indicated by the cause information as a cause event of a second meta-rule or a third meta-rule corresponding to the target relation group;
setting, when the type of the managed object related to an influence event indicated by the influence information is included in the target group of types, the influence event as one of the influence events of the second meta-rule or the third meta-rule corresponding to the target relation group;
setting, when a type of a fourth managed object that is also included in a group of types related to the second relation group or the third relation group other than the target relation group, and the type of the third managed object are included in the target group of types, a pseudo event created in relation to the type of the fourth managed object as one of the influence events of the second meta-rule or the third meta-rule corresponding to the target relation group;
setting, when one type of the fourth managed object is included in the target group of types, and a type of the third managed object is not included in the target group of types, a pseudo event created in relation to the type of the fourth managed object as the cause event of the second meta-rule or the third meta-rule corresponding to the target relation group; and
setting, when a plurality of types of the fourth managed object are included in the target group of types, and a type of the third managed object is not included in the target group of types, a pseudo event created in relation to a type of a fifth managed object having a minimum number of the relations that lies between the type of the third managed object from among the plurality of types of the fourth managed object as a cause event of the second meta-rule or the third meta-rule corresponding to the target relation group, and setting a pseudo event created in relation to the type of the fourth managed object other than the type of the fifth managed object as one of the influence events of the second meta-rule or the third meta-rule corresponding to the target relation group.

* * * * *